US012761932B1

(12) United States Patent
Cordeiro et al.

(10) Patent No.: US 12,761,932 B1
(45) Date of Patent: Oct. 13, 2026

(54) SYSTEMS AND METHODS FOR DYNAMIC PRESENTATION OF GRAPHICAL USER INTERFACE ELEMENTS

(71) Applicant: DK Crown Holdings Inc., Boston, MA (US)

(72) Inventors: Evan Lewis Cordeiro, Ipswich, MA (US); David Curtis Lustig, Arlington, MA (US); Carl Andrew Gryte, Los Angeles, CA (US); Brett Cain Weiss, II, West Creek, NJ (US); Ethan Haskell, Eliot, ME (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/647,730

(22) Filed: Apr. 14, 2026

(51) Int. Cl.

| | |
|---|---|
| ***G06F 9/451*** | (2018.01) |
| ***G06F 16/22*** | (2019.01) |
| ***G06F 40/106*** | (2020.01) |
| ***G06F 40/197*** | (2020.01) |

(52) U.S. Cl.
CPC .......... *G06F 9/451* (2018.02); *G06F 16/2246* (2019.01); *G06F 40/106* (2020.01); *G06F 40/197* (2020.01)

(58) Field of Classification Search
CPC .... G06F 9/451; G06F 16/2246; G06F 40/106; G06F 40/197
See application file for complete search history.

(56) References Cited

U.S. PATENT DOCUMENTS

| | | | | |
|---|---|---|---|---|
| 5,926,182 | A * | 7/1999 | Menon | G06T 15/40 345/421 |
| 2007/0136338 | A1* | 6/2007 | Kaler | G06F 40/143 |
| 2010/0070505 | A1* | 3/2010 | Kao | G06F 16/168 707/E17.046 |
| 2015/0309993 | A1* | 10/2015 | Wilde | H04L 67/02 715/703 |
| 2017/0337354 | A1* | 11/2017 | Drey | G06Q 50/184 |
| 2021/0248304 | A1* | 8/2021 | Olivier | G06F 40/106 |
| 2022/0129574 | A1* | 4/2022 | Rehnelt | H04L 9/3242 |

OTHER PUBLICATIONS

UIX Developer's Guide, Creating Pages in UIX, available at https://download.oracle.com/otn_hosted_doc/jdeveloper/904preview/uixhelp/uixdevguide/creatingpages.html. (Year: 2020).*
Oracle, Oracle Fusion Applications (Mar. 2012) available at https://docs.oracle.com/cd/E25178_01/fusionapps.1111/e15524.pdf. (Year: 2012).*

* cited by examiner

*Primary Examiner* — Shahid K Khan
(74) *Attorney, Agent, or Firm* — Foley & Lardner LLP

(57) ABSTRACT

Disclosed are systems and methods for dynamically constructing graphical user interfaces across multiple platforms. The system maintains a hierarchical data structure for rendering pages, where each zone structure is linked to one or more content objects. An operator device can modify this data structure via a graphical interface. Upon receiving a request to modify a zone structure, including an identifier for an interface element tied to a conditional event, the system updates the hierarchy to associate the identifier with the zone structure. When a user client requests access to a page specifying the zone structure, the system generates and transmits a response containing data to render the specified interface element within the zone structure, thereby presenting the page.

20 Claims, 16 Drawing Sheets

300

310

320

330

340

350

700

SYSTEMS AND METHODS FOR DYNAMIC PRESENTATION OF GRAPHICAL USER INTERFACE ELEMENTS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

At least one aspect relates to a system. The system can include one or more processors coupled to non-transitory memory. The system can maintain a hierarchical data structure for rendering at least one page, the hierarchical data structure identifying at least one zone structure associated with at least one page, each zone structure of at least one zone structure associated with one or more content objects. The system can provide, to an operator device, a graphical user interface to facilitate modification of the hierarchical data structure for rendering at least one page. The system can receive, from the operator device, a request to modify a first zone structure of at least one zone structure, the request comprising a first identifier of a first interface element to be presented in the first zone structure, the first interface element representing a first conditional event. The system can update the hierarchical data structure to associate the first identifier of the first interface element with the first zone structure, such that the first interface element is to be presented within a graphical representation of the first zone structure. The system can receive, from a user client device, an access request for a first page of at least one page identifying the first zone structure. The system can generate, based on the hierarchical data structure, a response to the access request including data for rendering the first interface element within the graphical representation of the first zone structure of the first page. The system can transmit the response to cause presentation of the first page via an application executing on the user client device, such that presentation of the first page includes the graphical representation of the first zone structure and the first interface element representing the first conditional event.

In some implementations, the system can receive a second access request for a second page of at least one page that includes the first zone structure. In some implementations, the system can transmit, based on the hierarchical data structure, a second response to the second access request including second data for rendering the first interface element within the first zone structure of the second page. In some implementations, the hierarchical data structure identifies at least one page templates, wherein the hierarchical data structure defines a first page template for a subset of at least one page having a first category of at least one categories. In some implementations, the system can receive a second access request for a second page of the subset. In some implementations, the system can generate, based on the hierarchical data structure, a second response to the second access request including data for rendering the second page according to display instructions of the first page template. In some implementations, the system can transmit the second response to cause presentation of the second page in response to the second access request. In some implementations, the system can receive, from the operator device, a second request to create a second page to be included in the subset. In some implementations, the system can update, based on the second request, the hierarchical data structure to include the second page and to associate the second page with the first page template, such that the second page is rendered according to display instructions of the first page template.

In some implementations, the system can receive, from the operator device, a second request to generate a variant of the first page, the variant corresponding to a modification to the first page. In some implementations, the system can update, based on the second request, the hierarchical data structure to include a second page generated according to the modification for first page. In some implementations, the system can assign a first plurality of user client devices to the first page and a second plurality of user client devices to the second page. In some implementations, the request to modify the first zone structure is provided in response to at least one interaction at the graphical user interface. In some implementations, the hierarchical data structure comprises layout instructions for each page of at least one page. In some implementations, the system can generate the data for rendering the first interface element within the first zone structure of the first page based on the layout instructions. In some implementations, the system can receive, from the operator device, a reordering request specifying a change to an order of at least one content object defined within a second zone structure of at least one zone structure. In some implementations, the system can update the hierarchical data structure based on the reordering request.

At least one other aspect relates to a method. The method can be performed, for example, by one or more processors coupled to non-transitory memory. The method can include maintaining a hierarchical data structure for rendering at least one page, the hierarchical data structure identifying at least one zone structure associated with at least one page, each zone structure of at least one zone structure associated with one or more content objects. The method can include providing, to an operator device, a graphical user interface to facilitate modification of the hierarchical data structure for rendering at least one page. The method can include receiving, from the operator device, a request to modify a first zone structure of at least one zone structure, the request comprising a first identifier of a first interface element to be presented in the first zone structure, the first interface element representing a first conditional event. The method can include updating the hierarchical data structure to associate the first identifier of the first interface element with the first zone structure, such that the first interface element is to be presented within a graphical representation of the first zone structure. The method can include receiving, from a user client device, an access request for a first page of at least one page identifying the first zone structure. The method can include generating, based on the hierarchical data structure, a response to the access request including data for rendering the first interface element within the graphical representation of the first zone structure of the first page. The method can include transmitting the response to cause presentation of the first page via an application executing on the user client device, such that presentation of the first page includes the graphical representation of the first zone structure and the first interface element representing the first conditional event.

In some implementations, the method can include receiving a second access request for a second page of at least one page that includes the first zone structure. In some implementations, the method can include transmitting, based on the hierarchical data structure, a second response to the second access request including second data for rendering the first interface element within the first zone structure of the second page. In some implementations, the hierarchical data structure identifies at least one page templates, wherein the hierarchical data structure defines a first page template for a subset of at least one page having a first category of at least one categories. In some implementations, the method can include receiving a second access request for a second page of the subset. In some implementations, the method can include generating, based on the hierarchical data structure, a second response to the second access request including data for rendering the second page according to display instructions of the first page template. In some implementations, the method can include transmitting the second response to cause presentation of the second page in response to the second access request. In some implementations, the method can include receiving, from the operator device, a second request to create a second page to be included in the subset. In some implementations, the method can include updating, based on the second request, the hierarchical data structure to include the second page and to associate the second page with the first page template, such that the second page is rendered according to display instructions of the first page template.

In some implementations, the method can include receiving, from the operator device, a second request to generate a variant of the first page, the variant corresponding to a modification to the first page. In some implementations, the method can include updating, based on the second request, the hierarchical data structure to include a second page generated according to the modification for first page. In some implementations, the method can include assigning a first plurality of user client devices to the first page and a second plurality of user client devices to the second page. In some implementations, the request to modify the first zone structure is provided in response to at least one interaction at the graphical user interface. In some implementations, the hierarchical data structure comprises layout instructions for each page of at least one page. In some implementations, the method can include generating the data for rendering the first interface element within the first zone structure of the first page based on the layout instructions. In some implementations, the method can include receiving, from the operator device, a reordering request specifying a change to an order of at least one content object defined within a second zone structure of at least one zone structure. In some implementations, the method can include updating the hierarchical data structure based on the reordering request.

At least one other aspect relates to a system. The system can include one or more processors coupled to non-transitory memory. The system can maintain a hierarchical data structure for rendering at least one page, the hierarchical data structure identifying at least one zone structure associated with at least one page, each zone structure of at least one zone structure associated with one or more respective content objects. The system can maintain at least one player profiles for at least one players, each player profile of at least one player profiles comprising historical interaction data and a set of attributes. The system can provide, to an operator device, a graphical user interface to facilitate modification of the hierarchical data structure. The system can receive, from the operator device, a request to modify a first page of at least one page, the request comprising (i) a selection of a first set of zone structures of at least one zone structure to be presented within the first page, and (ii) an indication that a layout of the first page is to be dynamically determined. The system can update the hierarchical data structure according to the request to modify the first page. The system can receive, from a user client device associated with a first player profile of at least one player profiles, an access request for the first page. The system can, responsive to the access request, determine, based on the hierarchical data structure, that the first page has the indication that the layout of the first page is to be dynamically determined. The system can, in response to determining that the layout of the first page is to be dynamically determined based on the hierarchical data structure, generate layout data for the first page based on the historical interaction data and the set of attributes of the first player profile. The system can generate, based on the hierarchical data structure and the layout data, a response to the access request including data for rendering the first page according to the layout data. The system can transmit the response to cause presentation of the first page via an application executing on the user client device, such that the first page is presented with a graphical representation of the first set of zone structures arranged according to the layout data.

In some implementations, the layout data for the first page comprises (i) an ordering of the first set of zone structures within the first page, or (ii) a selection of a subset of the first set of zone structures to be presented within the first page. In some implementations, the layout data for the first page further specifies, for at least a first zone structure of the first set of zone structures, an ordering of the one or more respective content objects associated with the first zone structure. In some implementations, the system can generate the response to the access request such that the one or more respective content objects associated with the first zone structure are presented in the graphical user interface according to the ordering specified by the layout data. In some implementations, each zone structure of the first set of zone structures is presented as a tab within the first page. In some implementations, the system can select, based on the historical interaction data of the first player profile, a first subset of content objects from of the one or more respective content objects of at least one zone structure of the first set of zone structures.

In some implementations, the system can generate the layout data for the first page based on a number of interactions indicated in the historical interaction data of the first player profile. In some implementations, the system can determine, based on the historical interaction data of the first player profile, one or more categories of content objects. In some implementations, the system can generate the layout data to present one or more content objects associated with the one or more categories within the first page. In some implementations, the system can receive an interaction associated with the first player profile. In some implementations, the system can update the historical interaction data of the first player profile based on the interaction to generate updated historical interaction data. In some implementations, the system can generate updated layout data for a subsequent access request for the first page from the user client device based on the updated historical interaction data. In some implementations, the system can determine, based on the set of attributes of the first player profile, that at least one zone structure is to be restricted from presentation. In some implementations, the system can generate the layout data to restriction presentation of the at least one zone structure.

At least one other aspect relates to a method. The method can be performed, for example, by one or more processors coupled to non-transitory memory. The method can include maintaining a hierarchical data structure for rendering at least one page, the hierarchical data structure identifying at least one zone structure associated with at least one page, each zone structure of at least one zone structure associated with one or more respective content objects. The method can include maintaining at least one player profiles for at least one players, each player profile of at least one player profiles comprising historical interaction data and a set of attributes. The method can include providing, to an operator device, a graphical user interface to facilitate modification of the hierarchical data structure. The method can include receiving, from the operator device, a request to modify a first page of at least one page, the request comprising (i) a selection of a first set of zone structures of at least one zone structure to be presented within the first page, and (ii) an indication that a layout of the first page is to be dynamically determined. The method can include updating the hierarchical data structure according to the request to modify the first page. The method can include receiving, from a user client device associated with a first player profile of at least one player profiles, an access request for the first page. The method can include, responsive to the access request, determining, based on the hierarchical data structure, that the first page has the indication that the layout of the first page is to be dynamically determined. The method can include, in response to determining that the layout of the first page is to be dynamically determined based on the hierarchical data structure, generating layout data for the first page based on the historical interaction data and the set of attributes of the first player profile. The method can include generating, based on the hierarchical data structure and the layout data, a response to the access request including data for rendering the first page according to the layout data. The method can include transmitting the response to cause presentation of the first page via an application executing on the user client device, such that the first page is presented with a graphical representation of the first set of zone structures arranged according to the layout data.

In some implementations, the layout data for the first page comprises (i) an ordering of the first set of zone structures within the first page, or (ii) a selection of a subset of the first set of zone structures to be presented within the first page. In some implementations, the layout data for the first page further specifies, for at least a first zone structure of the first set of zone structures, an ordering of the one or more respective content objects associated with the first zone structure. In some implementations, the method can include generating the response to the access request such that the one or more respective content objects associated with the first zone structure are presented in the graphical user interface according to the ordering specified by the layout data. In some implementations, each zone structure of the first set of zone structures is presented as a tab within the first page. In some implementations, the method can include selecting, based on the historical interaction data of the first player profile, a first subset of content objects from of the one or more respective content objects of at least one zone structure of the first set of zone structures.

In some implementations, the method can include generating the layout data for the first page based on a number of interactions indicated in the historical interaction data of the first player profile. In some implementations, the method can include determining, based on the historical interaction data of the first player profile, one or more categories of content objects. In some implementations, the method can include generating the layout data to present one or more content objects associated with the one or more categories within the first page. In some implementations, the method can include receiving an interaction associated with the first player profile. In some implementations, the method can include updating the historical interaction data of the first player profile based on the interaction to generate updated historical interaction data. In some implementations, the method can include generating updated layout data for a subsequent access request for the first page from the user client device based on the updated historical interaction data. In some implementations, the method can include determining, based on the set of attributes of the first player profile, that at least one zone structure is to be restricted from presentation. In some implementations, the method can include generating the layout data to restriction presentation of the at least one zone structure.

At least one other aspect relates to a system. The system can include one or more processors coupled to non-transitory memory. The system can maintain a hierarchical data structure for rendering at least one page, the hierarchical data structure identifying at least one zone structure associated with at least one page, each zone structure of at least one zone structure associated with one or more respective content objects. The system can receive, from an operator device, a request to modify a first zone structure of at least one zone structure, the request comprising visibility data specifying availability criteria for presentation of the first zone structure. The system can update the hierarchical data structure according to the request to modify the first zone structure to associate the visibility data with the first zone structure. The system can receive a first access request for a first page of at least one page that includes the first zone structure, the first access request corresponding to a first availability criteria after the availability criteria are not satisfied. The system can generate, based on the hierarchical data structure and the visibility data, a first response to the first access request including data for rendering the first page without a graphical representation of the first zone structure. The system can transmit the first response to cause presentation of the first page, such that the first page is presented without the first zone structure. The system can receive a second access request for the first page, the second access request corresponding to a second availability criteria after the availability criteria are satisfied. The system can generate, based on the hierarchical data structure and the visibility data, a second response to the second access request including data for rendering the first page with the graphical representation of the first zone structure. The system can transmit the second response to cause presentation of the first page, such that the first page is presented with the graphical representation of the first zone structure at the second availability criteria in according to the visibility data.

In some implementations, the availability criteria comprises a time criteria specifying at least one of (i) a start time at which the first zone structure becomes available for presentation or (ii) an end time at which the first zone structure becomes unavailable for presentation. In some implementations, the availability criteria comprises location criteria. In some implementations, the system can determine, based on location data associated with a user client device, satisfaction of the location criteria. In some implementations, the system can generate the first response or the second response based on satisfaction of the location criteria. In some implementations, the system can receive, from one or more external computing systems, an availability message indicating availability of content associated with the first zone structure. In some implementations, the system can determine satisfaction of the availability criteria based on the availability message. In some implementations, the system can receive, from the operator device, schedule data defining one or more availability periods for presentation of one or more wager opportunities associated with the first zone structure.

In some implementations, the system can determine satisfaction of the availability criteria by comparing a receipt time of the first access request or the second access request to the one or more availability periods defined by the schedule data. In some implementations, the schedule data defines a recurring schedule for the one or more availability periods. In some implementations, the system can determine satisfaction of the availability criteria based on comparing the receipt time of the first access request or the second access request to the recurring schedule. In some implementations, the system can receive, from the operator device, an availability rule for evaluating the availability criteria. In some implementations, the system can store the availability rule as at least part of the visibility data associated with the first zone structure. In some implementations, the system can store, in the hierarchical data structure and in association with the first zone structure, an availability status indicating availability of the first zone structure for presentation, the availability status generated based on the availability criteria. In some implementations, the system can update the availability status responsive to receiving an availability message. In some implementations, the system can provide, to the operator device, an operator interface that indicates a user-facing status of the first zone structure based on the availability criteria.

At least one other aspect relates to a method. The method can be performed, for example, by one or more processors coupled to non-transitory memory. The method can include maintaining a hierarchical data structure for rendering at least one page, the hierarchical data structure identifying at least one zone structure associated with at least one page, each zone structure of at least one zone structure associated with one or more respective content objects. The method can include receiving, from an operator device, a request to modify a first zone structure of at least one zone structure, the request comprising visibility data specifying availability criteria for presentation of the first zone structure. The method can include updating the hierarchical data structure according to the request to modify the first zone structure to associate the visibility data with the first zone structure. The method can include receiving a first access request for a first page of at least one page that includes the first zone structure, the first access request corresponding to a first availability criteria after the availability criteria are not satisfied. The method can include generating, based on the hierarchical data structure and the visibility data, a first response to the first access request including data for rendering the first page without a graphical representation of the first zone structure. The method can include transmitting the first response to cause presentation of the first page, such that the first page is presented without the first zone structure. The method can include receiving a second access request for the first page, the second access request corresponding to a second availability criteria after the availability criteria are satisfied. The method can include generating, based on the hierarchical data structure and the visibility data, a second response to the second access request including data for rendering the first page with the graphical representation of the first zone structure. The method can include transmitting the second response to cause presentation of the first page, such that the first page is presented with the graphical representation of the first zone structure at the second availability criteria in according to the visibility data.

In some implementations, the availability criteria comprises a time criteria specifying at least one of (i) a start time at which the first zone structure becomes available for presentation or (ii) an end time at which the first zone structure becomes unavailable for presentation. In some implementations, the availability criteria comprises location criteria. In some implementations, the method can include determining, based on location data associated with a user client device, satisfaction of the location criteria. In some implementations, the method can include generating the first response or the second response based on satisfaction of the location criteria. In some implementations, the method can include receiving, from one or more external computing systems, an availability message indicating availability of content associated with the first zone structure. In some implementations, the method can include determining satisfaction of the availability criteria based on the availability message. In some implementations, the method can include receiving, from the operator device, schedule data defining one or more availability periods for presentation of one or more wager opportunities associated with the first zone structure.

In some implementations, the method can include determining satisfaction of the availability criteria by comparing a receipt time of the first access request or the second access request to the one or more availability periods defined by the schedule data. In some implementations, the schedule data defines a recurring schedule for the one or more availability periods. In some implementations, the method can include determining satisfaction of the availability criteria based on comparing the receipt time of the first access request or the second access request to the recurring schedule. In some implementations, the method can include receiving, from the operator device, an availability rule for evaluating the availability criteria. In some implementations, the method can include storing the availability rule as at least part of the visibility data associated with the first zone structure. In some implementations, the method can include storing, in the hierarchical data structure and in association with the first zone structure, an availability status indicating availability of the first zone structure for presentation, the availability status generated based on the availability criteria. In some implementations, the method can include updating the availability status responsive to receiving an availability message. In some implementations, the method can include providing, to the operator device, an operator interface that indicates a user-facing status of the first zone structure based on the availability criteria.

At least one other aspect relates to a system. The system can include one or more processors coupled to non-transitory memory. The system can maintain a hierarchical data structure for rendering at least one page, the hierarchical data structure identifying at least one zone structure associated with at least one page, each zone structure of at least one zone structure associated with one or more respective content objects. The system can receive, from an operator device, a request to update the hierarchical data structure to associate availability criteria with a set of sub-zone structures of a first zone structure of at least one zone structure, each sub-zone structure of the set of sub-zone structures associated with one or more respective content objects. The system can update the hierarchical data structure according to the request to modify the first zone structure to associate the availability criteria with the set of sub-zone structures. The system can receive an access request for a first page of at least one page that includes the first zone structure. The system can determine, based on the availability criteria of the hierarchical data structure and a receipt time of the request, that each of the set of sub-zone structures is unavailable for presentation within the first page. The system can generate, based on the hierarchical data structure and based on determining that each of the set of sub-zone structures is unavailable for presentation based on the availability criteria, a response to the access request including data for rendering the first page without graphical representations of (i) the set of sub-zone structures and (ii) the first zone structure. The system can transmit the response to cause presentation of the first page via an application executing on a user client device, such that the first page is presented without the first zone structure and without the set of sub-zone structures.

In some implementations, the system can generate layout data for rendering the first page. In some implementations, responsive to determining that each of the set of sub-zone structures is unavailable for presentation, the system can omit a layout position for the first zone structure from the layout data. In some implementations, the system can determine an availability status of the first zone structure based on respective availability status of the set of sub-zone structures, the availability status of the first zone structure indicating that the first zone structure is unavailable for presentation responsive to determining that each of the set of sub-zone structures is unavailable for presentation. In some implementations, the set of sub-zone structures comprises a second zone structure, the second zone structure including one or more additional zone structures. In some implementations, the system can determine a second availability status of the second zone structure based on respective availability statuses of the one or more additional zone structures. In some implementations, the system can receive a second access request for the first page. In some implementations, the system can determine, based on the availability criteria, that at least one sub-zone structure of the set of sub-zone structures is available for presentation.

In some implementations, the system can generate a second response to the second access request including data for rendering the first page with graphical representations of (i) the at least one available sub-zone structure of the set of sub-zone structures and (ii) the first zone structure. In some implementations, determining the availability status of the first zone structure comprises determining whether a number of available sub-zone structures of the set of sub-zone structures satisfies a threshold number for the first zone structure to be available for presentation. In some implementations, the system can store, in association with the hierarchical data structure, the availability status of the first zone structure and the respective availability statuses of the set of sub-zone structures. In some implementations, in response to detecting a change in an availability status of at least one sub-zone structure of the set of sub-zone structures, the system can update the availability status of the first zone structure stored in association with the hierarchical data structure. In some implementations, the system can receive, from the operator device, an availability rule indicating availability of the first zone structure is determined based on availability of the set of sub-zone structures. In some implementations, the system can store the availability rule in association with the hierarchical data structure. In some implementations, the system can omit, from the data for rendering the first page, navigation data identifying the first zone structure for selection within the first page.

At least one other aspect relates to a method. The method can be performed, for example, by one or more processors coupled to non-transitory memory. The method can include maintaining a hierarchical data structure for rendering at least one page, the hierarchical data structure identifying at least one zone structure associated with at least one page, each zone structure of at least one zone structure associated with one or more respective content objects. The method can include receiving, from an operator device, a request to update the hierarchical data structure to associate availability criteria with a set of sub-zone structures of a first zone structure of at least one zone structure, each sub-zone structure of the set of sub-zone structures associated with one or more respective content objects. The method can include updating the hierarchical data structure according to the request to modify the first zone structure to associate the availability criteria with the set of sub-zone structures. The method can include receiving an access request for a first page of at least one page that includes the first zone structure. The method can include determining, based on the availability criteria of the hierarchical data structure and a receipt time of the request, that each of the set of sub-zone structures is unavailable for presentation within the first page. The method can include generating, based on the hierarchical data structure and based on determining that each of the set of sub-zone structures is unavailable for presentation based on the availability criteria, a response to the access request including data for rendering the first page without graphical representations of (i) the set of sub-zone structures and (ii) the first zone structure. The method can include transmitting the response to cause presentation of the first page via an application executing on a user client device, such that the first page is presented without the first zone structure and without the set of sub-zone structures.

In some implementations, the method can include generating layout data for rendering the first page. In some implementations, responsive to determining that each of the set of sub-zone structures is unavailable for presentation, the method can include omitting a layout position for the first zone structure from the layout data. In some implementations, the method can include determining an availability status of the first zone structure based on respective availability status of the set of sub-zone structures, the availability status of the first zone structure indicating that the first zone structure is unavailable for presentation responsive to determining that each of the set of sub-zone structures is unavailable for presentation. In some implementations, the set of sub-zone structures comprises a second zone structure, the second zone structure including one or more additional zone structures. In some implementations, the method can include determining a second availability status of the second zone structure based on respective availability statuses of the one or more additional zone structures.

In some implementations, the method can include receiving a second access request for the first page. In some implementations, the method can include determining, based on the availability criteria, that at least one sub-zone structure of the set of sub-zone structures is available for presentation. In some implementations, the method can include generating a second response to the second access request including data for rendering the first page with graphical representations of (i) the at least one available sub-zone structure of the set of sub-zone structures and (ii) the first zone structure. In some implementations, determining the availability status of the first zone structure comprises determining whether a number of available sub-zone structures of the set of sub-zone structures satisfies a threshold number for the first zone structure to be available for presentation.

In some implementations, the method can include storing, in association with the hierarchical data structure, the availability status of the first zone structure and the respective availability statuses of the set of sub-zone structures. In some implementations, in response to detecting a change in an availability status of at least one sub-zone structure of the set of sub-zone structures, the method can include updating the availability status of the first zone structure stored in association with the hierarchical data structure. In some implementations, the method can include receiving, from the operator device, an availability rule indicating availability of the first zone structure is determined based on availability of the set of sub-zone structures. In some implementations, the method can include storing the availability rule in association with the hierarchical data structure. In some implementations, the method can include omitting, from the data for rendering the first page, navigation data identifying the first zone structure for selection within the first page.

At least one other aspect relates to a system. The system can include one or more processors coupled to non-transitory memory. The system can maintain a hierarchical data structure for rendering at least one page, the hierarchical data structure identifying at least one zone structure associated with at least one page, a first zone structure of at least one zone structure associated with a first content object, the first zone structure associated with a first zone structure identifier, the first content object associated with a first object identifier. The system can receive, from a first operator device, a first request to generate a first deep link to the first content object. The system can generate, in response to the first request, the first deep link comprising the first object identifier of the first content object. The system can receive, from a first client device, a first access request indicating that the first client device accessed the first deep link. The system can resolve, based on the first object identifier included in the first deep link and the hierarchical data structure, a first location of the first content object within the hierarchical data structure, the first location indicating at least a first page of at least one page. The system can generate, based on the hierarchical data structure and the first location of the first content object, a first response to the first access request including data for rendering the first page of at least one page comprising the first zone structure and the first content object. The system can transmit the first response to cause presentation of the first page via a first application executing on the first client device, such that the first page is presented with the first zone structure including the first content object.

In some implementations, the system can receive, from a second operator device, a second request to generate a second deep link to the first zone structure. In some implementations, the system can generate, in response to the second request, the second deep link comprising the first zone structure identifier of the first zone structure. In some implementations, the system can receive, from a second client device, a second access request indicating that the second client device accessed the second deep link. In some implementations, the system can resolve, based on the first zone structure identifier included in the first deep link and the hierarchical data structure, a second location of the first zone structure within the hierarchical data structure, the second location indicating at least the first page of at least one page. In some implementations, the system can generate, based on the hierarchical data structure and based on the second deep link, a second response to the second access request including data for rendering the first page of at least one page comprising the first zone structure and the first content object.

In some implementations, the system can transmit the second response to cause presentation of the first page via a second application executing on the second client device, such that the first page is presented with the first zone structure including the first content object. In some implementations, the first deep link comprises the first object identifier and omits a directory path corresponding to the first page, such that the first location of the first content object is determined using the first object identifier. In some implementations, the first object identifier comprises an alphanumeric string. In some implementations, the system can resolve the second location by traversing the hierarchical data structure, based on the first zone structure identifier of the second deep link, to identify a page identifier corresponding to the first page. In some implementations, the system can resolve the second location of the first zone structure by determining, based on the hierarchical data structure, (i) a page identifier corresponding to the first page and (ii) a location of the first zone structure within the first page.

In some implementations, the hierarchical data structure is updated following generation of the second deep link to change at least one of (i) the page identifier corresponding to the first page or (ii) the location of the first zone structure within the first page. In some implementations, the system can resolve the second location by determining, using the first zone structure identifier of the second deep link and the updated hierarchical data structure, an updated page identifier and an updated location of the first zone structure. In some implementations, the first access request includes a token associated with the first client device. In some implementations, the system can generate the first response to include data for presenting the first content object according to the token, the token indicating request context associated with the first client device. In some implementations, the system can store, in association with the hierarchical data structure, an association between the first object identifier and the first location of the first content object. In some implementations, responsive to determining that the hierarchical data structure lacks an association for the first object identifier, the system can generate a fallback response that omits data for rendering the first content object.

At least one other aspect relates to a method. The method can be performed, for example, by one or more processors coupled to non-transitory memory. The method can include maintaining a hierarchical data structure for rendering at least one page, the hierarchical data structure identifying at least one zone structure associated with at least one page, a first zone structure of at least one zone structure associated with a first content object, the first zone structure associated with a first zone structure identifier, the first content object associated with a first object identifier. The method can include receiving, from a first operator device, a first request to generate a first deep link to the first content object. The method can include generating, in response to the first request, the first deep link comprising the first object identifier of the first content object. The method can include receiving, from a first client device, a first access request indicating that the first client device accessed the first deep link. The method can include resolving, based on the first object identifier included in the first deep link and the hierarchical data structure, a first location of the first content object within the hierarchical data structure, the first location indicating at least a first page of at least one page. The method can include generating, based on the hierarchical data structure and the first location of the first content object, a first response to the first access request including data for rendering the first page of at least one page comprising the first zone structure and the first content object. The method can include transmitting the first response to cause presentation of the first page via a first application executing on the first client device, such that the first page is presented with the first zone structure including the first content object.

In some implementations, the method can include receiving, from a second operator device, a second request to generate a second deep link to the first zone structure. In some implementations, the method can include generating, in response to the second request, the second deep link comprising the first zone structure identifier of the first zone structure. In some implementations, the method can include receiving, from a second client device, a second access request indicating that the second client device accessed the second deep link. In some implementations, the method can include resolving, based on the first zone structure identifier included in the first deep link and the hierarchical data structure, a second location of the first zone structure within the hierarchical data structure, the second location indicating at least the first page of at least one page.

In some implementations, the method can include generating, based on the hierarchical data structure and based on the second deep link, a second response to the second access request including data for rendering the first page of at least one page comprising the first zone structure and the first content object. In some implementations, the method can include transmitting the second response to cause presentation of the first page via a second application executing on the second client device, such that the first page is presented with the first zone structure including the first content object. In some implementations, the first deep link comprises the first object identifier and omits a directory path corresponding to the first page, such that the first location of the first content object is determined using the first object identifier. In some implementations, the first object identifier comprises an alphanumeric string. In some implementations, the method can include resolving the second location by traversing the hierarchical data structure, based on the first zone structure identifier of the second deep link, to identify a page identifier corresponding to the first page. In some implementations, the method can include resolving the second location of the first zone structure by determining, based on the hierarchical data structure, (i) a page identifier corresponding to the first page and (ii) a location of the first zone structure within the first page.

In some implementations, the hierarchical data structure is updated following generation of the second deep link to change at least one of (i) the page identifier corresponding to the first page or (ii) the location of the first zone structure within the first page. In some implementations, the method can include resolving the second location by determining, using the first zone structure identifier of the second deep link and the updated hierarchical data structure, an updated page identifier and an updated location of the first zone structure. In some implementations, the first access request includes a token associated with the first client device. In some implementations, the method can include generating the first response to include data for presenting the first content object according to the token, the token indicating request context associated with the first client device. In some implementations, the method can include storing, in association with the hierarchical data structure, an association between the first object identifier and the first location of the first content object. In some implementations, responsive to determining that the hierarchical data structure lacks an association for the first object identifier, the method can include generating a fallback response that omits data for rendering the first content object.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful.

- Section A describes a network environment and computing environment to implement embodiments described herein.
- Section B describes systems and methods for dynamic construction of a graphical user interface for multi-platform systems.
- Section C describes systems and methods for construction of graphical user interfaces according to real-time data.
- Section D describes systems and methods for hierarchical presentation of graphical user interface elements.
- Section E describes systems and methods for dynamic presentation of graphical user interface elements
- Section F describes systems and methods for graphical element-specific deep links.

A. Computing and Network Environment

Figure 1A:
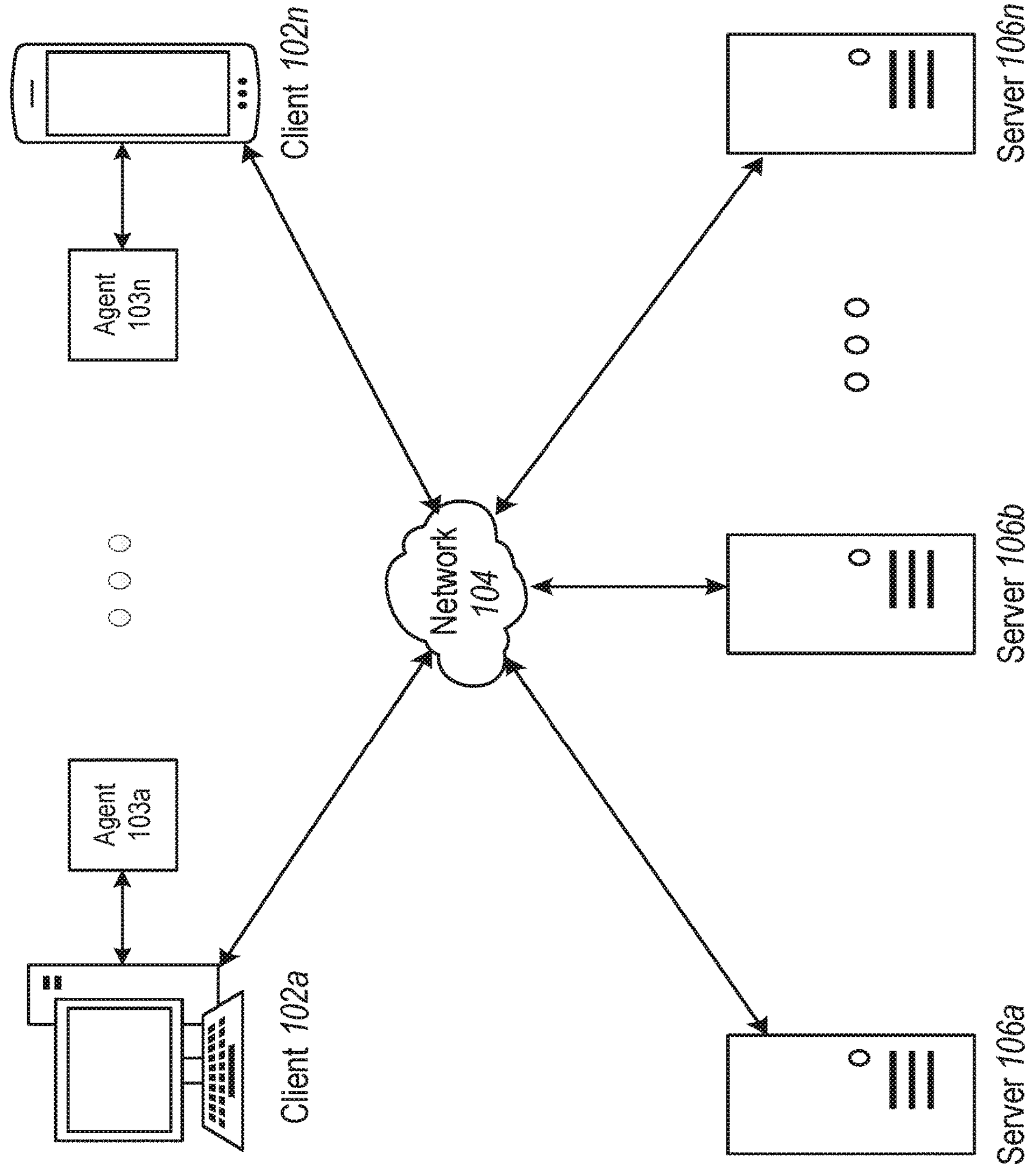
FIG. 1A is a block diagram depicting an embodiment of a network environment comprising a client device in communication with a server device.

Referring to FIG. 1A, an embodiment of a network environment is depicted for managing network communication sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 106 may be in the path between any two communicating servers.

Figure 1B:
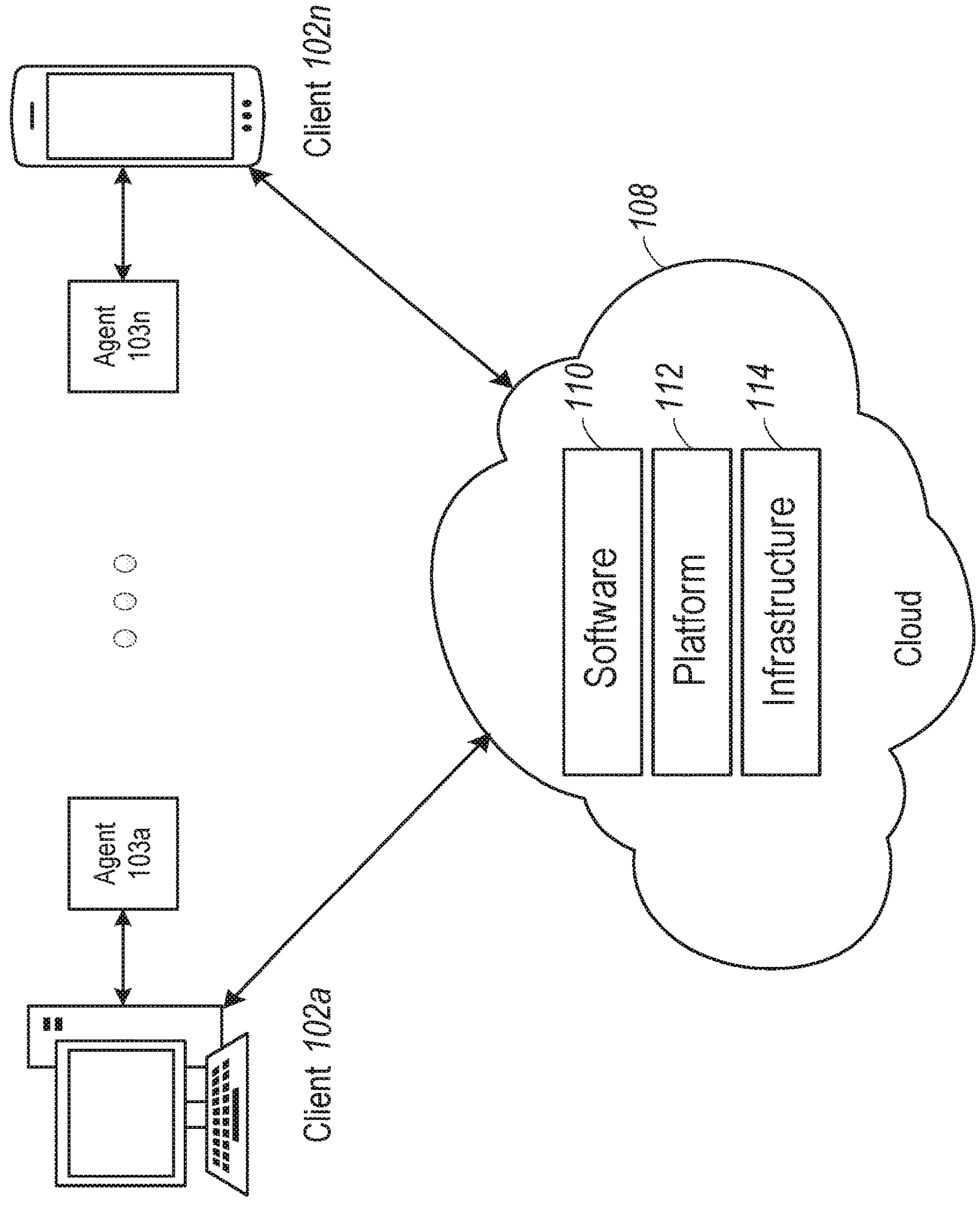
FIG. 1B is a block diagram depicting a cloud computing environment comprising a client device in communication with cloud service providers.

Referring to FIG. 1B, a cloud computing environment is depicted for managing network communication sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some embodiments, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
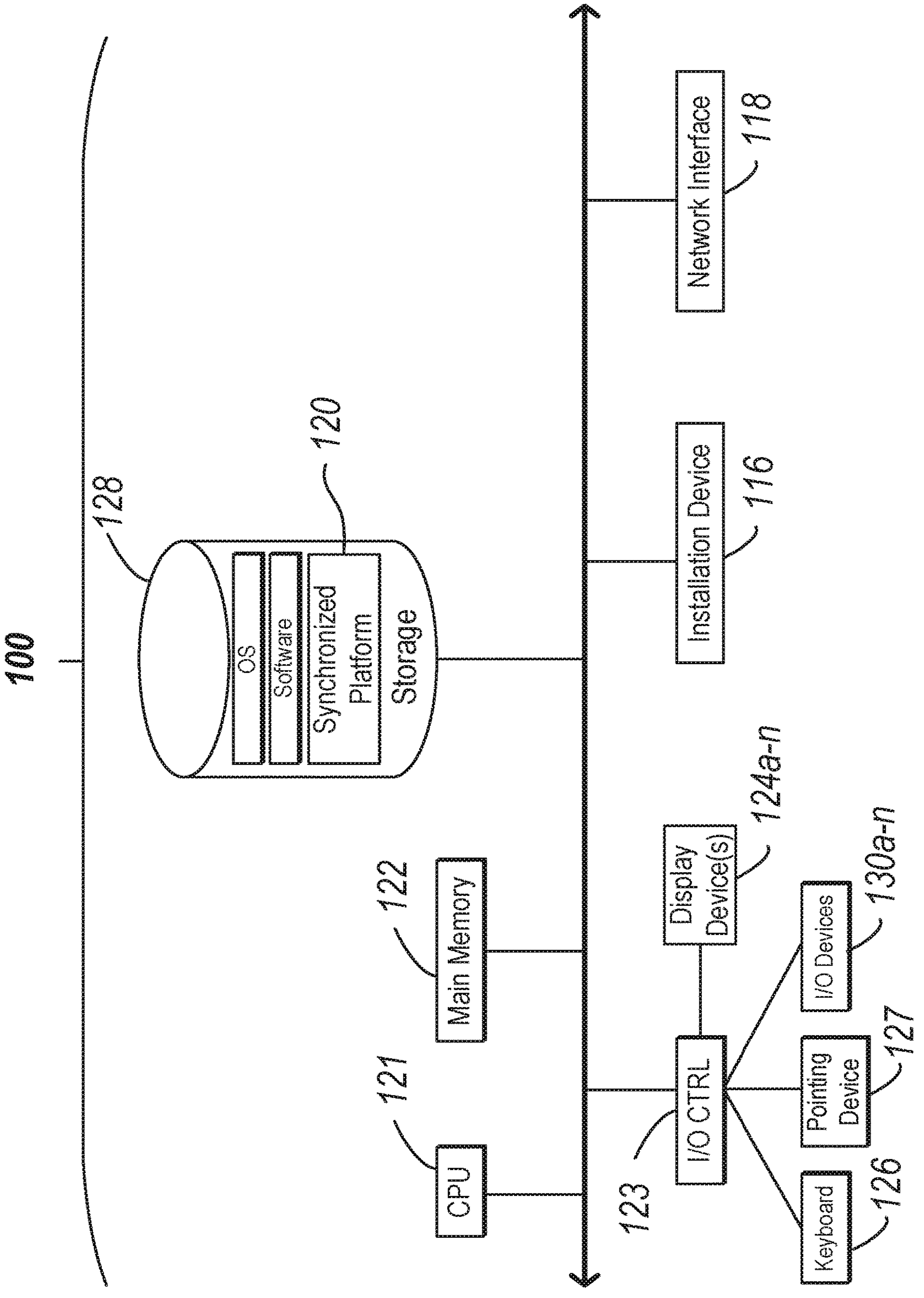
FIGS. 1C and 1D are block diagrams depicting embodiments of computing devices useful in connection with the methods and systems described herein.
Figure 1D:
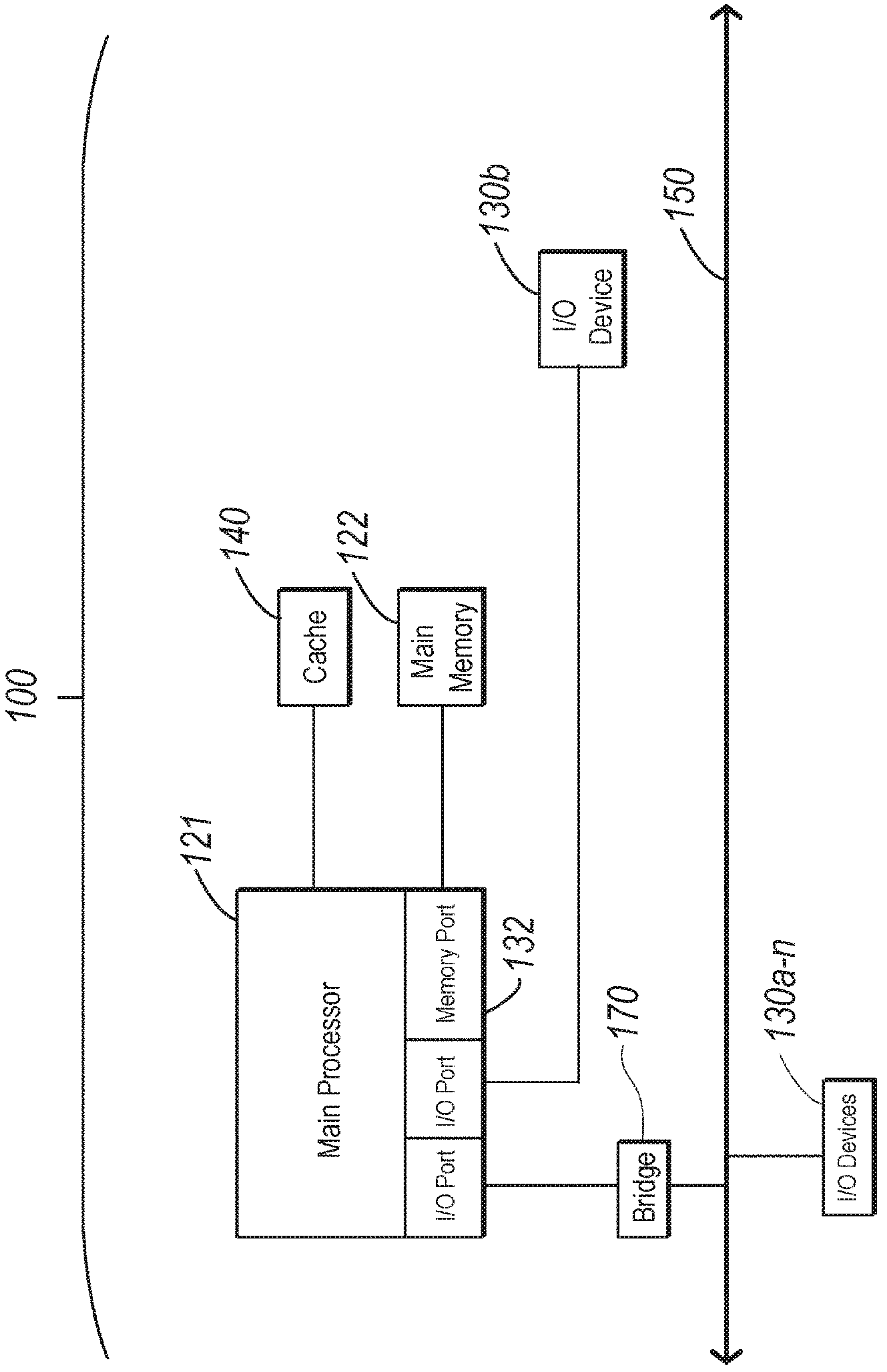

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an embodiment of the client 102 or a server 106, for managing network communication sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130*b* or other processors 121' via HYPERTRANSPORT, RAPIDIO, or INFINIBAND communications technology. FIG. 1D also depicts an embodiment in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some embodiments, display devices 124*a*-124*n* or the corresponding I/O controllers 123 may be controlled through or have hardware support for OPENGL or DIRECTX API or other graphics libraries.

In some embodiments, the computing device 100 may include or connect to multiple display devices 124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one embodiment, a video adapter may include multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices 100*a* or 100*b* connected to the computing device 100, via the network 104. In some embodiments software may be designed and constructed to use another computer's display device as a second display device 124*a* for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124*a*-124*n*.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients 102*a*-102*n* may access over a network 104. An application distribution platform 112 may include an application developed and provided by various developers. A user of a client device 102 may select, purchase, and/or download an application via the application distribution platform 112.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, NINTENDO SWITCH, NINTENDO SWITCH 2 device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc., of Seattle, Washington. In other embodiments, the computing device 100 is an eBook reader, e.g., the KINDLE family of devices by Amazon.com, or NOOK family of devices by Barnes & Noble, Inc., of New York City, New York.

In some embodiments, the communications device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g., a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Dynamic Construction of a Graphical User Interface for Networked Computer Environments This disclosure relates to techniques for dynamically constructing and rendering graphical user interfaces across multiple platforms using a data structure that associates configurable structural containers with pages. Content management approaches can be used to define, arrange, and present content to users across various digital platforms, such as mobile applications, web applications, and desktop applications. Operators of such platforms can define the structure of pages, including the arrangement of navigational elements, tabs, and content regions, and can associate content with the pages for presentation to users. A data structure can define the relationship between pages and content, such that the data structure can be used to render the pages in response to access requests from user client devices.

However, conventional approaches to constructing pages for online platforms can involve manual creation and maintenance of individual web pages in which content is placed at fixed locations within a static page structure. In such conventional approaches, each piece of content can reside in a single fixed location within the page, and the structure of the page can impose rigid relationships between categories, subcategories, and the content presented therein, such that placing the same content in multiple locations or on multiple pages can require duplicating the underlying data or performing additional engineering effort. In addition, conventional approaches can embed feature-specific rendering instructions directly into the code of individual pages, such that moving content from one page to another page can require re-implementation of the rendering instructions for the new page.

The page-specific embedding of rendering logic can prevent the reuse of content across different pages without additional development work. Furthermore, conventional approaches to page construction can lack a template-based management layer that allows a single template to govern a class of pages at a selectable level of granularity, such that operators can be required to create and maintain a separate page for each individual page instance rather than applying a shared template across a subset of pages. As a result, the construction of new pages under conventional approaches can require additional engineering resources to define page-level structure, content placement, and rendering behavior for each page, even when the new page shares a structural arrangement with existing pages. Conventional approaches can also lack the ability for operators to create and test alternative page configurations in parallel, such that evaluating a change to the ordering or selection of content within a page can require manual reconfiguration of the production page rather than comparison of multiple page variants served to different user populations.

The techniques described herein can provide a system and method for dynamically constructing graphical user interfaces using a hierarchical data structure in which zone structures serve as structural containers that can be associated with arbitrary combinations of content objects independent of a fixed category-to-subcategory mapping. The techniques described herein can decouple the structural layer of the CMS from the domain-specific layer, such that the structural layer can represent the arrangement of zone structures and content objects without requiring knowledge of a specific product domain. The techniques described herein can support the association of a single content object with multiple zone structures and multiple pages through identifier-based references within the hierarchical data structure, such that the content object can appear in different locations without duplication of the underlying data. The techniques described herein can also provide a hierarchical page-template management layer that allows operators to define a single template at a selected level of granularity and apply the template across a corresponding subset of pages, as well as a variant management layer that allows operators to create and test alternative page configurations by serving different page variants to different cohorts of user client devices.

To implement the techniques described herein, a data processing system can maintain a hierarchical data structure that identifies at least one zone structure associated with at least one page. Each zone structure can be associated with one or more content objects, and each content object can include metadata that specifies instructions for interfacing with external domain systems. The data processing system can provide, to an operator device, a graphical user interface that can facilitate modification of the hierarchical data structure, including the creation of zone structures, the placement of content objects within zone structures, and the definition of navigational elements such as tabs and subordinate navigation items. The hierarchical data structure can store identifier-based associations that link each content object to a zone structure, each zone structure to a page, and each zone structure to another zone structure as a child entry, such that the data processing system can dynamically construct a multi-level interface layout from the identifier-based associations without requiring each content object or zone structure to be recreated for each placement. The hierarchical data structure can define page templates at multiple levels of a category hierarchy, such as a sport level, a league level, and an event level, and the data processing system can determine which template applies to a given access request based on a specificity rule stored in the hierarchical data structure. The data processing system can also generate a variant of a page by duplicating the zone structures and content objects of the page and storing the variant in the hierarchical data structure, such that different cohorts of user client devices can be served different page variants for comparison of alternative content arrangements.

In doing so, the techniques described herein can address the limitations of conventional content management approaches by providing a reusable, product-agnostic structural layer that can support the placement of content objects on any page without requiring page-specific engineering work. The identifier-based association model can allow a single content object to be referenced by multiple zone structures and pages without data duplication, providing a technical improvement over conventional approaches in which each content object can reside in a single fixed location within the hierarchy. The hierarchical page-template management layer can reduce the computational and development resources associated with page creation, because a new page can inherit the zone structures, content objects, and layout instructions of a shared template without requiring separate definition of each page element. The variant management layer can allow operators to evaluate changes to page configurations by serving alternative page variants to different user populations, providing a technical improvement over conventional approaches that require manual reconfiguration of a production page to test a content arrangement change.

By virtue of the implementation of the techniques described herein, processing and memory resource consumption can be reduced by a system handling the construction and rendering of graphical user interfaces across multiple platforms. For example, a system can maintain a hierarchical data structure that stores identifier-based associations linking content objects to zone structures and zone structures to pages, such that a single content object can be referenced by multiple zone structures and pages without duplication of the underlying data in storage. By causing the system to maintain the hierarchical data structure identifying at least one zone structure associated with at least one page, update the hierarchical data structure to associate a first identifier of a first interface element with a first zone structure, and generate a response to an access request based on the hierarchical data structure including data for rendering the first interface element within the graphical representation of the first zone structure of the first page, the system can avoid redundant storage of content objects and redundant computation of page-specific rendering logic that would otherwise consume additional processor cycles and memory allocations under conventional approaches that embed feature-specific rendering instructions directly into the code of individual pages. As a result, overall processing and memory resource consumption can be reduced by the system, both by virtue of the identifier-based referencing model that eliminates data duplication across zone structures and pages and the reusable structural layer that allows the system to generate responses from a shared hierarchical data structure rather than maintaining and processing separate page definitions for each page instance.

In some examples, network communication overhead can be reduced by a system that serves configurable page structures from a centralized hierarchical data structure. For example, a system can apply a single page template across a subset of pages sharing a common category, such that access requests for any page within the subset can be served according to zone structures, content objects, and layout instructions referenced by the shared page template without transmitting separate page-definition payloads for each individual page. By causing the system to provide a graphical user interface to an operator device to facilitate modification of the hierarchical data structure for rendering at least one page, receive a request to modify a first zone structure comprising a first identifier of a first interface element, and transmit a response to cause presentation of the first page via an application executing on a user client device, the system can consolidate structural and content associations into the hierarchical data structure such that a modification performed once by an operator propagates to each page that references the modified zone structure without requiring separate network transactions to update each affected page. As a result, the volume of network communications between operator devices, the data processing system, and client devices can be reduced because the system transmits rendering data derived from shared associations in the hierarchical data structure rather than transmitting individually configured page payloads for each page and each operator modification.

In at least some examples, accuracy of rendered graphical user interfaces can be improved by a system that generates page responses from a centralized hierarchical data structure maintained in association with zone structures and content objects. For example, conventional approaches that embed rendering instructions and content placement logic within the code of individual pages can introduce inconsistencies when an operator modifies content in one page location but fails to propagate the modification to other pages that present the same content, resulting in divergent representations of the same content object across different pages. By causing the system to maintain the hierarchical data structure identifying at least one zone structure associated with at least one page, update the hierarchical data structure to associate the first identifier of the first interface element with the first zone structure, and generate a response to an access request based on the hierarchical data structure, the system can derive each page response from a single source of associations stored in the hierarchical data structure, such that each page referencing a given zone structure and content object presents a consistent and accurate representation of the content object without requiring separate synchronization of content across pages. As a result, the accuracy and consistency of rendered graphical user interfaces can be improved by the system because each access request is resolved against the current state of the hierarchical data structure rather than against independently maintained page-level configurations that can diverge over time.

In examples, the techniques described herein can reduce the chances of unauthorized actors exploiting deficiencies in systems that lack centralized structural and content management for graphical user interfaces. For example, conventional approaches that embed content placement and rendering logic within the code of individual pages can create inconsistent enforcement of access restrictions when content is manually duplicated across pages, because a restriction applied to content on one page can fail to be applied to the same content duplicated on a different page, exposing restricted content to unauthorized access. By causing the system to maintain a hierarchical data structure identifying at least one zone structure associated with at least one page, receive from an operator device a request to modify a first zone structure comprising a first identifier of a first interface element representing a first conditional event, update the hierarchical data structure to associate the first identifier with the first zone structure, and generate a response to an access request based on the hierarchical data structure, the system can enforce content associations and structural constraints from a single hierarchical data structure rather than relying on per-page logic that can be inconsistently applied, thereby reducing the surface area through which unauthorized actors can access content that should be restricted. As a result, the system can reduce the likelihood of exploitation of inconsistent content placement and rendering behaviors that can arise when content objects and structural associations are managed independently across individual pages rather than through a centralized hierarchical data structure.

Figure 2:
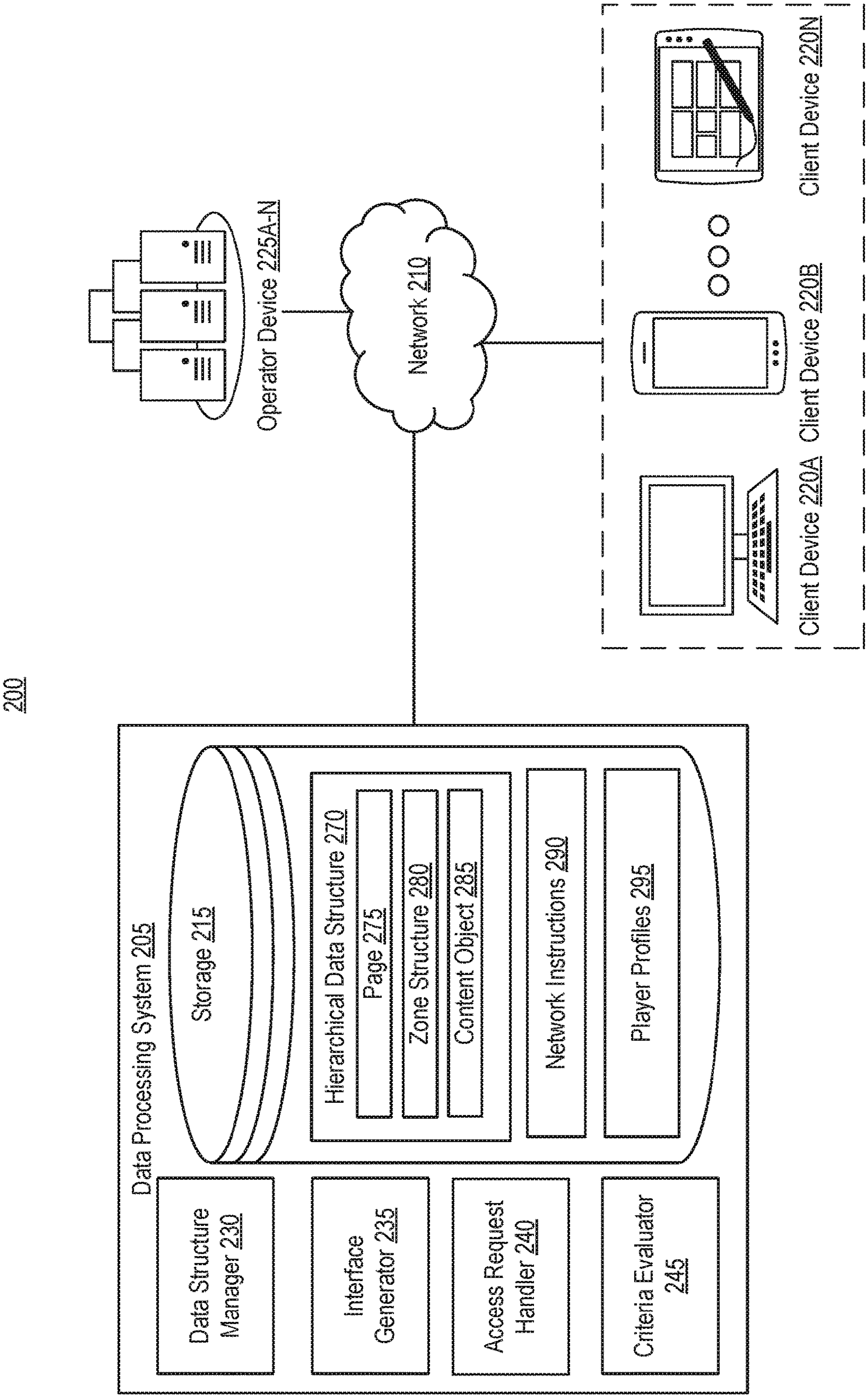
FIG. 2 is a block diagram of a system for dynamic construction of graphical user interfaces for multi-platform systems, in accordance with one or more implementations.

FIG. 2 is a block diagram of system 200 for dynamic construction of a graphical user interface. Each of the components (e.g., the data processing system 205, the network 210, storage 215, the client device 220, the operator device 225, the data structure manager 230, the interface generator 235, the access request handler 240, the criteria evaluator 245, the hierarchical data structure 270, the page 275, the zone structure 280, the content object 285, the network instructions 290, and components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The data processing system 205 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more client devices 220. The network 210 may be any form of computer network that can relay information between the data processing system 205, the one or more client devices 220, the one or more operator devices 225, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the data processing system 205, the one or more client devices 220, the one or more operator devices 225, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more client devices 220, the one or more operator devices 225, the server 106, the client computing system 102, the computing system 100, etc.) may also communicate wirelessly with the computing devices of the network 210 via a proxy device (e.g., a router, network switch, or gateway).

Each operator device 225A-N (referred to individually throughout as operator device 225 and collectively as operator devices 225) and each client device 220A-N (referred to individually throughout as client device 220 and collectively as client devices 220) can include at least one processor and a memory (e.g., a processing circuit). The memory can store executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. Each operator device 225 and each client device 220 can include one or more computing devices or servers that can perform various functions as described herein. Each operator device 225 and each client device 220 can include any or all of the components and perform any or all of the functions of the client computing system 102 or the computing system 100 described in connection with FIGS. 1A-1D, or any other computing system described herein. Each operator device 225 may execute one or more applications (e.g., web-based applications, native applications, etc.) to perform any of the operations described herein, and each client device 220 may execute one or more applications (e.g., web-based applications, native applications, etc.) to perform any of the operations described herein. The system 200 may include any number of operator devices 225 and any number of client devices 220 that may perform any of the operations described herein.

Each operator device 225 and each client device 220 can include, but is not limited to, a mobile device (e.g., a smartphone, tablet, etc.), a television device (e.g., smart television, set-top box, etc.), a personal computing device (e.g., a desktop, a laptop, etc.) or another type of computing device. Each operator device 225 and each client device 220 can be implemented using hardware or a combination of software and hardware. Each operator device 225 and each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces (e.g., graphical user interfaces described in connection with FIGS. 3A-3F, etc.), as described herein. The display of each operator device 225 can include a touch screen displaying an application, such as a content management application described herein. The display of each client device 220 can include a touch screen displaying an application, such as a client application described herein. The display can include a border region (e.g., side border, top border, bottom border).

In some implementations, the display can include a touch screen display, which can display graphical content. The display can receive interactions from an operator or a player. The interactions can result in interaction data, which can be stored and transmitted by the processing circuitry of the operator device 225 or the client device 220. The interaction data can include, for example, interaction coordinates, an interaction type (e.g., click, swipe, scroll, tap, etc.), and an indication of an actionable object with which the interaction occurred. Each operator device 225 and each client device 220 can include an input device that enables an operator or a player to interact with and/or select one or more actionable objects as described herein. For example, a touchscreen display can enable interaction with one or more visual indications provided through the display of each operator device 225 or each client device 220, and responsive to an interaction (e.g., select, click-on, touch, hover), the operator device 225 or the client device 220 can generate an indication identifying the interaction, the selection, or an indication of a command, among others. The touchscreen display can depict graphical elements representing an action query and generate an indication of the action chosen by the operator or the player. In some implementations, interactions received at the operator device 225 can cause the operator device 225 and/or an operator application executing thereon to transmit one or more requests to the data processing system 205 for modification of the hierarchical data structure 270, as described in further detail herein. In some implementations, interactions received at the client device 220 can cause the client device 220 and/or the application executing thereon to transmit one or more requests, messages, signals, or other data as described in detail herein.

Each operator device 225 can include a device identifier, which can be specific to each respective operator device 225. The device identifier can include a script, code, label, or marker that identifies a particular operator device 225. In some implementations, the device identifier can include a string or plurality of numbers, letters, characters, or any combination of numbers, letters, and characters. In some implementations, each operator device 225 can have a unique device identifier. Each operator device 225 can include a display and one or more input/output (I/O) devices (e.g., a mouse, a keyboard, a touchscreen, etc.) through which an operator can provide interactions to define navigational structures, place content objects 285 within zone structures 280, associate availability criteria with zone structures 280 and/or content objects 285, create experiment variants, and/or generate deep links to specific zone structures 280 and/or content objects 285 within the hierarchical data structure 270. Each operator device 225 can include an operator application that communicates with the data processing system 205 via the network 210 to transmit requests for modification of the hierarchical data structure 270 and to receive data for rendering an operator-facing graphical user interface (e.g., the content management system interfaces described in connection with FIGS. 3A-3F, etc.) that facilitates configuration of at least one page 275, at least one zone structure 280, and the one or more content objects 285. The data processing system 205 can receive the requests from the operator device 225 and update the hierarchical data structure 270 according to the received requests. In some implementations, the operator application can receive interaction data from the one or more I/O devices of the operator device 225 and can transmit the interaction data to the data processing system 205 to cause the data processing system 205 to update the hierarchical data structure 270 according to the interaction data. The system 200 may include any number of operator devices 225 that may perform any of the operations described herein, such that multiple operators can concurrently modify the hierarchical data structure 270 for different pages 275 and/or different zone structures 280 of at least one zone structure.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be an application that communicates with the data processing system 205 to receive data for rendering one or more pages 275 of at least one page. For example, the client application can transmit an access request for a page 275 to the data processing system 205 via the network 210 and receive, in response, data for rendering the page 275 including graphical representations of one or more zone structures 280 and one or more content objects 285 associated with the page 275 in the hierarchical data structure 270. The client application can render the page 275 by presenting the one or more zone structures 280 as navigational elements (e.g., tabs, pills, etc.) and presenting the one or more content objects 285 within the graphical representations of the respective zone structures 280.

In some implementations, the client application can suppress (e.g., omit, hide, remove from rendering, withhold from presentation, etc.) the graphical representation of a zone structure 280 from the rendered page 275 when the data received from the data processing system 205 indicates that the zone structure 280 is unavailable for presentation based on availability criteria evaluated by the criteria evaluator 245. In some implementations, the client application can receive data indicating a deep link to a specific zone structure 280 or content object 285 within the hierarchical data structure 270, and the client application can render the page 275 such that the specific zone structure 280 or content object 285 is presented to the user. In some implementations, the client application can receive layout data from the data processing system 205 that specifies an ordering of the one or more zone structures 280 within the page 275, and the client application can render the one or more zone structures 280 according to the ordering specified by the layout data. For example, the layout data can specify that a first zone structure 280 is to be presented before a second zone structure 280 within the page 275, and the client application can render the first zone structure 280 in a first position and the second zone structure 280 in a second position within the page 275. In some implementations, the client application can receive different page data based on an association between a player profile and the client device 220, such that the data processing system 205 can transmit data for rendering a variant of the page 275 to a first client device 220 and data for rendering a different variant of the page 275 to a second client device 220.

The application can include a web application, a server application, a resource, a desktop, or a file. In some implementations, the application can include a local application (e.g., local to an operator device 225 or a client device 220), hosted application, Software as a Service (SaaS) application, virtual application, mobile application, and/or other forms of content. In some implementations, the application can include or correspond to applications provided by remote servers or third-party servers. In some implementations, the application can access the hierarchical data structure 270, the one or more pages 275, the one or more zone structures 280, the one or more content objects 285, the network instructions 290, and/or any other information described herein. The application can generate one or more actionable objects (e.g., interactive user interface elements) described in connection with FIGS. 3A-3F, to an operator through an operator device 225 or a user (sometimes referred to herein as a "player") through a client device 220. Such actionable objects can include player-selectable hyperlinks, buttons, graphics, videos, images, or any other type of user interface element that generate a signal that is processed by the application executing on the respective operator device 225 or the respective client device 220.

In some implementations, one or more operator devices 225 and/or one or more client devices 220 can establish one or more network sessions with the data processing system 205. In some implementations, the one or more network sessions can each include a channel or connection between the data processing system 205 and the one or more operator devices 225 and/or the one or more client devices 220. In some implementations, the one or more operator devices 225 and/or the one or more client devices 220 can transmit a request to join a communication session of the network sessions. The network sessions can include the execution of a virtual application or web-based application, in which one or more operator devices 225 and/or one or more client devices 220 can interact via communications with the data processing system 205 according to protocol of the virtual or web-based application. The protocol of the virtual or web-based application can include, but are not limited to, rules and/or instructions associated with the virtual or web-based application (e.g., an interactive network application, an interactive game, etc.). The network session may be used to perform any of the operations described herein. Any of the operations of the virtual or web-based application may sometimes be executed by the operator device 225, by the client device 220, by the data processing system 205, or a combination thereof.

In some implementations, the one or more network sessions can be or include one or more application sessions (e.g., of the virtual or web-based application), an execution session, a desktop session, a hosted desktop session, a terminal services session, a browser session, a remote desktop session, a URL session and/or a remote application session, among others. Each network session can include encrypted and/or secure sessions, which can include an encrypted file, encrypted data or traffic. Each operator device 225A-N can use the network session established with the data processing system 205 to carry out any of the functionalities described herein. Each client device 220 can use the network session established with the data processing system 205 to carry out any of the functionalities described herein. For example, the application executing on each operator device 225 or each client device 220 can perform any of the client-side operations described herein, including displaying any of the user interfaces shown in FIGS. 3A-3F, or any other types of user interfaces described herein.

Each of the operator devices 225 and each of the client devices 220 can be computing devices that communicate via the network 210 to access information resources, such as web pages via a web browser, or application resources via a native application executing on an operator device 225 or a client device 220. When accessing information resources (e.g., instructions/assets for displaying/presenting, modifying, or otherwise navigating graphical user interface(s), etc.) the operator device 225 or the client device 220 can execute instructions (e.g., embedded in the native applications, in the information resources, etc.) that cause the operator device 225 and/or the client device 220 to display various application interfaces. The client devices 220 may present graphical user interfaces/application interfaces, generated according to the techniques described herein (e.g., generated as a function of the hierarchical data structure 270, which may be configured by one or more operator devices 225, etc.). The operator devices 225 may operate to present one or more of the user interfaces described in connection with FIGS. 3A-3F. In general, the graphical user interfaces may include various different types of interactive or non-interactive assets (e.g., images, video, animations, graphics, audio, etc.) that are presented to a player via the input/output interfaces of an operator device 225 and/or a client device 220.

In operation, the operator devices 225A-N can transmit requests to the data processing system 205 via the network 210 to define and/or modify the hierarchical data structure 270 for rendering at least one page 275. For example, an operator device 225 can transmit a request to the data processing system 205 to create a page 275, a zone structure 280 within a page 275 and/or another zone structure 280, to place a content object 285 within an existing zone structure 280 and/or page 275, to define a navigational element (e.g., a tab, a pill, a section header, etc.) within a page 275, to reorder content objects 285 within a zone structure 280, to associate availability criteria with a zone structure 280 and/or a content object 285, to generate a variant of a page 275 for experimentation, to generate a deep link to a zone structure 280 and/or a content object 285, and/or to create a reusable template comprising a predefined arrangement of zone structures 280 and content objects 285. The data processing system 205 can receive each request from the operator device 225 and can update the hierarchical data structure 270 according to the request, such that subsequent access requests from client devices 220 for a corresponding page 275 are served based on the updated hierarchical data structure 270.

In operation, the client devices 220 can transmit access requests to the data processing system 205 via the network 210 to retrieve data for rendering one or more pages 275 of a website or network application provided by the data processing system 205. For example, a client device 220 can transmit an access request for a first page 275, and the data processing system 205 can generate a response to the access request that includes data for rendering the first page 275 (e.g., including graphical representations of one or more zone structures 280 and one or more content objects 285 associated with the first page 275 derived from and/or associated with the hierarchical data structure 270, etc.). The client device 220 can receive the response and render the first page 275 by presenting the one or more zone structures 280 as navigational elements (e.g., tabs, pills, section headers, etc.) and presenting the one or more content objects 285 within the graphical representations of the respective zone structures 280. In some implementations, a player operating the client device 220 can provide interactions (e.g., tap, click, swipe, scroll, selection of a tab, selection of a pill, etc.) via an input device, and the client device 220 can transmit interaction data corresponding to the interactions to the data processing system 205 via the network 210. The data processing system 205 can receive the interaction data and generate a response that includes updated data for rendering the first page 275, such as data for rendering a different zone structure 280 selected by the player and/or data for rendering additional content objects 285 within a selected zone structure 280.

In some implementations, the client device 220 can transmit an access request that includes a deep link comprising a first object identifier of a first content object 285 and/or a first zone structure identifier of a first zone structure 280, and the data processing system 205 can resolve, based on the first object identifier and/or the first zone structure identifier and the hierarchical data structure 270, a location of the first content object 285 and/or the first zone structure 280 within the hierarchical data structure 270 to generate a response that includes data for rendering the corresponding page 275. In some implementations, the client device 220 can transmit an access request that includes a player profile identifier associated with a first player profile of at least one player profiles maintained by the data processing system 205, and the data processing system 205 can generate layout data for the requested page 275 based on historical interaction data and a set of attributes of the first player profile. In some implementations, the data processing system 205 can determine, based on availability criteria associated with one or more zone structures 280 and/or one or more content objects 285 in the hierarchical data structure 270, that a particular zone structure 280 and/or content object 285 is unavailable for presentation, and the response transmitted to the client device 220 can omit data for rendering the unavailable zone structure 280 and/or content object 285 from the page 275.

The data processing system 205 can include at least one storage 215. The storage 215 can be a computer-readable memory that can store or maintain any of the information described herein. The storage 215 can maintain one or more data structures, which can contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220 (e.g., via the user interface similar to that depicted in FIGS. 3A-3F, etc.), or any other computing devices described herein.

The storage 215 can include one or more player profiles 295. The player profiles 295 can include information associated with a user (sometimes referred to herein as a "player") of a client device 220. In some implementations, the player profiles 295 may sometimes be referred to as "player profiles 295". A player profile 295 of a player can be a user profile that includes information about the player and information about one or more of the client devices 220 used to access the data processing system 205 using the player profile 295. For example, identifiers of the player profile 295 can be used to access the functionality of the data processing system 205 (e.g., by logging into/accessing functionality of the data processing system 205 via one or more web-based interfaces). The identifiers can include a username, a password, an e-mail address, a phone number, a personal identification number (PIN), a secret code-word, device identifiers for use in a two-factor authentication technique, among others.

The player profile 295 can store information about placed wagers (e.g., selected wager opportunities) and fantasy sports listings that are provided/placed/selected by the player via requests transmitted to the data processing system 205. The player profile 295 can store any information about the player, including a credit balance, wager information (e.g., an amount of a wager/side wager, a timestamp associated with a wager/side wager, a client device identifier of a client device 220 that was used to place the wager/side wager, any other wager-related signals or values described herein, etc.). The player profile 295 can store information about a client device 220 used to access the data processing system 205 such as an IP address, a MAC address, a GUID, a player profile name (e.g., the name of a user of the client device 220, etc.), device name, among others. For example, the player profile 295 can store location information determined based on interactions between each client device 220 and the data processing system 205. In some implementations, the player profile 295 can be created by the data processing system 205 in response to the player profile creation request transmitted by a client device 220. The player profile creation request can include any of the player profile information described herein.

The player profiles 295 can store information related to fantasy sports activities, including representations of fantasy sports lineups in the form of lists, rosters, or other suitable data structures. In some implementations, the lists 285 can contain selections 287 that correspond to individual fantasy sports picks made by the player, such as athlete selections for various roster positions in a fantasy sports contest. The player profiles 295 can maintain historical records of past fantasy sports lineups, allowing players to review their previous selections and performance. In some implementations, the player profiles 295 can store additional metadata associated with each selection, such as athlete statistics at the time of selection, projected fantasy points, or salary cap values in salary-based contests. The player profiles 295 can also include information about the fantasy sports contests in which the player is participating, such as contest types, entry fees, prize structures, and current standings or points accumulated by the player's fantasy lineups.

The storage 215 can store hierarchical data structure 270. The hierarchical data structure 270 can define relationships between at least one page 275, at least one zone structure 280, and at least one content object 285 for rendering graphical user interfaces across one or more client device 220 platforms. Each page 275 of the hierarchical data structure 270 can correspond to a page type (e.g., a home page, an event page, a league page, a custom page, etc.) and can reference one or more zone structures 280 that define a structural arrangement of the page 275. In some implementations, the hierarchical data structure 270 can store, for each zone structure 280, a unique zone identifier (e.g., an alphanumeric string such as "1HCDC59," "HMMSQC8,"

"8G562TC," etc.) that can be used by the data processing system 205 to resolve access requests, generate deep links, and/or determine a location of the zone structure 280 within the hierarchical data structure 270. The hierarchical data structure 270 can facilitate modular construction of graphical user interfaces by storing associations between identifiers of content objects 285 and zone structures 280, associations between identifiers of zone structures 280 and pages 275, and/or associations between identifiers of zone structures 280 and other zone structures 280. For example, the data processing system 205 can associate an identifier of a first content object 285 with a first zone structure 280 and can associate the same identifier of the first content object 285 with a second zone structure 280, such that the first content object 285 appears within both the first zone structure 280 and the second zone structure 280 without duplication of the underlying content object 285. In some implementations, the data processing system 205 can associate an identifier of a zone structure 280 with multiple pages 275, and/or can associate an identifier of a zone structure 280 as a sub-zone structure within another zone structure 280, such that the same zone structure 280 and the content objects 285 referenced therein can be reused across different pages 275 and/or different nesting positions within the hierarchical data structure 270.

In some implementations, the hierarchical data structure 270 can store network instructions 290 that specify communication parameters and/or interface contracts for the data processing system 205 to use when interfacing with one or more computing systems (e.g., the data processing system 205, external computing systems, etc.) to obtain real-time availability information for at least one content object 285. The hierarchical data structure 270 can store layout instructions for each page 275, the layout instructions specifying an ordering of zone structures 280 within a page 275, a selection of zone structures 280 to present within the page 275, and/or visibility data specifying availability criteria for presentation of individual zone structures 280 and/or content objects 285.

The storage 215 can store at least one page 275 (referred to individually throughout as page 275 and collectively as pages 275) within the hierarchical data structure 270. Each page 275 can correspond to a page type (e.g. page 302*a-n* depicted in FIG. 3A) that defines a category of a graphical user interface to be rendered on a client device 220, such as a home page, an event page, a league page, a team page, a player page, and/or a custom page. Each page 275 can reference one or more zone structures 280 that define the structural arrangement of the corresponding page 275. The data processing system 205 can traverse the hierarchical data structure 270 from a page 275 to the referenced zone structure 280 and content object 285 to generate data for rendering the page 275 on the client device 220 in response to an access request from the client device 220. In some implementations, each page 275 can store a page identifier, a page type indicator, one or more references to zone structures 280, layout instructions specifying an ordering of the referenced zone structure 280, and/or an indication of whether the layout of the page 275 is to be determined dynamically based on player profile data. In some implementations, the hierarchical data structure 270 can define a page template that applies to a subset of page 275 sharing a common category, such as a single page template that applies to all league pages within a particular sport. For example, the hierarchical data structure 270 can define a first page template for all league pages associated with a first sport category (e.g., baseball), such that access requests for any league page within the sport category are served according to the zone structure 280 and content object 285 referenced by the first page template, without requiring a separate page 275 for each individual league. The data structure manager 230 can receive a request from an operator device 225 to create a page 275 at a more granular level, such as a page 275 for a specific league or a specific event, and can store the page 275 in the hierarchical data structure 270 such that the more granular page 275 overrides the page template for access requests that match the more granular page 275. In some implementations, each page 275 can store one or more references to experiment variant entries (e.g., as shown in interface 350 of FIG. 3F), each experiment variant entry corresponding to a modified version of the page 275 that can be served to a designated cohort of client devices 220 for A-B testing of page configurations.

Figure 3A:
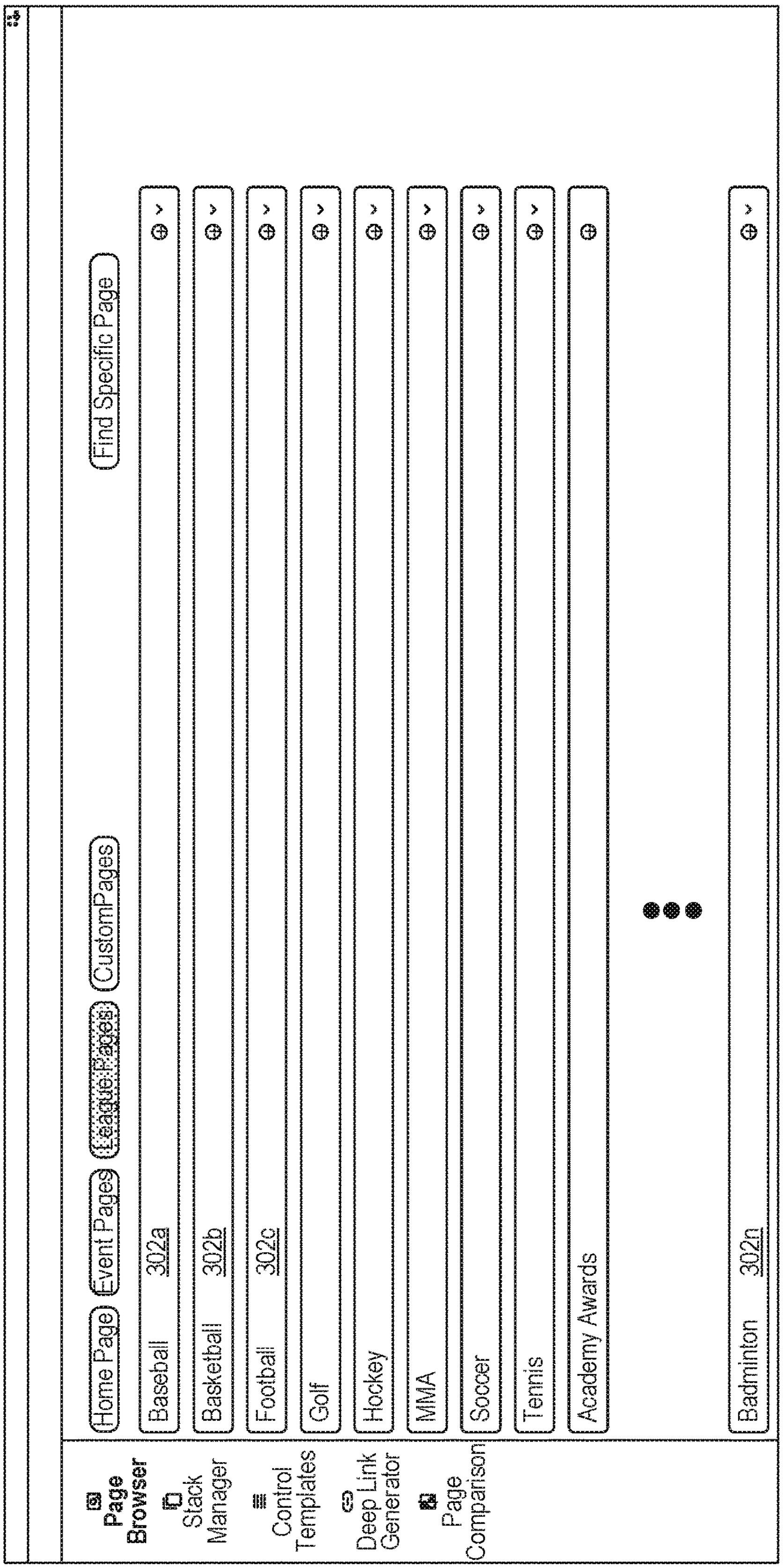
FIG. 3A is a graphical user interface (GUI) depicting at least one page, in accordance with one or more implementations.

Referring now to FIG. 3A in the context of the components described in connection with FIG. 2, illustrated is a graphical user interface (GUI) 300 of a content management system, in accordance with one or more implementations. The graphical user interface 300 can be rendered on an operator device 225A-N and can display a listing of pages 302*a-n* associated with the hierarchical data structure 270. The graphical user interface 300 can include a set of page type selectors (e.g., "Home Page," "Event Pages," "League Pages," "Custom Pages," etc.) that an operator can select to filter the listing of pages 302*a*—by page type. For example, when the "League Pages" selector is selected, the graphical user interface 300 can display a listing of page 302*a-n* corresponding to league pages organized by sport category (e.g., "Baseball," "Basketball," "Football," "Golf," "Hockey," "MMA," "Soccer," "Tennis," "Academy Awards," "Archery," "Aussie Rules," "Badminton," etc.). Each page 302*a-n* in the listing can correspond to a page 275 stored in the hierarchical data structure 270 and can be associated with one or more zone structures 280 and one or more content objects 285 that define the structural arrangement of the page 302*a-n.m* Each page 302*a-n* can include one or more actionable objects (e.g., an add icon, an expand/collapse icon, etc.) through which an operator can create a new page 302*a-n* within the sport category, view sub-pages (e.g., league-level pages within a sport category, event-level pages within a league category, etc.), and/or select the page 302*a-n* to view and modify the zone structures 280 and content objects 285 associated with the selected page 302*a-n* (e.g., via the content management system interface 310 depicted in FIG. 3B). In some implementations, an operator can select a page 302*a-n* from the listing to cause the operator device 225A-N to transmit a request to the data processing system 205 via the network 210 to retrieve the zone structures 280 and content objects 285 associated with the selected page 302*a-n* for display in the content management system interface 310.

Referring now back to FIG. 2, the storage 215 can store at least one zone structure 280 (referred to individually throughout as zone structure 280 and collectively as zone structures 280) within the hierarchical data structure 270. Each zone structure 280 can define a structural container within a page 275 that groups one or more content objects 285 and/or one or more sub-zone structures for presentation as a navigational element (e.g., a tab, a pill, a section header, etc.) within a graphical user interface (e.g., zone structure 312 in FIG. 3B) rendered on a client device 220. Each zone structure 280 can store a unique zone identifier (e.g., an alphanumeric string such as "1HCDC59," "HMMSQC8," "8G562TC," etc.) that the data processing system 205 can use to resolve deep links, determine a location of the zone structure 280 within the hierarchical data structure 270, and/or generate responses to access requests from client devices 220. In some implementations, a zone structure 280 can reference one or more child zone structures, such that the hierarchical data structure 270 encodes nested parent-child relationships at multiple depths within a single page 275. For example, a first zone structure 280 rendered as a tab within a page 275 can reference a second zone structure 280 rendered as a pill within the tab, and the second zone structure 280 can reference one or more content objects 285 that are presented within the pill (e.g., interface 330 depicted in FIG. 3D).

Figure 3B:
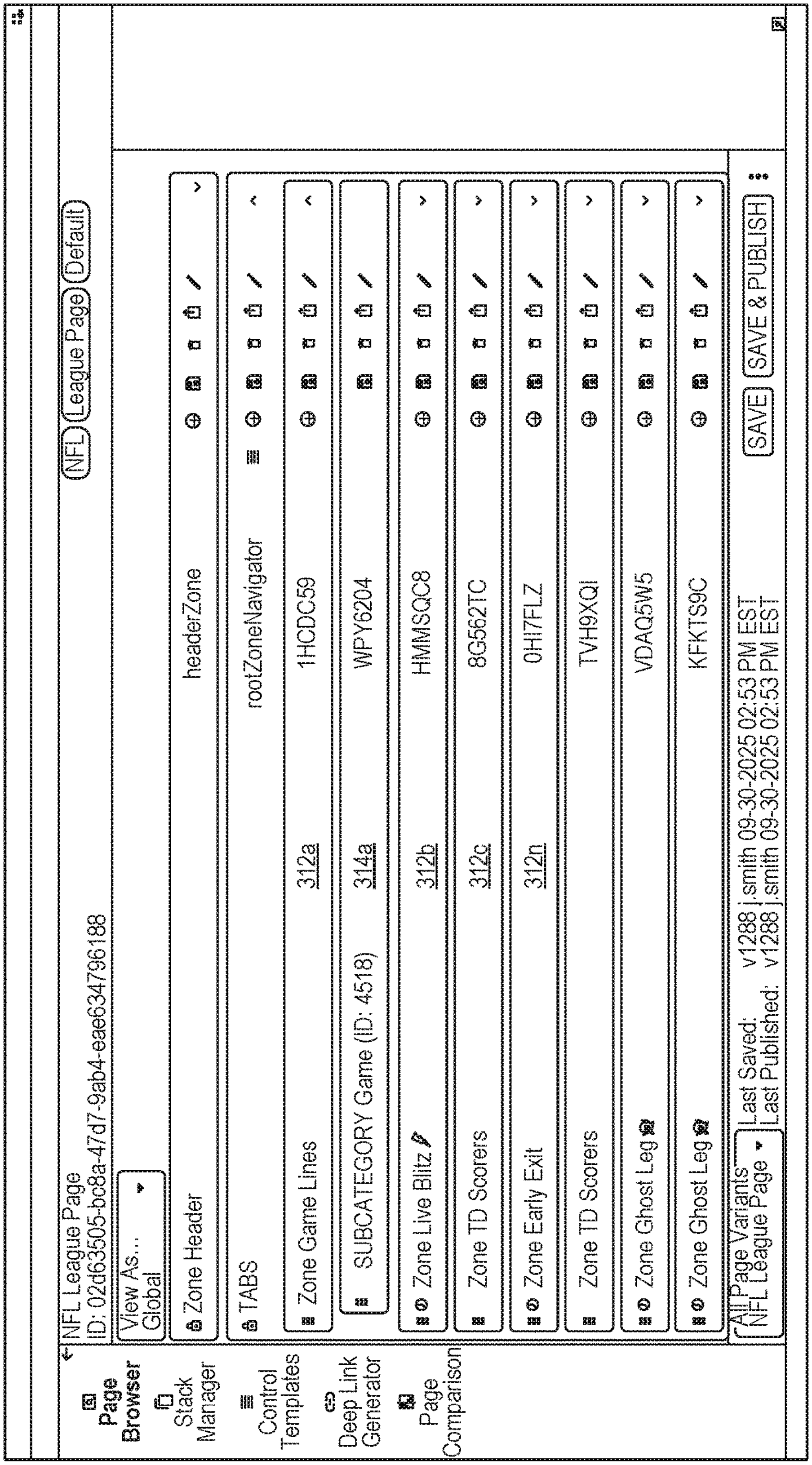
FIG. 3B is a GUI depicting an exemplary content management system, in accordance with one or more implementations.

Referring now to FIG. 3B in the context of the components described in connection with FIG. 2, illustrated is a graphical user interface (GUI) depicting a content management system interface 310 for a selected page of the hierarchical data structure 270, in accordance with one or more implementations. The content management system interface 310 can be rendered on an operator device 225A-N and can display zone structure 280 associated with a selected page 275 as an ordered listing. Each zone structure 280 can be displayed with a zone name and a unique zone identifier (e.g., an alphanumeric string such as "1HCDC59," "HMMSQC8," etc.). For example, the content management system interface 310 can display a first zone structure zone 312*a* labeled "Zone Game Lines" with a unique zone identifier "1HCDC59," a second zone structure zone 312*b* labeled "Zone Live Blitz" with a unique zone identifier "HMMSQC8," a third zone structure zone 312*c* labeled "Zone TD Scorers" with a unique zone identifier "8G562TC," and a fourth zone structure zone 312*n* labeled "Zone Early Exit" with a unique zone identifier "OHI7FLZ," among others. The first zone structure zone 312*a* can include a sub-zone structure 314*a* displayed as a content object 285. The sub-zone structure 314*a* can represent a market-driven content feature associated with a subcategory of wagering markets nested within the first zone structure zone 312*a*. Each zone structure 280 can be displayed with one or more actionable objects (e.g., add, copy, delete, edit, reorder, and/or expand/collapse icons, etc.) through which an operator can add, remove, reorder, and/or modify content object 285*s* within the zone structure 280. In some implementations, the ordering of the zone structure 280 displayed in the content management system interface 310 can correspond to the ordering in which the zone structure 280*s* are rendered as tabs, pills, and/or section headers within the page 275 on a client device 220A. A reordering operation performed by an operator via the actionable objects of the content management system interface 310 can cause the data structure manager 230 to update the layout instructions stored in the hierarchical data structure 270 to reflect the reordered arrangement.

Referring now back to FIG. 2, each zone structure 280 can store visibility data specifying availability criteria that the criteria evaluator 245 can evaluate to determine whether the zone structure 280 is available for presentation within a page 275 at a given time. In some implementations, the availability criteria associated with a zone structure 280 can include a time criteria specifying a start time and/or an end time, a location criteria specifying one or more geographic jurisdictions, and/or an availability rule that derives the availability of the zone structure 280 from the respective availability statuses of the child zone structures 280 and/or the child content objects 285 referenced by the zone structure 280 (e.g., interface 320 depicted in FIG. 3C). The data structure manager 230 can receive a modification input from an operator device 225 to add, remove, and/or reorder content objects 285 and/or sub-zone structures within a zone structure 280. The data structure manager 230 can update the hierarchical data structure 270 according to the modification input such that subsequent access requests from client devices 220 for a page 275 referencing the zone structure 280 are served based on the updated arrangement. In some implementations, the same zone structure 280 can be associated with multiple pages 275 in the hierarchical data structure 270, such that the data processing system 205 can render the zone structure 280 and the content objects 285 referenced therein on each of the multiple pages 275 without duplication of the zone structure 280 or the content object 285 in the storage 215.

The storage 215 can store at least one content object 285 (referred to individually throughout as content object 285 and collectively as content objects 285) within the hierarchical data structure 270. Each content object 285 can represent a feature (e.g., one or more graphical elements) to be presented to a user (e.g., a customer, a player, an account holder, an end user, a bettor, a platform visitor, etc.) via a client device 220, such as a market-driven content feature, an image content feature, a text content feature, and/or a cross-product content feature (e.g., a casino content feature, a racing content feature, etc.). Each content object 285 can store metadata that specifies instructions for determining the availability of the content represented by the content object 285. In some implementations, the content object 285 can store the metadata independently of the underlying content, such that the underlying content is provided by the data processing system 205 and/one or more external computing systems at the time of rendering.

For example, a content object 285 associated with a content type can store a category/subcategory identifier, one or more tags/filters, and/or parameters that the criteria evaluator 245 can use to interface with the data processing system 205 and/or one or more external computing systems (e.g., a trading system, a sports data feed, a market data feed, etc.) to determine whether the content associated with the content object 285 is available for presentation at a given time and/or to obtain data associated with such content objects 285 for presentation at one or more client devices 220. In some implementations, a content object 285 can store a contextual data indicator (e.g., a flag, a configuration parameter, etc.) that instructs the data processing system 205 to infer a content domain for the content object 285 from contextual information associated with the page 275 in which the content object 285 is referenced, such that an operator using the operator device 225 need not specify the content domain or content source when placing the content object 285 within a zone structure 280. For example, when a content object 285 storing a contextual data indicator is placed within a zone structure 280 of a page 275 associated with a particular league, the data processing system 205 can read the league association of the page 275 and determine the content domain for the content object 285 based on the league association, without necessarily requiring the operator to specify the league association in the metadata of the content object 285.

Figure 3C:
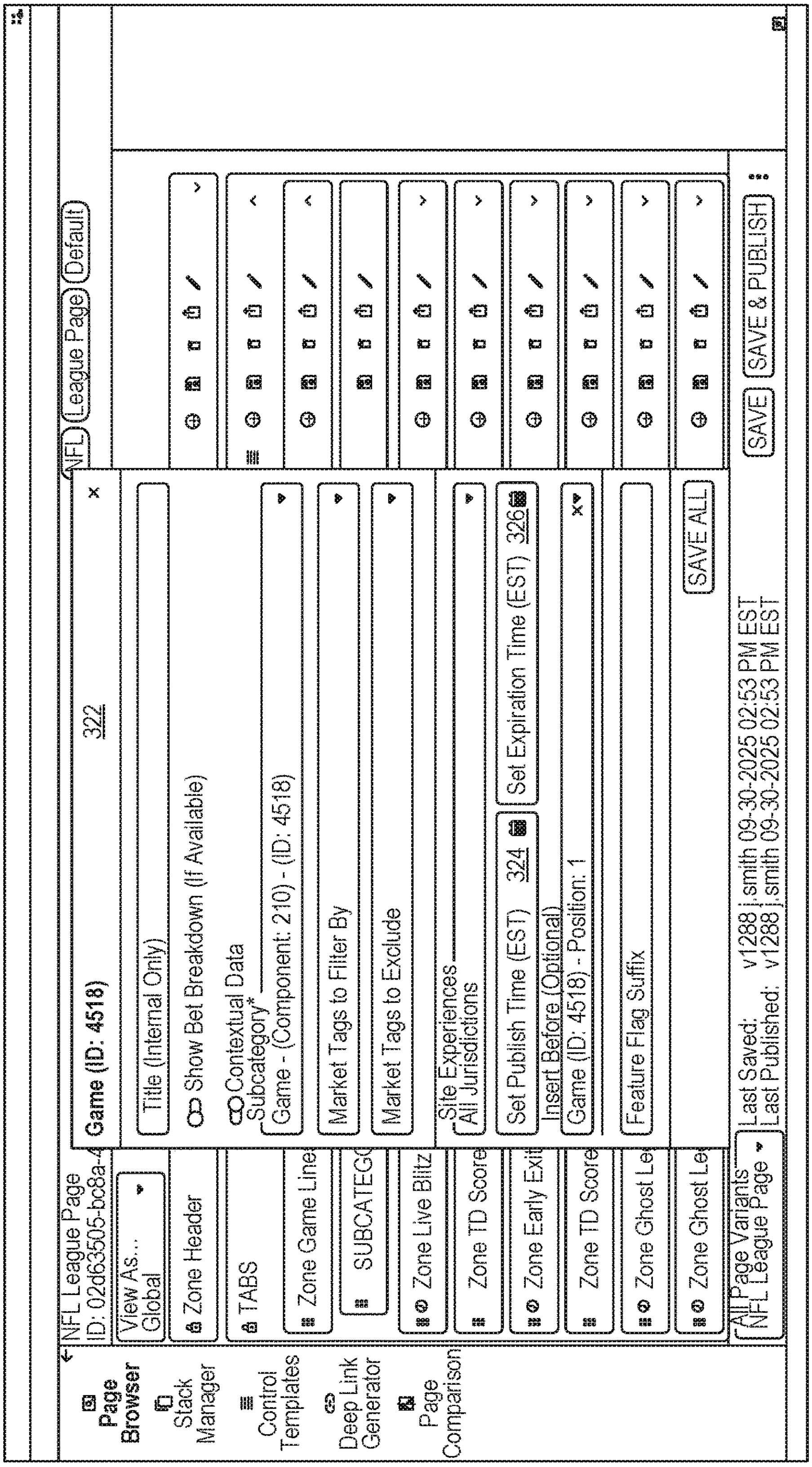
FIG. 3C is a GUI depicting an exemplary screen view of a content management system interface showing configuration of a content object, in accordance with one or more implementations.

In some implementations, a content object 285 can store a publish time 324 and/or an expiration time 326 (e.g., as depicted in FIG. 3C) that the criteria evaluator 245 can compare against a receipt time of an access request from a client device 220 to determine whether the content object 285 is within an active presentation window. Each content object 285 can store one or more market criteria that define a declarative availability evaluation for the content object 285, the one or more market criteria specifying elements of one or more external domain systems to be evaluated and a processing rule that yields a binary availability determination for the content object 285. In some implementations, a content object 285 of a text content type can store a pass-through market criteria that indicates the content object 285 is available for presentation when at least one adjacent content object 285 within the same zone structure 280 is determined to be available, such that the text content object 285 is suppressed from the rendered page 275 when no adjacent content object 285 has available content. The data structure manager 230 can associate a first content object 285 with a first zone structure 280 and can associate the same first content object 285 with a second zone structure 280, such that the first content object 285 can appear within both the first zone structure 280 and the second zone structure 280 on the same page 275 and/or on different pages 275 without duplication of the content object 285 in the storage 215.

The data processing system 205 can include a data structure manager 230. The data structure manager 230 can receive requests from one or more operator devices 225A-N via the network 210 and can update the hierarchical data structure 270 stored in the storage 215 according to the received requests. For example, the data structure manager 230 can receive a request from an operator device 225 to create a new zone structure 280 within a page 275, to associate a content object 285 with a zone structure 280, to reorder one or more content objects 285 within a zone structure 280, to remove a content object 285 from a zone structure 280, to associate availability criteria with a zone structure 280 and/or a content object 285, to generate an experiment variant of a page 275, store or update an identifier association for a zone structure 280 and/or a content object 285 to support generation of a deep link, and/or to associate a zone structure 280 with a page 275. The data structure manager 230 can modify one or more entries within the hierarchical data structure 270 to reflect each requested change, such that subsequent access requests from client devices 220 for a corresponding page 275 can be served based on the modified hierarchical data structure 270.

The data processing system 205 can include an interface generator 235. The interface generator 235 can generate data for rendering graphical user interfaces on one or more operator devices 225A-N and/or the one or more client devices 220A-N based on the hierarchical data structure 270 stored in the storage 215. For example, the interface generator 235 can generate data for rendering an operator-facing graphical user interface (e.g., the content management system GUIs described in connection with FIGS. 3A-3F, etc.) on an operator device 225 to facilitate modification of the hierarchical data structure 270, and/or can generate data for rendering a client-facing graphical user interface on a client device 220 that presents one or more zone structures 280 and one or more content objects 285 associated with a requested page 275. In some implementations, the interface generator 235 can generate the data for rendering based on layout instructions stored in the hierarchical data structure 270 for a given page 275, such that the graphical representations of the one or more zone structures 280 are arranged according to an ordering specified by the layout instructions.

The data processing system 205 can include an access request handler 240. The access request handler 240 can receive access requests from one or more client devices 220A-N via the network 210 and can generate responses to the access requests based on the hierarchical data structure 270 stored in the storage 215. For example, the access request handler 240 can receive an access request for a page 275 from a client device 220, traverse the hierarchical data structure 270 to identify the zone structures 280 and content objects 285 associated with the requested page 275, and generate a response that includes data for rendering the page 275 on the client device 220. In some implementations, the access request handler 240 can resolve an identifier included in the access request to a page 275, a zone structure 280, and/or a content object 285 represented in the hierarchical data structure 270, determine whether a variant or dynamically determined layout is applicable to the access request, and coordinate with the interface generator 235 and/or the criteria evaluator 245 to generate the response.

The data processing system 205 can include a criteria evaluator 245. The criteria evaluator 245 can evaluate availability criteria associated with one or more zone structures 280 and/or one or more content objects 285 stored in the hierarchical data structure 270 to determine whether each zone structure 280 and/or content object 285 is available for presentation within a page 275 at a given time. The criteria evaluator 245 can interface with one or more external computing systems via the network 210 to obtain real-time availability information (e.g., market data, sports data feed information, game state data, etc.) for use in the availability determination. In some implementations, the criteria evaluator 245 can additionally evaluate schedule data, recurring schedule data, location data, operator-defined availability rules, and/or availability states derived from child zone structures 280 and/or child content objects 285 represented in the hierarchical data structure 270. Based on the availability determination, the criteria evaluator 245 can generate an availability status for each evaluated zone structure 280 and/or content object 285, and the access request handler 240 and/or the interface generator 235 can use the availability status to determine whether to include or omit graphical representations of the evaluated zone structures 280 and/or content objects 285 from a response to an access request from a client device 220.

Referring now to the operations of the data processing system 205, in some implementations, the data processing system 205 can dynamically configure and construct one or more graphical user interfaces (GUIs) for multi-platform systems. The data processing system 205 can maintain the hierarchical data structure 270 in the storage 215 for rendering at least one page 275 across one or more client device 220 platforms. The hierarchical data structure 270 can identify at least one zone structure 280 associated with at least one page 275, and each zone structure 280 of at least one zone structure 280 can be associated with one or more content objects 285. The data structure manager 230 can store, update, and/or retrieve each zone structure 280 and each content object 285 within the hierarchical data structure 270 in the storage 215 in response to requests received from one or more operator devices 225A-N via the network 210. In some implementations, each zone structure 280 can reference one or more child zone structures 280 and/or one or more content objects 285, such that the hierarchical data structure 270 encodes parent-child relationships between zone structures 280 at multiple depths within a single page 275. For example, a first zone structure 280, rendered as a tab within a page 275 (e.g., corresponding to a National Women's Soccer League (NWSL) event page) can reference a second zone structure 280, rendered as a pill (e.g., labeled "Match Result") within the tab, and the second zone structure 280 can reference one or more content objects 285 representing wagering markets for match outcome selections (e.g., home win, draw, away win, etc.) that are presented within the pill on a client device 220. In some implementations, the hierarchical data structure 270 can generate rendering data for different client platforms by applying platform-specific rendering instructions while preserving the page, zone structure, and content object associations represented in the hierarchical data structure 270.

In some implementations, the hierarchical data structure 270 can facilitate modular construction of graphical user interfaces by storing identifier-based associations that link each content object 285 to a zone structure 280, each zone structure 280 to a page 275, and/or each zone structure 280 to another zone structure 280 as a child entry. For example, the data structure manager 230 can add an identifier of a content object 285 representing a category of player proposition markets to a first zone structure 280 rendered as a pill within a navigational container, add an identifier of the first zone structure 280 to a second zone structure 280 rendered as a tab within a page 275 as a nested child, and add an identifier of the second zone structure 280 to a page 275 corresponding to a league event page, such that the data processing system 205 can dynamically construct a multi-level interface layout from the identifier-based associations without requiring each content object 285 and/or zone structure 280 to be recreated for each placement. In some implementations, the data structure manager 230 can copy an association to a content object 285 to a different zone structure 280 by adding the identifier of the content object 285 to the different zone structure 280 without modifying the content object 285 itself in the storage 215. For example, the data structure manager 230 can add the identifier of a content object 285 representing "Anytime Touchdown Scorer" wagering markets to both a first zone structure 280 rendered as a "Touchdown Scorers" tab on a National Football League (NFL) league page 275 and a second zone structure 280 rendered as a "Featured Markets" tab on the same NFL league page 275, such that the "Anytime Touchdown Scorer" content object 285 appears within both tabs without duplication of the content object 285 in the storage 215. In some implementations, the data structure manager 230 can copy an association to a zone structure 280 to a different page 275 by adding the identifier of the zone structure 280 to the different page 275 in the hierarchical data structure 270, such that the same zone structure 280 and the content objects 285 referenced therein are rendered on each page 275 that references the identifier of the zone structure 280.

In some implementations, the interface generator 235 can generate data for rendering operator-facing graphical user interfaces on one or more operator devices 225A-N that present configurable views of the hierarchical data structure 270, including listings of pages 275, zone structures 280, and content objects 285 through which an operator can interact to modify the hierarchical data structure 270 via the operator device 225. For example, the interface generator 235 can provide, to an operator device 225, a graphical user interface to facilitate modification (e.g., addition, removal, reordering, or reconfiguration of various pages 275, zone structures 280, content objects 285, and/or any parameters thereof, etc.) of the hierarchical data structure 270 for rendering at least one page 275. In one example, the interface generator 235 can generate data for rendering an operator-facing graphical user interface on an operator device 225A-N that displays a listing of zone structures 280 associated with one or more pages 275 of the hierarchical data structure 270. Each displayed zone structure 280 can be presented with a zone name, a unique zone identifier (e.g., an alphanumeric string such as "1HCDC59," "HMMSQC8," etc.), and one or more actionable objects/interactive elements (e.g., an add button, a reorder handle, a delete button, an edit button, etc.) through which an operator can add, remove, reorder, and/or modify content objects 285 within the zone structure 280. The operator-facing graphical user interface can present representations of zone structures 280, content objects 285, navigational elements (e.g., tabs, pills, section headers, etc.), and/or page-level configuration parameters associated with a selected page 275 of the hierarchical data structure 270.

In some implementations, the interface generator 235 can generate the operator-facing graphical user interface to display a page browser interface (e.g., the interface 300 depicted in FIG. 3A) that presents a listing of pages 275 organized by page type (e.g., home page, event page, league page, custom page, etc.), such that an operator can select a page 275 from the listing to view and modify the zone structures 280 and content objects 285 associated with the selected page 275. For example, the interface generator 235 can generate data for rendering a content management system interface 310 (e.g., as depicted in FIG. 3B) that displays the zone structures 280 of a selected page 275 as an ordered listing, with each zone structure 280 displaying a zone name (e.g. zone game lines 312*a* in FIG. 3B), a unique zone identifier, and one or more actionable objects (e.g., buttons, icons, drag handles, etc.) through which the operator can add, remove, reorder, and/or modify content objects 285 within the zone structure 280. In some implementations, interactions with the operator-facing graphical user interface can cause the operator device 225A-N to transmit one or more modification requests identifying one or more pages 275, zone structures 280, and/or content objects 285 to be updated in the hierarchical data structure 270.

In some implementations, the access request handler 240 can receive modification requests from operator devices 225A-N that specify changes to the associations between zone structures 280 and content objects 285 within the hierarchical data structure 270, such as requests to add, remove, or reposition interface elements within a zone structure 280 via interactions at the operator-facing graphical user interface. For example, an operator can select an actionable object within the content management system interface 310 to associate a new content object 285 with a zone structure 280 rendered as a tab, and the operator device 225A-N can transmit a corresponding modification request to the data processing system 205 via the network 210. The data structure manager 230 can process each modification request by updating the identifier-based associations stored in the hierarchical data structure 270 in the storage 215, such that subsequent access requests from client devices 220 for a page 275 referencing the modified zone structure 280 are served based on the updated associations.

In some implementation, the access request handler 240 can receive, from one or more of the operator devices 225A-N via the network 210, a request to modify a first zone structure 280 of at least one zone structure 280 within the hierarchical data structure 270. The request can include a first identifier of a first interface element to be presented in the first zone structure 280, the first interface element representing a first conditional event (e.g., a wagering opportunity associated with a sporting event, a market-driven content feature, etc.). In some implementations, the first interface element can correspond to a content object 285 represented in the hierarchical data structure 270 or can be accessed by an identifier associated with the content object 285. The access request handler 240 can forward the request to the data structure manager 230, and the data structure manager 230 can update the hierarchical data structure 270 in the storage 215 to associate the first identifier of the first interface element with the first zone structure 280, such that the first interface element is to be presented within a graphical representation of the first zone structure 280 when the page 275 containing the first zone structure 280 is rendered on a client device 220. For example, the access request handler 240 can receive, from an operator device 225A-N via the network 210, a request to associate a first interface element representing a football wagering opportunity (e.g., a touchdown scorer market for a professional football league event, a game line spread for a scheduled football game, etc.) with a first zone structure 280 rendered as a tab within a league page 275.

In some implementations, and furthering the example above, the request can include a first identifier that uniquely identifies the first interface element within the hierarchical data structure 270. The data structure manager 230 can store the first identifier in association with the first zone structure 280 within the hierarchical data structure 270 in the storage 215, such that a subsequent traversal of the hierarchical data structure 270 from the page 275 to the first zone structure 280 yields the first identifier of the first interface element as a child content object 285 of the first zone structure 280. In some implementations, the request to modify the first zone structure 280 can be provided in response to at least one interaction at the operator-facing graphical user interface rendered on the operator device 225A-N. For example, an operator can select an actionable object within the content management system interface (e.g., 310) to associate a content object 285 representing a subcategory of wagering markets with a zone structure 280 rendered as a tab, and the operator device 225A-N can transmit the request to the data processing system 205 in response to the selection.

The access request handler 240 can receive access requests from one or more client devices 220A-N via the network 210 that identify one or more pages 275 within the hierarchical data structure 270, and can traverse the hierarchical data structure 270 to identify the zone structures 280 and content objects 285 associated with each requested page 275 for response generation. For example, the access request handler 240 can receive, from a client device 220 via the network 210, an access request for a first page 275 of at least one page 275 that identifies the first zone structure 280. The access request handler 240 can traverse the hierarchical data structure 270 in the storage 215 to identify the zone structures 280 and content objects 285 associated with the first page 275. To traverse the hierarchical data structure 270, the access request handler 240 can read a page identifier included in the access request and can locate a corresponding entry for the first page 275 within the hierarchical data structure 270 stored in the storage 215. The access request handler 240 can retrieve, from the located entry, one or more zone structure identifiers that reference zone structures 280 associated with the first page 275. For each zone structure identifier retrieved from the entry of the first page 275, the access request handler 240 can locate a corresponding zone structure 280 entry within the hierarchical data structure 270 and can retrieve the content object 285 identifiers and/or child zone structure 280 identifiers associated with the located zone structure 280 entry. The access request handler 240 can repeat the retrieval at each nesting depth of the hierarchical data structure 270 until each child zone structure 280 and each content object 285 reachable from the first page 275 has been identified. The access request handler 240 can provide the identified zone structures 280 and content objects 285 to the interface generator 235 for response generation.

The interface generator 235 can generate responses to access requests that include data for rendering each zone structure 280 and each content object 285 associated with the requested structure 270. To generate the response, the interface generator 235 can read layout instructions stored in the hierarchical data structure 270 in association with the first page 275 to determine an ordering in which the zone structures 280 are to be presented within the first page 275. The interface generator 235 can construct rendering data for each zone structure 280 by reading the zone structure identifier, a zone name, a navigational element type (e.g., a tab, a pill, a section header, etc.), and/or a display position from the corresponding entry of the zone structure 280 within the hierarchical data structure 270. For each content object 285 associated with a zone structure 280, the interface generator 235 can read the metadata stored in the hierarchical data structure 270 for the content object 285, the metadata specifying a content type, a subcategory identifier, one or more market tag filters, a contextual data indicator, and/or scheduling parameters such as a publish time and/or an expiration time. The interface generator 235 can assemble the rendering data for each zone structure 280 and each content object 285 into the response according to the ordering specified by the layout instructions. For example, the interface generator 235 can generate, based on the hierarchical data structure 270, a response to the access request that includes data for rendering the first interface element within the graphical representation of the first zone structure 280 of the first page 275. In some implementations, the interface generator 235 can include, in the response, identifiers that the application executing on the client device 220 can use to retrieve underlying content from one or more external computing systems at the time of rendering, such that the response from the interface generator 235 specifies the structural arrangement and metadata for each content object 285 while the underlying content data is obtained by the application from the one or more external computing systems.

The data processing system 205 can transmit responses to access requests to the requesting client devices 220 via the network 210 to cause presentation of the corresponding pages 275 via applications executing on the client devices 220. For example, the data processing system 205 can transmit the response to the client device 220 via the network 210 to cause presentation of the first page 275 via an application executing on the client device 220, such that presentation of the first page 275 includes the graphical representation of the first zone structure 280 and the first interface element representing the first conditional event. The application executing on the client device 220 can parse the rendering data included in the response to identify each zone structure 280 and each content object 285 to be presented within the first page 275. The application can render each zone structure 280 as a navigational element (e.g., a tab, a pill, a section header, etc.) in a display position corresponding to the ordering specified in the rendering data. The application can render each content object 285 within the graphical representation of the zone structure 280 with which the content object 285 is associated, such that the content object 285 is displayed within the navigational element corresponding to the parent zone structure 280. In some implementations, the application executing on the client device 220 can use one or more identifiers included in the rendering data for a content object 285 to request underlying content from one or more external computing systems via the network 210, and can populate the graphical representation of the content object 285 with the underlying content received from the one or more external computing systems. In some implementations, the hierarchical data structure 270 can store layout instructions for each page 275 of at least one page 275, and the interface generator 235 can generate the data for rendering the first interface element within the first zone structure 280 of the first page 275 based on the layout instructions. For example, the layout instructions can specify an ordering of zone structures 280 within the first page 275 (e.g., a "Live In-Play" zone structure 280 positioned as a first tab, a "Game Lines" zone structure 280 positioned as a second tab, and a "Player Props" zone structure 280 positioned as a third tab within a Premier League soccer league page 275), and the interface generator 235 can generate the response such that the zone structures 280 are presented in the specified ordering on the client device 220.

The access request handler 240 can receive access requests for different pages 275 that reference a common zone structure 280 within the hierarchical data structure 270, such that the data processing system 205 can serve data for rendering the common zone structure 280 and the content objects 285 referenced therein on each of the different pages 275 from a single zone structure 280 stored in the hierarchical data structure 270. For example, the access request handler 240 can receive a second access request for a second page of at least one page 275 that includes the first zone structure 280. The access request handler 240 can traverse the hierarchical data structure 270 from the second page to locate the first zone structure 280 using the zone structure identifier stored in association with the first zone structure 280, and can retrieve the content objects 285 referenced by the first zone structure 280 for the second page in the same manner as described for the first page 275. The interface generator 235 can generate, based on the hierarchical data structure 270, a second response to the second access request that includes second data for rendering the first interface element within the first zone structure 280 of the second page. The data processing system 205 can transmit the second response to the client device 220 via the network 210 to cause presentation of the second page including the graphical representation of the first zone structure 280 and the first interface element. For example, a first zone structure 280 representing a "touchdown scorers" market grouping can be associated with a first page corresponding to a professional football league (e.g., NFL) page and a second page corresponding to a specific football event page (e.g., the AFC Championship Game) for a scheduled game within the professional football league, such that the access request handler 240 can serve data for rendering the "touchdown scorers" first zone structure 280 and the content objects 285 referenced therein on both the professional football league page and the specific football event page in response to respective access requests from a client device 220.

In the foregoing example, the data structure manager 230 can store a single first zone structure 280 in the hierarchical data structure 270 and can reference the identifier of the first zone structure 280 from both the first page and the second page, such that a modification to the content objects 285 within the first zone structure 280 by an operator via an operator device 225 can be reflected on both the league page and the event page without requiring separate modification of each page. For example, an operator can add a content object 285 representing a "First Touchdown Scorer" wagering market to the "touchdown scorers" first zone structure 280 via the operator device 225, and the data structure manager 230 can store the updated association in the hierarchical data structure 270, such that the "First Touchdown Scorer" content object 285 is rendered on both the professional football league page and the AFC Championship Game event page in response to subsequent access requests from client devices 220 without requiring the operator to modify each page separately. When the access request handler 240 receives a subsequent access request for the first page or the second page, the access request handler 240 can traverse the hierarchical data structure 270 to the first zone structure 280 and can retrieve the updated set of content objects 285 that includes the "First Touchdown Scorer" content object 285. The interface generator 235 can generate the response to include rendering data for the updated set of content objects 285, such that the application executing on the client device 220 presents the "First Touchdown Scorer" content object 285 within the first zone structure 280 on each page that references the first zone structure 280. In some implementations, the first zone structure 280 can be associated with both the first page and the second page within the hierarchical data structure 270, such that the data structure manager 230 maintains a single zone structure 280 and a single content object 285 that are accessed by both pages without duplication in the storage 215.

The hierarchical data structure 270 can identify and/or be stored in association with one or more page templates that define reusable arrangements of zone structures 280, content objects 285, and layout instructions applicable to a class of pages 275 within the hierarchical data structure 270, such that the data processing system 205 can apply a single page template to each page 275 of the class without requiring a separate page definition for each individual page 275 instance. In one example, the hierarchical data structure 270 can define a first page template for a subset of at least one page 275 having a first category of at least one categories (e.g., a sport category, a league category, an event category, etc.). For example, the first page template can apply to all league pages 275 associated with a particular sport category (e.g., all soccer league pages including a Major League Soccer (MLS) league page, a National Women's Soccer League (NWSL) league page, a Premier League page, and/or a Liga MX league page), such that each league page 275 within the sport category shares the zone structures 280 and content objects 285 defined by the first page template. In some implementations, the first page template can store references to one or more zone structures 280, one or more content objects 285, and/or one or more layout instructions, and a page 275 associated with the first page template can inherit one or more of the referenced zone structures 280, content objects 285, and/or layout instructions when rendered.

The access request handler 240 can receive access requests for pages 275 within a subset that shares a common page template and can apply the page template to generate responses for each page 275 in the subset. When the access request handler 240 receives an access request for a page 275 within the subset, the access request handler 240 can traverse the hierarchical data structure 270 to determine that the requested page 275 is associated with the first page template. The access request handler 240 can retrieve the zone structures 280, content objects 285, and layout instructions referenced by the first page template from the hierarchical data structure 270 stored in the storage 215. The interface generator 235 can generate rendering data for the requested page 275 based on the zone structures 280, content objects 285, and layout instructions of the first page template, such that the interface generator 235 does not require a separate page-specific definition for the requested page 275. For example, the access request handler 240 can receive a second access request for a second page 275 of the subset (e.g., an access request for the NWSL league page within the subset of soccer league pages), and the interface generator 235 can generate, based on the hierarchical data structure 270, a second response to the second access request that includes data for rendering the second page 275 according to display instructions of the first page template. The data processing system 205 can transmit the second response to cause presentation of the second page 275 in response to the second access request. In some implementations, the data structure manager 230 can receive requests from operator devices 225A-N to create new pages 275 and associate the new pages 275 with existing page templates stored in the hierarchical data structure 270, such that the new pages 275 inherit the zone structures 280, content objects 285, and layout instructions of the associated page template without requiring the operator to define each element of the new page 275 separately. For example, the access request handler 240 can receive, from an operator device 225A-N, a request to create a second page to be included in the subset (e.g., a request to create a new league page for a newly launched women's professional soccer league within the soccer sport category), and the data structure manager 230 can update the hierarchical data structure 270 in the storage 215 to include the second page 275 and to associate the second page 275 with the first page template, such that the second page 275 is rendered according to the display instructions of the first page template without requiring separate definition of zone structures 280 and content objects 285 for the second page 275.

In some implementations, the hierarchical data structure 270 can store page templates at multiple levels of a category hierarchy, such as a sport-level template, a league-level template, an event-level template, a team-level template, and/or a player-level template. The data processing system 205 can determine, for an access request associated with a given page context, which of the multiple page templates and/or page definitions applies based on a specificity rule, a priority rule, and/or an override rule represented in the hierarchical data structure 270. For example, a league-level page template can override a sport-level page template for pages associated with a particular league, and an event-specific page 275 can override the league-level page template for access requests associated with a particular event. When the access request handler 240 receives an access request for a page 275, the access request handler 240 can traverse the hierarchical data structure 270 to identify each page template associated with the category hierarchy of the requested page 275 and can select the page template at the most granular level of the category hierarchy for which a template or page definition exists. In some implementations, a default page template can apply to a broad class of pages, such as all event pages associated with a professional football league, while a more specific page can be created for a single event, such as a championship game or the Super Bowl, to present a different arrangement of zone structures 280, content objects 285, layout instructions, and/or navigational elements for that event without affecting other event pages associated with the professional football league. In some implementations, the more specific page template or page 275 can fully override a less specific page template. For example, a full override can cause the data processing system 205 to disregard the zone structures 280, content objects 285, layout instructions, and/or navigational elements defined by the less specific page template and to render the page 275 according to the more specific page template or page 275.

In some implementations, the more specific page template or page 275 can partially override the less specific page template by replacing one or more zone structures 280, content objects 285, layout instructions, and/or navigational elements while inheriting one or more non-overridden zone structures 280, content objects 285, layout instructions, and/or navigational elements from the less specific page template. For example, a partial override can cause the data processing system 205 to replace a designated subset of the zone structures 280, content objects 285, layout instructions, and/or navigational elements defined by the less specific page template while retaining non-overridden structures and instructions from the less specific page template, such that the rendered page 275 includes a combination of elements from both the less specific page template and the more specific page template or page 275. The interface generator 235 can generate the response by first retrieving the zone structures 280, content objects 285, and layout instructions from the less specific page template via traversal of the hierarchical data structure 270, and can replace each zone structure 280, content object 285, and/or layout instruction that is overridden by the more specific page template or page 275 with the corresponding zone structure 280, content object 285, and/or layout instruction from the more specific page template or page 275. The interface generator 235 can assemble the rendering data from both the less specific page template and the more specific page template or page 275 into the response according to the layout instructions applicable after the partial override. For example, a Stanley Cup Finals event-specific page 275 can partially override an NHL league-level page template by replacing a "Game Lines" zone structure 280 with a "Finals Specials" zone structure 280 containing content objects 285 for series-specific wagering markets (e.g., series winner, series MVP, total games in series, etc.) while inheriting the "Player Props" zone structure 280 and the "Live In-Play" zone structure 280 from the NHL league-level page template.

The data structure manager 230 can receive requests from operator devices 225A-N via the network 210 to generate variants of existing pages 275 stored in the hierarchical data structure 270, such that the data processing system 205 can maintain multiple alternative versions of a page 275 for comparative evaluation of different content arrangements across different cohorts of client devices 220. For example, the data structure manager 230 can receive, from an operator device 225A-N via the network 210, a request to generate a variant of the first page 275, the variant corresponding to a modification (e.g., addition, removal, reordering, repositioning, or reconfiguration of zone structures, content objects, navigational elements, availability criteria, or other attributes within the hierarchical data structure) to the first page 275. A variant can be an alternative version of the first page 275 that shares a common baseline of zone structures 280 and content objects 285 with the first page 275 but differs from the first page 275 in at least one structural or content attribute. The variant can be used to evaluate whether a particular modification to the first page 275, such as a change in the ordering of zone structures 280 or a difference in the quantity of content objects 285 presented within a zone structure 280, yields a measurable difference in user interaction performance or business performance relative to the unmodified first page 275.

For example, the variant can be used to evaluate whether presenting a "Pitcher Props" zone structure 280 in a second tab position and a "Batter Props" zone structure 280 in a third tab position within an MLB league page 275 yields a measurable difference in user interaction performance relative to a default arrangement in which the "Batter Props" zone structure 280 is in the second tab position and the "Pitcher Props" zone structure 280 is in the third tab position. An operator can generate a variant to compare alternative content strategies, such as determining whether a first ordering of market groupings within a zone structure 280 drives greater user engagement than a second ordering of the same market groupings, without modifying the first page 275 that is served to a remaining population of client devices 220. The data structure manager 230 can update, based on the request, the hierarchical data structure 270 in the storage 215 to include a second page generated according to the modification for the first page 275. In some implementations, the hierarchical data structure 270 can store an association between the first page 275 and the second page indicating that the second page is a variant of the first page 275. For example, the data structure manager 230 can duplicate the zone structures 280 and content objects 285 of the first page 275 to generate the second page, and the operator can modify the second page via the operator-facing graphical user interface (e.g., the page comparison interface 350 depicted in FIG. 3F) to change an ordering of zone structures 280, add and/or remove content objects 285, and/or modify content placement within the second page.

Figure 3D:
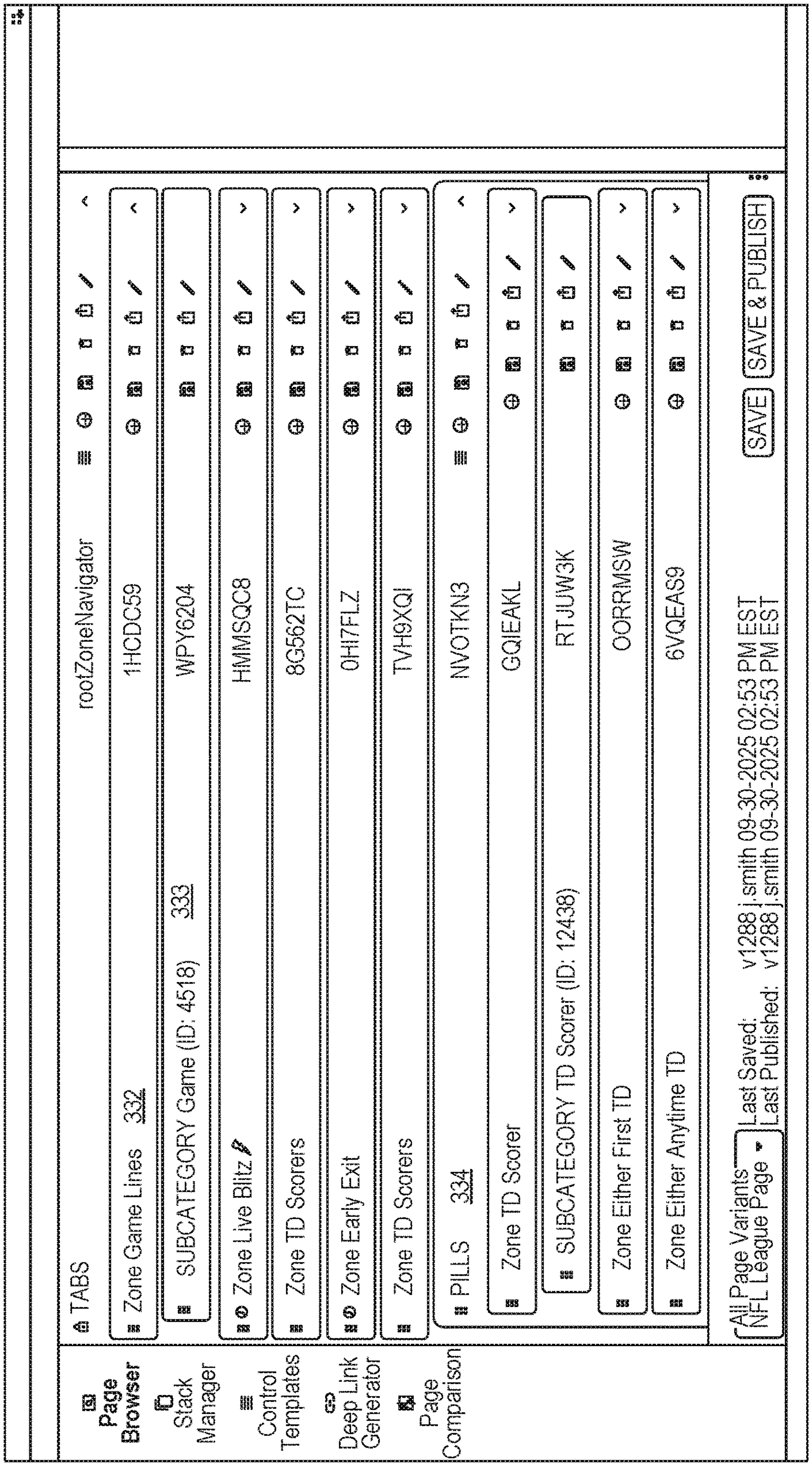
FIG. 3D is a GUI depicting an exemplary content management system interface showing a configurable structure, in accordance with one or more implementations.
Figure 3E:
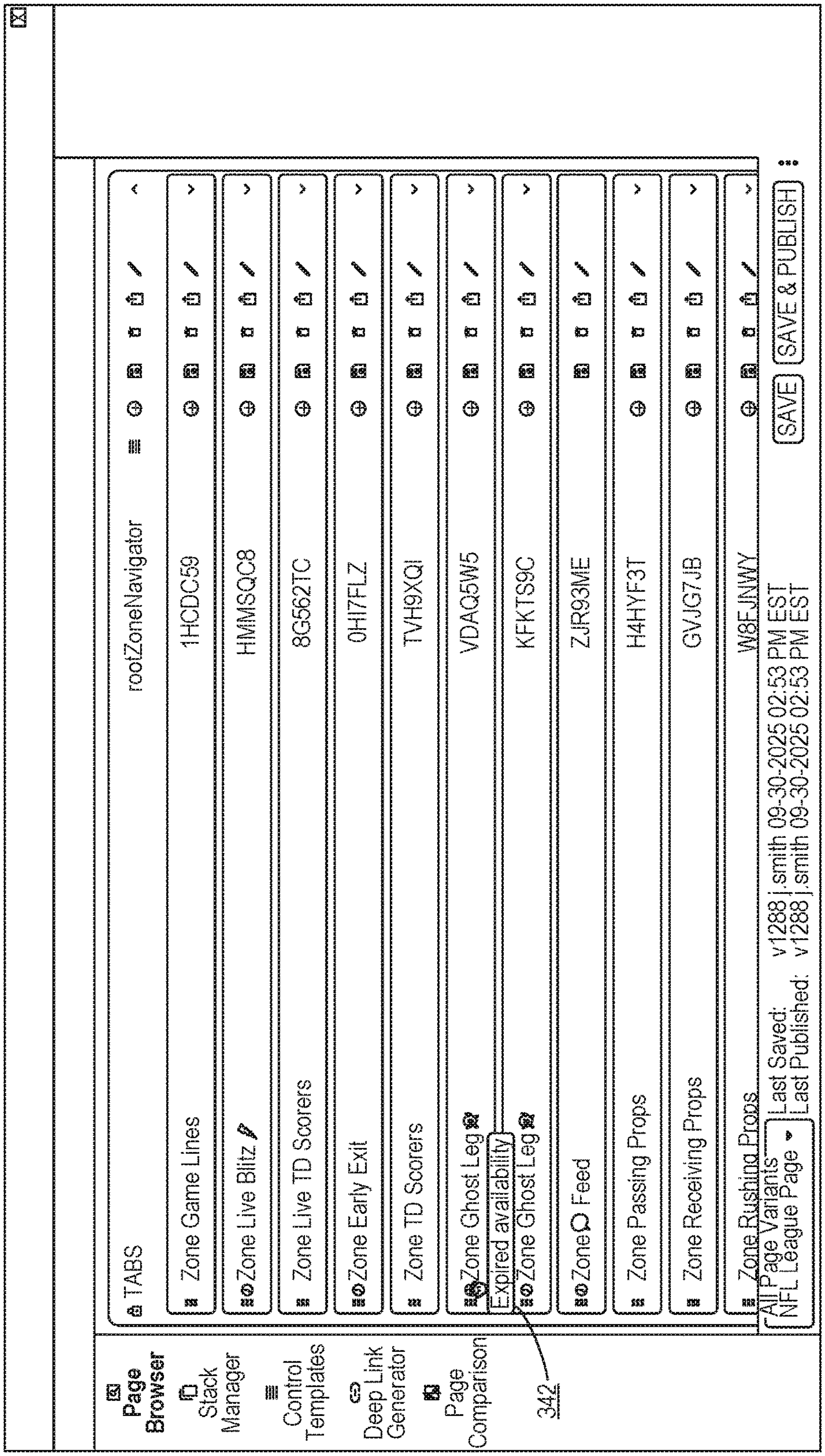
FIG. 3E is a GUI depicting an availability status indicator, in accordance with one or more implementations.
Figure 3F:
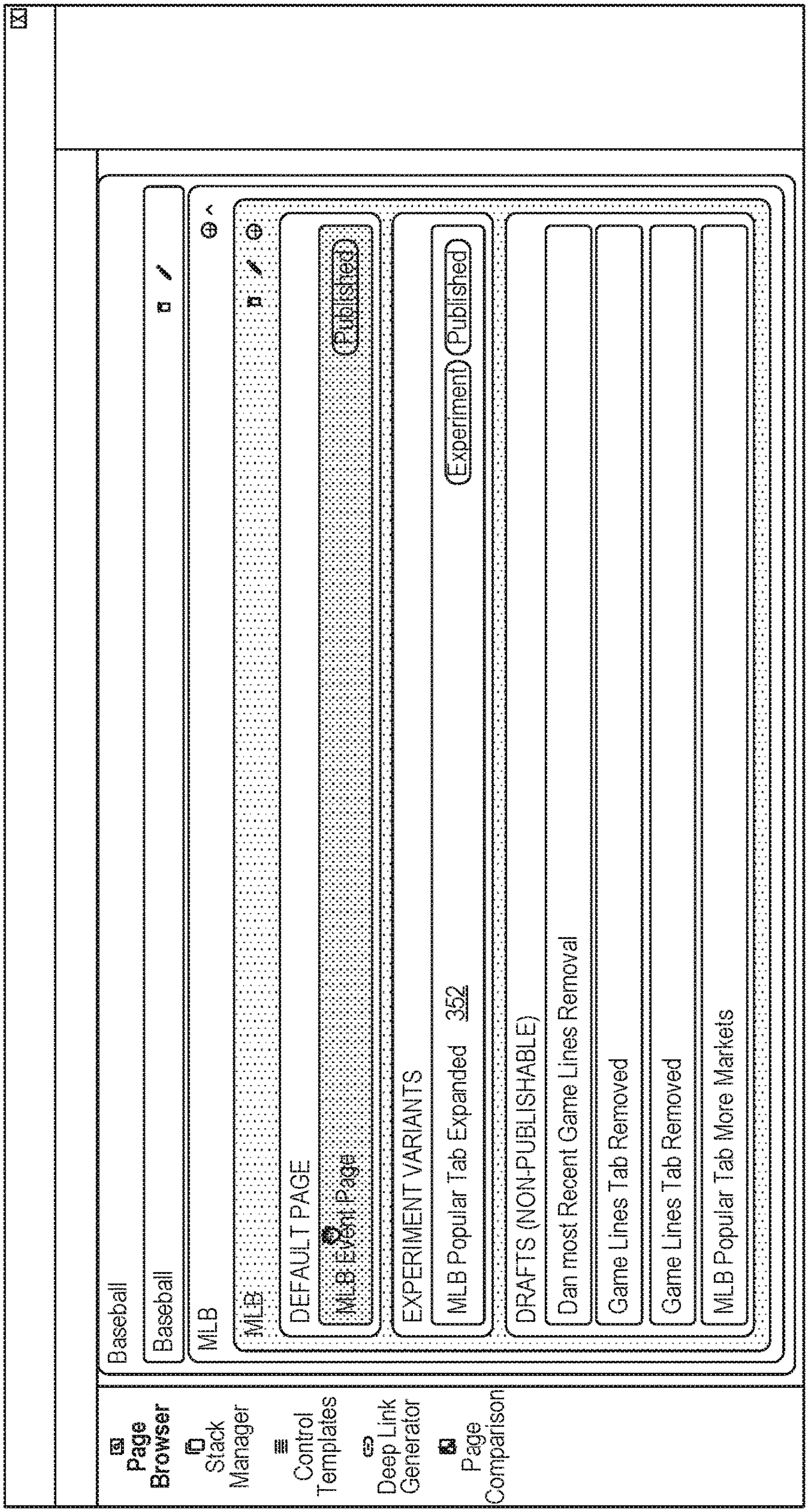
FIG. 3F is a GUI depicting an exemplary page comparison interface of a content management system for experiment variants, in accordance with one or more implementations.

Referring now to FIG. 3F in the context of the components described in connection with FIG. 2, illustrated is a graphical user interface (GUI) depicting a page comparison interface 350 of a content management system for experiment variants, in accordance with one or more implementations. The page comparison interface 350 can be rendered on an operator device 225A-N and can display, for a selected page 275 of the hierarchical data structure 270, a default page entry and one or more experiment variant 352 entries associated with the selected page 275. Each experiment variant 352 can be displayed as a listing entry within the page comparison interface 350, each experiment variant 352 entry displaying a variant name, one or more status indicators (e.g., an "Experiment" badge, a "Published" badge, etc.), and a variant identifier. For example, the data structure manager 230 can duplicate the zone structures 280, the sub-zone structures, and the content objects 285 of the selected page 275 to generate a new experiment variant 352, such that an operator can modify the duplicated configuration via the content management system interface 310 described in connection with FIG. 3B to change an ordering of zone structures 280, add and/or remove content objects 285, and/or reposition sub-zone structures within zone structures 280. In some implementations, the page comparison interface 350 can display one or more draft variant entries that correspond to modified versions of the selected page 275 that are not in a published state and are not served to client devices 220.

In some implementations, the data processing system 205 can assign a first plurality of user client devices 220 to the first page 275 and a second plurality of user client devices 220*b* to the second page, such that access requests from the first plurality of user client devices 220*a* are served according to the first page 275 and access requests from the second plurality of user client devices 220*b* are served according to the second page. In some implementations, the data processing system 205 can interface with a separate experimentation tool to assign each client device 220 to a cohort corresponding to the first page 275 and/or the second page, such that the access request handler 240 can determine which page to serve in response to an access request based on the cohort assignment of the requesting client device 220. In some implementations, the data processing system 205 can store cohort assignment data associating one or more client devices 220, client device tokens, and/or user accounts with the first page 275 or the second page for selective serving of the corresponding page.

The data structure manager 230 can receive, from an operator device 225A-N via the network 210, a reordering request specifying a change to an order of at least one content object 285 defined within a second zone structure 280 of at least one zone structure 280. The data structure manager 230 can update the hierarchical data structure 270 in the storage 215 based on the reordering request, such that subsequent access requests from client devices 220 for a page 275 referencing the second zone structure 280 are served with the content objects 285 arranged according to the updated order. For example, the reordering request can specify that a first content object 285 representing a first subcategory of wagering markets is to be presented before a second content object 285 representing a second subcategory of wagering markets within the second zone structure 280, and the data structure manager 230 can update the layout instructions associated with the second zone structure 280 in the hierarchical data structure 270 to reflect the specified ordering.

Figure 4:
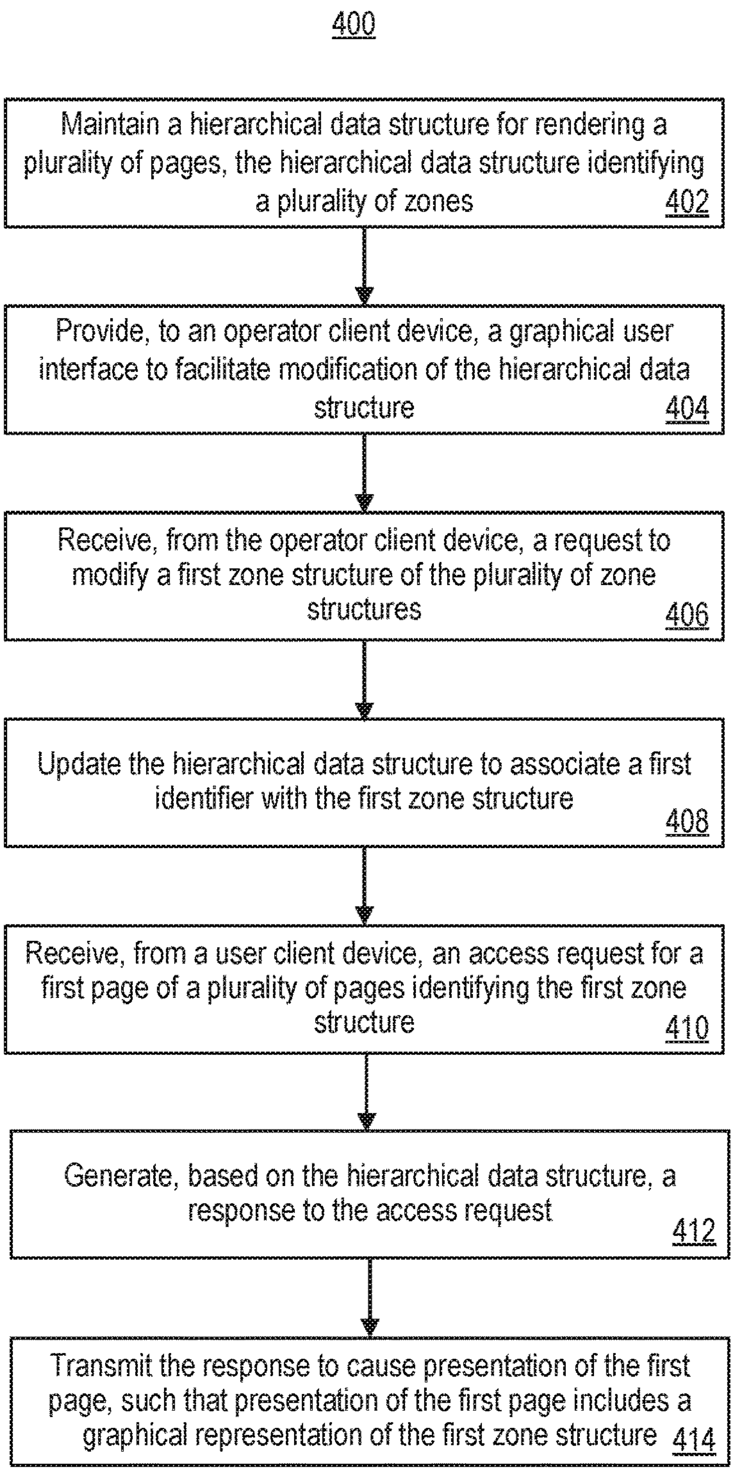
FIG. 4 is a flow chart illustrating a method for dynamic construction of graphical user interfaces for multi-platform systems, in accordance with one or more implementations.

Referring now to FIG. 4, illustrated is a method 400 for dynamic construction of graphical user interfaces for multi-platform systems. The method 400 is described as being performed by the data processing system 205 of FIG. 2. However, it should be understood that the method 400 may be performed using any computing device/system or combination of computing devices/systems described herein. Additional operations may be performed as part of the method 400 or operations of the method 400 may be omitted, in some implementations. In brief overview of the method 400, the method 400 can include maintaining a hierarchical data structure for rendering a plurality of pages, the hierarchical data structure identifying a plurality of zones (ACT 402), providing, to an operator client device, a graphical user interface to facilitate modification of the hierarchical data structure (ACT 404), receiving, from the operator client device, a request to modify a first zone structure of the plurality of zone structures (ACT 406), updating the hierarchical data structure to associate a first identifier with the first zone structure (ACT 408), receiving, from a user client device, an access request for a first page of a plurality of pages identifying the first zone structure (ACT 410), generating, based on the hierarchical data structure, a response to the access request (ACT 412), and/or transmitting the response to cause presentation of the first page including a graphical representation of the first zone structure (ACT 414).

FIG. 4 is a flow diagram showing a method 400 for dynamic construction of graphical user interfaces for multi-platform systems, in accordance with some implementations of the present disclosure. The method 400 can be performed by the data processing system (e.g., the data processing system 205 of FIG. 2), or by any computing device or combination of computing devices described herein. The method 400 can include operations performed by the data structure manager 230, the interface generator 235, the access request handler 240, and/or the criteria evaluator 245 of the data processing system 205 to maintain a hierarchical data structure 270, receive operator modifications to zone structures 280 within the hierarchical data structure 270, and generate responses to access requests from client devices 220 based on the hierarchical data structure 270.

The method 400, at ACT 402, can include maintaining, by the data processing system, a hierarchical data structure (e.g., the hierarchical data structure 270 of FIG. 2) for rendering at least one page, the hierarchical data structure identifying at least one zone structure associated with at least one page, each zone structure of at least one zone structure associated with one or more content objects. The data processing system can store the hierarchical data structure in storage (e.g., the storage 215 of FIG. 2) and can access the hierarchical data structure to determine associations between pages, zone structures, and content objects in response to access requests received from client devices via a network (e.g., the network 210 of FIG. 2). Each zone structure can store a unique zone identifier (e.g., an alphanumeric string) that the data processing system can use to locate the zone structure within the hierarchical data structure. Each content object can store metadata that specifies instructions for determining availability of the content represented by the content object, as described in connection with FIG. 2. In some implementations, the hierarchical data structure can include layout instructions for each page of at least one page. The layout instructions can specify an ordering of zone structures within a page and/or a selection of zone structures to present within the page. The data processing system can access the layout instructions when generating a response to an access request from a client device to determine how to arrange graphical representations of the zone structures within the page. Maintaining the hierarchical data structure can include performing any of the operations of the data structure manager 230 of FIG. 2, including any operations of the methods 500, 600, 700, and 800 of FIGS. 5, 6, 7, and 8.

The method 400, at ACT 404, can include providing, by the data processing system, to an operator device (e.g., an operator device 225 of FIG. 2), a graphical user interface to facilitate modification of the hierarchical data structure for rendering at least one page. The interface generator of the data processing system can generate data for rendering the graphical user interface on the operator device. The graphical user interface can present representations of zone structures, content objects, navigational elements (e.g., tabs, pills, section headers, etc.), and/or page-level configuration parameters associated with a selected page of the hierarchical data structure. The graphical user interface can include one or more actionable objects through which an operator can add, remove, reorder, and/or modify content objects within zone structures, create new zone structures within pages, associate availability criteria with zone structures and/or content objects, generate experiment variants of pages, and/or generate deep links to zone structures and/or content objects within the hierarchical data structure. In some implementations, the data processing system can transmit the data for rendering the graphical user interface to the operator device via the network in response to a session initiation request from the operator device. In some implementations, the graphical user interface can present a page browser interface (e.g., the graphical user interface 300 depicted in FIG. 3A) that displays a listing of pages organized by page type, such that the operator can select a page from the listing to view and modify the zone structures and content objects associated with the selected page. Providing the graphical user interface can include performing any of the operations of the interface generator 235 of FIG. 2, including any operations of the methods 500, 600, 700, and 800 of FIGS. 5, 6, 7, and 8.

The method 400, at ACT 406, can include receiving, by the data processing system, from the operator device, a request to modify a first zone structure of at least one zone structure, the request comprising a first identifier of a first interface element to be presented in the first zone structure, the first interface element representing a first conditional event. The access request handler of the data processing system can receive the request from the operator device via the network and can forward the request to the data structure manager for processing. The first identifier can be a unique value (e.g., an alphanumeric string, a numeric identifier, etc.) stored in the hierarchical data structure that corresponds to a content object representing the first conditional event. The first conditional event can be a wagering opportunity associated with a sporting event, a market-driven content feature, and/or another event-driven content type for which availability can change based on real-time conditions. In some implementations, the request to modify the first zone structure can be provided in response to at least one interaction at the graphical user interface rendered on the operator device. For example, an operator can select an actionable object within the content management system interface (e.g., the content management system interface 310 depicted in FIG. 3B) to associate a content object representing a subcategory of wagering markets with a zone structure rendered as a tab, and the operator device can transmit the request to the data processing system in response to the selection. In some implementations, the request can include one or more additional parameters, such as a position indicator specifying a display position for the first interface element within the first zone structure and/or one or more market tag filters specifying content filtering criteria for the first interface element. Receiving the request to modify the first zone structure can include performing any of the operations of the access request handler 240 of FIG. 2, including any operations of the methods 500, 600, 700, and 800 of FIGS. 5, 6, 7, and 8.

The method 400, at ACT 408, can include updating, by the data processing system, the hierarchical data structure to associate the first identifier of the first interface element with the first zone structure, such that the first interface element is to be presented within a graphical representation of the first zone structure. The data structure manager of the data processing system can store the first identifier in association with the first zone structure within the hierarchical data structure in the storage, such that a subsequent traversal of the hierarchical data structure from the page to the first zone structure yields the first identifier of the first interface element as a child content object of the first zone structure. The data processing system can update the hierarchical data structure without modifying identifiers of other content objects and/or zone structures that are associated with the first zone structure, such that the update is additive with respect to existing associations. In some implementations, the hierarchical data structure can identify at least one page templates, and the hierarchical data structure can define a first page template for a subset of at least one page having a first category of at least one categories. A page template can be a stored arrangement of zone structures, content objects, and/or layout instructions that the data processing system can apply to each page within the subset without requiring a separate page definition for each individual page. For example, the first page template can apply to all league pages associated with a particular sport category, such that each league page within the sport category shares the zone structures and content objects defined by the first page template. In some implementations, the method 400 can include receiving, by the data processing system, from the operator device, a second request to create a second page to be included in the subset. The data processing system can update, based on the second request, the hierarchical data structure to include the second page and to associate the second page with the first page template, such that the second page is rendered according to display instructions of the first page template without requiring the operator to separately define zone structures and content objects for the second page. Updating the hierarchical data structure can include performing any of the operations of the data structure manager 230 of FIG. 2, including any operations of the methods 500, 600, 700, and 800 of FIGS. 5, 6, 7, and 8.

In some implementations, the method 400 can include receiving, by the data processing system, from the operator device, a second request to generate a variant of the first page, the variant corresponding to a modification to the first page. A variant can be an alternative version of the first page that shares a common baseline of zone structures and content objects with the first page but differs from the first page in at least one structural or content attribute, such as a different ordering of zone structures within the page and/or a different selection of content objects within a zone structure. The data structure manager of the data processing system can update, based on the second request, the hierarchical data structure to include a second page generated according to the modification for the first page. For example, the data structure manager can duplicate the zone structures and content objects of the first page to generate the second page, and the data processing system can store the second page in the hierarchical data structure in association with the first page as a variant (e.g., as depicted in the page comparison interface 350 of FIG. 3F). In some implementations, the method 400 can include assigning, by the data processing system, a first set of user client devices to the first page and a second set of user client devices to the second page, such that access requests from the first set of user client devices are served according to the first page and access requests from the second set of user client devices are served according to the second page. The data processing system can determine which page to serve in response to an access request based on a cohort assignment associated with the requesting client device. In some implementations, the method 400 can include receiving, by the data processing system, from the operator device, a reordering request specifying a change to an order of at least one content object defined within a second zone structure of at least one zone structure. The data structure manager of the data processing system can update the hierarchical data structure based on the reordering request, such that subsequent access requests from client devices for a page that includes the second zone structure are served with the content objects arranged according to the updated order. Generating the variant of the first page can include performing any of the operations of the data structure manager 230 of FIG. 2, including any operations of the methods 500, 600, 700, and 800 of FIGS. 5, 6, 7, and 8.

The method 400, at ACT 410, can include receiving, by the data processing system, from a user client device (e.g., a client device 220 of FIG. 2), an access request for a first page of at least one page identifying the first zone structure. The access request handler of the data processing system can receive the access request from the user client device via the network. The access request can identify the first page by a page identifier stored in the hierarchical data structure. In some implementations, the access request can include a device identifier, a session identifier, and/or a token associated with the user client device that the data processing system can use to determine request context, such as a geographic jurisdiction and/or a player profile associated with the user client device. In some implementations, the method 400 can include receiving, by the data processing system, a second access request for a second page of at least one page that includes the first zone structure. The second access request can identify a different page that is associated with the same first zone structure within the hierarchical data structure, such that the data processing system can serve data for rendering the first zone structure and the associated content objects on both the first page and the second page from a single zone structure within the hierarchical data structure. In some implementations, the method 400 can include receiving, by the data processing system, a second access request for a second page of the subset, when the hierarchical data structure defines a first page template for the subset of at least one page having a first category of at least one categories. The data processing system can determine that the second page is a member of the subset and can apply the first page template to generate a response for the second page. Receiving the access request can include performing any of the operations of the access request handler 240 of FIG. 2, including any operations of the methods 500, 600, 700, and 800 of FIGS. 5, 6, 7, and 8.

The method 400, at ACT 412, can include generating, by the data processing system, based on the hierarchical data structure, a response to the access request including data for rendering the first interface element within the graphical representation of the first zone structure of the first page. The interface generator of the data processing system can traverse the hierarchical data structure from the first page to each zone structure associated with the first page and to the content objects associated with each zone structure, and can generate the response including rendering data for each zone structure and content object associated with the first page. The rendering data can include identifiers, metadata, and/or layout positions for each zone structure and content object that the application executing on the user client device can use to construct the graphical user interface. In some implementations, the method 400 can include generating, by the data processing system, the data for rendering the first interface element within the first zone structure of the first page based on the layout instructions stored in the hierarchical data structure. For example, the layout instructions can specify an ordering of zone structures within the first page (e.g., a first zone structure positioned as a first tab, a second zone structure positioned as a second tab, etc.), and the interface generator can generate the response such that the zone structures are presented in the specified ordering on the user client device. In some implementations, the method 400 can include transmitting, by the data processing system, based on the hierarchical data structure, a second response to the second access request including second data for rendering the first interface element within the first zone structure of the second page. In some implementations, the method 400 can include generating, by the data processing system, based on the hierarchical data structure, a second response to the second access request including data for rendering the second page according to display instructions of the first page template, and transmitting, by the data processing system, the second response to cause presentation of the second page in response to the second access request. The data processing system can generate the second response by applying the zone structures, content objects, and layout instructions of the first page template to the second page without requiring a separate page definition for the second page in the hierarchical data structure. Generating the response to the access request can include performing any of the operations of the interface generator 235 of FIG. 2, including any operations of the methods 500, 600, 700, and 800 of FIGS. 5, 6, 7, and 8.

The method 400, at ACT 414, can include transmitting, by the data processing system, the response to cause presentation of the first page via an application executing on the user client device, such that presentation of the first page includes the graphical representation of the first zone structure and the first interface element representing the first conditional event. The data processing system can transmit the response to the user client device via the network, and the application executing on the user client device can render the first page by presenting the one or more zone structures as navigational elements (e.g., tabs, pills, section headers, etc.) and presenting the one or more content objects within the graphical representations of the respective zone structures. The application executing on the user client device can arrange the navigational elements according to the layout instructions included in the response, such that each zone structure is displayed in a position corresponding to the ordering specified in the hierarchical data structure. In some implementations, the application executing on the user client device can render the first page across different client platforms (e.g., a mobile application, a web application, a desktop application, etc.) based on platform-specific rendering instructions while preserving the page, zone structure, and content object associations represented in the hierarchical data structure. The data processing system can generate platform-specific rendering instructions for each client platform based on a device type indicator included in the access request from the user client device, such that the response includes rendering data formatted for the particular client platform of the requesting user client device. Transmitting the response to cause presentation of the first page can include performing any of the operations of the interface generator 235 of FIG. 2, including any operations of the methods 500, 600, 700, and 800 of FIGS. 5, 6, 7, and 8.

C. Systems and Methods for Construction of Graphical User Interfaces According to Real-Time Data This disclosure relates to techniques for dynamically determining the layout of graphical user interface elements on a per-user basis using historical interaction data and profile attributes maintained within a content delivery platform. Content delivery platforms can present pages to users across multiple client device types, such as mobile applications, web applications, and desktop applications. Each page can include one or more content objects arranged within a structural layout for presentation as navigational elements within a graphical user interface rendered on a client device. Operators of such platforms can use a content delivery system to define the structural arrangement of pages, including the selection and ordering of content and the placement of content objects within pages. The content delivery system can maintain data that stores associations between pages and content objects, such that the data can be used to generate rendering information for a page in response to an access request from a client device.

However, conventional content delivery approaches can serve a static, predetermined layout of pages to each user who accesses a given page, regardless of the interaction history or attributes of the individual user. The static layout can be defined by an operator at configuration time and can remain fixed for each access request until the operator manually modifies the layout through a separate configuration operation. As a result, conventional approaches can present the same ordering and arrangement of content to a first user who frequently interacts with content associated with a first category and to a second user who frequently interacts with content associated with a second category, without accounting for the differing interaction patterns of the two users. Conventional approaches can also lack a mechanism by which the ordering or selection of content within a page can be updated over time in response to changes in user interaction patterns, such that the static layout can become less aligned with the interaction preferences of individual users as the interaction data of each user changes. In addition, conventional approaches can lack the ability to restrict presentation of content based on user-specific attributes, such as a geographic jurisdiction or an account status, at the page layout level, because the layout is determined independently of user-specific data. The static nature of conventional page layouts can result in the presentation of content in an ordering that does not correspond to the interaction patterns of the requesting user, increasing the number of navigational interactions that a user performs to reach content of interest.

The techniques described herein can provide a system and method for dynamically generating layout data for a page on a per-access-request basis using historical interaction data and a set of attributes associated with an individual player profile. Rather than serving a fixed ordering of zone structures that is predetermined by an operator, the techniques described herein can evaluate the interaction history and attributes of the requesting user at the time of an access request and can generate layout data that specifies an ordering and a selection of zone structures within the page that corresponds to the interaction patterns and properties of the requesting user. The techniques described herein can decouple the determination of page layout from the operator configuration step, such that the operator can define a candidate set of zone structures eligible for presentation within a page and can indicate that the layout of the page is to be dynamically determined, while the system can determine how the candidate set is ordered, filtered, or otherwise arranged for each individual user at the time of each access request.

To implement the techniques described herein, a data processing system can maintain a hierarchical data structure that associates at least one zone structure with at least one page. The data processing system can receive, from an operator device, a request to modify a page that includes a selection of a set of zone structures to be presented within the page and an indication that the layout of the page is to be dynamically determined. The data processing system can store the indication in the hierarchical data structure in association with the page. When the data processing system receives an access request for the page from a client device associated with a player profile, the data processing system can read the indication from the hierarchical data structure and can determine that the layout of the page is not to be served according to a static ordering. The data processing system can then generate layout data for the page based on the historical interaction data and the set of attributes of the player profile. The layout data can specify an ordering of the set of zone structures within the page, a selection of a subset of the set of zone structures to be presented within the page, and an ordering of content objects within individual zone structures. The data processing system can generate a response to the access request based on the hierarchical data structure and the layout data, and can transmit the response to cause presentation of the page with the set of zone structures arranged according to the layout data. The data processing system can also update the historical interaction data of the player profile in response to subsequent interactions from the user, such that updated layout data generated for a subsequent access request can reflect changes in the interaction patterns of the user over time.

In doing so, the techniques described herein can address the limitations of conventional static layout approaches by generating layout data that corresponds to the interaction history and attributes of each individual user at the time of each access request. The per-user layout determination of the techniques described herein can reduce the number of navigational interactions that a user performs to reach content objects of interest, because zone structures associated with categories that the user has interacted with at a higher frequency can be positioned in prioritized locations within the page. The techniques described herein can also support restriction of zone structures from presentation based on user-specific attributes at the page layout level, such that zone structures associated with content objects that are restricted in a given geographic jurisdiction can be omitted from the rendered page for users associated with the given geographic jurisdiction. The ability to update historical interaction data in response to subsequent interactions and to generate updated layout data based on the updated historical interaction data can provide a technical improvement over conventional approaches in which the page layout remains static until manually reconfigured by an operator.

By virtue of the implementation of the techniques described herein, processing and memory resource consumption can be reduced by a system handling the construction and rendering of graphical user interfaces according to real-time data. For example, a system can maintain player profiles comprising historical interaction data and a set of attributes, determine that a page has an indication that the layout of the page is to be dynamically determined, and generate layout data for the page based on the historical interaction data and the set of attributes of a corresponding player profile rather than generating and transmitting a static, predetermined layout to each requesting user. By causing the system to maintain a hierarchical data structure identifying at least one zone structure associated with at least one page, receive a request comprising a selection of a first set of zone structures and an indication that a layout of a first page is to be dynamically determined, and generate layout data for the first page based on the historical interaction data and the set of attributes of a first player profile, the system can avoid generating and storing redundant static layout definitions for each individual user and can instead compute a compact layout representation at the time of each access request using the player profile data already maintained in storage. As a result, overall processing and memory resource consumption can be reduced by the system, both by virtue of the on-demand generation of layout data that eliminates precomputed per-user layout storage and the selective inclusion of zone structures in the layout data that reduces the volume of rendering data the system generates and holds in memory for each access request.

In some examples, network communication overhead can be reduced by a system that dynamically determines page layouts on a per-user basis using historical interaction data and profile attributes. For example, a system can evaluate the historical interaction data and the set of attributes of a player profile at the time of an access request and can generate a response that includes data for rendering a subset of zone structures selected based on the player profile rather than transmitting data for rendering a full static set of zone structures that includes zone structures the user does not interact with. By causing the system to receive, from a user client device associated with a first player profile, an access request for a first page, determine that the first page has the indication that the layout of the first page is to be dynamically determined, generate layout data comprising a selection of a subset of the first set of zone structures to be presented within the first page, and transmit a response to cause presentation of the first page arranged according to the layout data, the system can reduce the payload size of each response by omitting rendering data for zone structures and content objects that are not selected for presentation based on the player profile. As a result, the volume of network communications between the system and client devices can be reduced because the system transmits rendering data tailored to each player profile rather than transmitting a uniform payload that includes data for zone structures and content objects that the requesting user does not engage with.

Referring now back to FIG. 2, in some embodiments, the system 200 of FIG. 2 can be configured to implement construction of graphical user interfaces according to real-time data. The system 200 can include one or more processors (e.g., one or more processors 121 of FIG. 1D) coupled to memory (e.g., memory 122 of FIG. 1D) storing instructions for implementing the construction of graphical user interfaces in real-time. As described above in connection with Section B, the data processing system 205 can maintain the hierarchical data structure 270 in the storage 215 for rendering at least one page 275, the hierarchical data structure 270 identifying at least one zone structure 280 associated with at least one page 275, each zone structure 280 of at least one zone structure 280 associated with one or more respective content object 285.

In some implementations, the data processing system 205 can store and maintain one or more player profile 295 in the storage 215. Each player profile 295 can correspond to a respective player (e.g., a user, an account holder, a customer, etc.) associated with a respective client device 220 and can comprise historical interaction data and a set of attributes (e.g., a geographic jurisdiction, an account status, a player segment identifier, a deposit history indicator, one or more category preferences, etc.) for the respective player. The historical interaction data can indicate one or more prior interactions between the respective player and one or more page 275 rendered on the respective client device 220, such as selections of zone structure 280 rendered as tabs, selections of content object 285 within zone structure 280, placement of wagers associated with content object 285, navigation patterns across page 275, and/or durations of viewing of particular zone structure 280 and/or content object 285. The set of attributes can indicate one or more properties of the respective player, such as a geographic jurisdiction, an account status, a player segment identifier, a deposit history indicator, and/or one or more category preferences derived from the historical interaction data. The data structure manager 230 can store each player profile 295 in the storage 215 in association with a player profile identifier that the access request handler 240 can use to retrieve the player profile 295 in response to an access request from a client device 220 associated with the player profile 295.

As described above in connection with Section B, the interface generator 235 can provide, to an operator device 225A-N, a graphical user interface (e.g., the content management system interfaces described in connection with FIGS. 3A-3F, etc.) to facilitate modification of the hierarchical data structure 270 for rendering at least one page 275. The graphical user interface can present representations of zone structure 280, content object 285, navigational elements (e.g., tabs, pills, section headers, etc. shown in the content management system interface 330 of FIG. 3D), and/or page-level configuration parameters, including the indication that a layout of a page 275 is to be dynamically determined, such that an operator can select and modify each of the foregoing via interactions at an operator device 225A-N. For example, the graphical user interface can present a content management system interface 310 (e.g., as depicted in FIG. 3B) that displays zone structure 280 associated with a selected page 275 as an ordered listing, and the operator can select a page-level configuration parameter within the content management system interface 310 to indicate that the layout of the selected page 275 is to be dynamically determined based on player profile 295 data rather than a static ordering defined by the operator.

The access request handler 240 can receive requests from operator devices 225A-N via the network 210 that specify modifications to the hierarchical data structure 270, including requests to modify which zone structure 280 are associated with a given page 275 and whether the layout of the page 275 is to be determined on a per-access-request basis using player profile 295 data. For example, the access request handler 240 can receive, from an operator device 225A-N via the network 210, a request to modify a first page 275 of at least one page 275. The request can comprise (i) a selection of a first set of zone structure 280 of at least one zone structure 280 to be presented within the first page 275, and (ii) an indication that a layout of the first page 275 is to be dynamically determined. A layout that is dynamically determined can be a layout in which the data processing system 205 generates an ordering and/or a selection of the first set of zone structure 280 for the first page 275 at the time of an access request based on data associated with a requesting player profile 295, such as the historical interaction data and/or the set of attributes of the player profile 295, rather than serving a fixed ordering and/or a fixed selection of zone structure 280 that was predetermined by the operator via the operator device 225A-N. In some implementations, the first set of zone structure 280 can define a candidate set of zone structure 280 eligible for presentation within the first page 275, and the dynamically determined layout can specify how the candidate set is ordered, filtered, or otherwise arranged for a particular player profile 295.

The selection of the first set of zone structure 280 can specify one or more zone structure identifiers corresponding to zone structure 280 (e.g., "Zone Game Lines" 312*a*, "Zone Live Blitz" 312*b*, "Zone TD Scorers" 312*c*, or "Zone Early Exit" 312*n* as depicted in the content management system interface 310 of FIG. 3B) stored in the hierarchical data structure 270 that are to be included in the first page 275. The indication that the layout of the first page 275 is to be dynamically determined can be a flag, a metadata field, and/or a configuration parameter stored in association with the first page 275 in the hierarchical data structure 270 that instructs the data processing system 205 to generate layout data for the first page 275 on a per-access-request basis rather than serving a static layout defined by the operator. The data structure manager 230 can update the hierarchical data structure 270 in the storage 215 according to the request to modify the first page 275, such that the hierarchical data structure 270 associates the first set of zone structure 280 with the first page 275 and stores the indication that the layout of the first page 275 is to be dynamically determined.

The access request handler 240 can receive access requests from client device 220 220A-N via the network 210 that identify one or more page 275 within the hierarchical data structure 270, and the access request handler 240 can determine, for each access request, whether the identified page 275 is associated with an indication that the layout is to be dynamically determined based on the player profile 295 of the requesting player. For example, the access request handler 240 can receive, from a client device 220 associated with a first player profile 295 of at least one player profile 295, an access request for the first page 275 via the network 210. The access request can include a player profile identifier that the access request handler 240 can use to retrieve the first player profile 295 from the storage 215. Responsive to the access request, the access request handler 240 can determine, based on the hierarchical data structure 270, that the first page 275 has the indication that the layout of the first page 275 is to be dynamically determined.

For example, the access request handler 240 can read the flag stored in association with the first page 275 in the hierarchical data structure 270 and can determine, based on the flag, the metadata field, and/or the configuration parameter, that the layout of the first page 275 is not to be served according to a static ordering defined by the operator but is instead to be generated based on the first player profile 295. For example, rather than serving a predetermined ordering in which a first zone structure 280 corresponding to a first sport category (e.g., professional basketball) is placed in a first tab position and a second zone structure 280 corresponding to a second sport category (e.g., professional football) is placed in a second tab position for each access request regardless of the requesting player, the access request handler 240 can cause the interface generator 235 to generate layout data that orders the first zone structure and the second zone structure based on the historical interaction data of the first player profile 295. In such an example, the historical interaction data of the first player profile 295 can indicate that the first player has selected content object 285 associated with the second sport category at a higher frequency than content object 285 associated with the first sport category, and the interface generator 235 can generate the layout data to place the second zone structure 280 corresponding to the second sport category in the first tab position and the first zone structure 280 corresponding to the first sport category in the second tab position within the first page 275.

The interface generator 235 can generate layout data for page 275 on a per-access-request basis by evaluating historical interaction data and attributes stored in association with the player profile 295 of the requesting player to determine an arrangement of zone structure 280 and content object 285 within the requested page 275 that corresponds to the interaction patterns and properties of the requesting player. In response to determining that the layout of the first page 275 is to be dynamically determined, the interface generator 235 can generate layout data for the first page 275 based on the historical interaction data and the set of attributes of the first player profile 295. The layout data can comprise (i) an ordering of the first set of zone structures within the first page, and/or (ii) a selection of a subset of the first set of zone structures to be presented within the first page. The ordering of the first set of zone structures can specify a sequence in which each zone structure 280 of the first set of zone structures is positioned relative to other zone structure 280 within the first page 275, such that a first zone structure 280 can be rearranged from a first position to a second position within the first page 275 based on the historical interaction data of the first player profile 295.

For example, when the first page 275 corresponds to a home page of an online wagering platform and the first set of zone structures includes a first zone structure 280 corresponding to a National Hockey League (NHL) category, a second zone structure 280 corresponding to a Premier League soccer category, and a third zone structure 280 corresponding to a Professional Golfers' Association (PGA) Tour category, the interface generator 235 can determine, based on the historical interaction data of the first player profile 295, that the first player has selected content object 285 associated with the Premier League soccer category at a frequency that exceeds the frequency of selections associated with the NHL category and the PGA Tour category. The interface generator 235 can generate the layout data to position the second zone structure 280 corresponding to the Premier League soccer category in a first tab position, the first zone structure 280 corresponding to the NHL category in a second tab position, and the third zone structure 280 corresponding to the PGA Tour category in a third tab position within the first page 275, such that the application executing on the client device 220 renders the tabs in the sequence specified by the layout data rather than a static default sequence defined by an operator via the operator device 225A-N. The selection of the subset can specify that one or more zone structure 280 of the first set of zone structures are to be included in the rendered first page while one or more remaining zone structures of the first set of zone structure 280 are to be omitted from the rendered first page, and the content object 285 within each omitted zone structure 280 can be excluded from the response generated by the interface generator 235.

In some implementations, the layout data can additionally specify an ordering and/or a selection of content object 285 within one or more zone structure 280 of the first page 275, such that the interface generator 235 can rearrange individual content object 285 within a zone structure 280 by repositioning a first content object 285 from a first display position to a second display position within the zone structure 280. For example, the interface generator 235 can determine, based on the historical interaction data of the first player profile 295, that the first player has a greater number of interactions with content object 285 associated with a first category (e.g., a first sport, a first league, a first market type, etc.) than with content object 285 associated with a second category, and can generate the layout data to order a zone structure 280 associated with the first category before a zone structure 280 associated with the second category within the first page 275. In some implementations, the layout data for the first page 275 can further specify, for at least a first zone structure of the first set of zone structure 280, an ordering of the one or more respective content object 285 associated with the first zone structure.

The ordering of the one or more respective content object 285 can be/specify a sequence in which each content object 285 associated with the first zone structure is positioned relative to other content object 285 within the first zone structure when rendered on the client device 220. In various examples, a content object 285 associated with a category that the first player has interacted with at a higher frequency (e.g., based on historical interactions indicated in the player profile 295) can be positioned before a content object 285 associated with a category that the first player has interacted with at a lower frequency within the first zone structure. The one or more respective content object 285 within the first zone structure can be arranged according to the ordering derived from the historical interaction data of the first player profile 295. In some implementations, each zone structure 280 of the first set of zone structures can be presented as a tab within the first page 275 (e.g., as depicted in the content management system interface 330 of FIG. 3D, where zone structure 280 are rendered as tabs and pills within the navigational structure of a page 275), and the layout data can specify the ordering of the tabs within the first page 275.

The interface generator 235 can generate responses to access requests that assemble rendering data for pages 275, zone structure 280, and/or content object 285 according to layout data derived from player profile 295 maintained in the storage 215, such that the response reflects an arrangement of zone structure 280 and/or content objects 285 within a page 275 that corresponds to the interaction history and/or attributes of the requesting player rather than a static ordering predetermined by an operator via an operator device 225A-N. For example, the interface generator 235 can generate, based on the hierarchical data structure 270 and the layout data, a response to the access request including data for rendering the first page 275 according to the layout data. The data processing system 205 can transmit the response to cause presentation of the first page 275 via an application executing on the client device 220, such that the first page 275 is presented with a graphical representation of the first set of zone structure 280 arranged according to the layout data. For example, the application executing on the client device 220 can render the first set of zone structure 280 as tabs in the ordering specified by the layout data, such that a tab corresponding to a zone structure 280 associated with the first category is presented in a first position and a tab corresponding to a zone structure 280 associated with the second category is presented in a second position within the first page 275. In some implementations, the interface generator 235 can arrange individual content object 285 within zone structure 280 according to the layout data generated from the player profile 295 of the requesting player, such that the ordering of content object 285 within a given zone structure 280 reflects the interaction patterns of the requesting player with the content types represented by those content object 285. For example, the interface generator 235 can generate the response to the access request such that the one or more respective content object 285 associated with a first zone structure 280 are presented in the graphical user interface according to the ordering specified by the layout data.

In some implementations, the interface generator 235 can filter content object 285 for inclusion in a rendered page 275 based on interaction frequency data stored in the player profile 295 maintained in the storage 215, such that content object 285 associated with content types that the requesting player has engaged with at elevated frequencies are included in a response while content object 285 associated with content types that the requesting player has not engaged with or has engaged with at lower frequencies may be excluded. For example, the interface generator 235 can select, based on the historical interaction data of the first player profile 295, a first subset of content object 285 from the one or more respective content object 285 of at least one zone structure 280 of the first set of zone structure 280. For example, the interface generator 235 can determine that the first player has interacted with content object 285 associated with a particular market type (e.g., a category of wagering opportunities such as game lines, player props, touchdown scorers, over-under totals, etc.) within a zone structure 280 at a frequency that exceeds a threshold frequency.

The interface generator 235 can select the content object 285 associated with the particular market type for inclusion in the first subset. In some implementations, the interface generator 235 can evaluate quantitative interaction metrics stored in the player profile 295 to determine an ordering of zone structure 280 within a page 275, such that zone structure 280 associated with content categories for which the player profile 295 indicates a greater volume of prior interactions are positioned before zone structure 280 associated with content categories for which the player profile 295 indicates a lesser volume of prior interactions. For example, the interface generator 235 can generate the layout data for the first page 275 based on a number of interactions indicated in the historical interaction data of the first player profile 295. For example, the interface generator 235 can compare a number of selections of content object 285 within a first zone structure 280 to a number of selections of content object 285 within a second zone structure 280 as indicated in the historical interaction data, and can generate the layout data to order the first zone structure 280 before the second zone structure 280 when the number of selections associated with the first zone structure 280 exceeds the number of selections associated with the second zone structure 280.

In some implementations, the interface generator 235 can evaluate player profile 295 to determine that a candidate interface element associated with a position within a page 275 is to be replaced with a different interface element for a given player, such that the data processing system 205 can present different content object 285 and/or zone structure 280 in a corresponding portion of the first page 275 to different players based on the respective historical interaction data and attributes stored in the player profile 295 maintained in the storage 215. For example, the interface generator 235 can determine, based on the historical interaction data and/or the set of attributes of the first player profile 295, that a first interface element associated with the first page 275 is to be replaced with a second interface element for presentation to the first player. For example, the hierarchical data structure 270 can associate multiple candidate zone structure 280 and/or content object 285 with a given position, region, or navigational element of the first page 275, and the interface generator 235 can select the second interface element instead of the first interface element based on the first player profile 295. In some implementations, the second interface element can correspond to a different sport category, league category, market type, promotional type, and/or account-status-specific offering than the first interface element, such that different player profile 295 are presented with different interface elements in a corresponding portion of the first page 275.

In some implementations, the interface generator 235 can analyze records of prior interactions stored in the player profile 295 maintained in the storage 215 to identify one or more content categories with which a given player has engaged, and can generate layout data that prioritizes zone structure 280 containing content object 285 associated with the identified content categories within the rendered page 275. For example, the interface generator 235 can determine, based on the historical interaction data (e.g., records of prior selections, navigation patterns, wager placements, viewing durations, etc.) of the first player profile 295, one or more categories (e.g., a sport category, a league category, an event category, a team category, a player category, a page type category, etc.) of content object 285. For example, the interface generator 235 can identify that the first player has placed wagers on content object 285 associated with a first league category (e.g., a professional women's basketball league such as the WNBA), and a second sport category (e.g., a professional women's hockey such as the PWHL) more frequently than content object 285 associated with other sport categories, and can determine the first league category and the second sport category as the one or more categories. The interface generator 235 can generate the layout data to present one or more content object 285 associated with the one or more categories within the first page 275. For example, the layout data can specify that zone structure 280 containing content object 285 associated with the first sport category and the second sport category are to be presented in a prioritized ordering relative to zone structure 280 containing content object 285 associated with the other sport categories.

In some implementations, the data processing system 205 can update player profile 295 in the storage 215 in response to interactions received from client device 220 via the network 210, such that subsequent layout data generated for a given player profile 295 reflects changes in the interaction patterns of the corresponding player over time. For example, the access request handler 240 can receive an interaction associated with the first player profile 295. For example, the access request handler 240 can receive, from the client device 220 associated with the first player profile 295, interaction data indicating a selection of a content object 285 within a zone structure 280 of the first page 275, a placement of a wager associated with a content object 285, and/or a navigation to a different zone structure 280 within the first page 275. The data structure manager 230 can update the historical interaction data of the first player profile 295 in the storage 215 based on the interaction to generate updated historical interaction data. The interface generator 235 can generate updated layout data for a subsequent access request for the first page 275 from the client device 220 based on the updated historical interaction data, such that the ordering and/or the selection of zone structure 280 within the first page 275 can change over time based on the interactions of the first player with the first page 275. For example, the updated layout data can specify a different ordering of the first set of zone structure 280 than the layout data generated for the prior access request when the updated historical interaction data indicates a change in the categories and/or frequencies of interactions of the first player.

In some implementations, the interface generator 235 can evaluate player-specific attributes stored in the player profile 295 maintained in the storage 215 to restrict presentation of one or more zone structure 280 from a rendered page 275 when the attributes of the requesting player indicate that content associated with the zone structure 280 is subject to restrictions applicable to the player. For example, the interface generator 235 can determine, based on the set of attributes of the first player profile 295, that at least one zone structure 280 of the first set of zone structure 280 is to be restricted from presentation. For example, the set of attributes of the first player profile 295 can include a geographic jurisdiction attribute indicating a jurisdiction of the first player, and the interface generator 235 can determine that a zone structure 280 associated with content object 285 that are restricted in the indicated jurisdiction is to be restricted from presentation within the first page 275. The interface generator 235 can generate the layout data to restrict presentation of the at least one zone structure 280, such that the response to the access request omits data for rendering the at least one zone structure 280 from the first page 275. For example, restricting presentation can include omitting the zone structure 280 from the rendered first page 275, omitting a tab corresponding to the zone structure 280, and/or excluding the zone structure 280 from the layout data generated for the first page 275. In some implementations, the set of attributes can include an account status attribute (e.g., a new player indicator, a depositor indicator, a player segment identifier, etc.) and the interface generator 235 can restrict presentation of one or more zone structure 280 based on the account status attribute of the first player profile 295.

Figure 5:
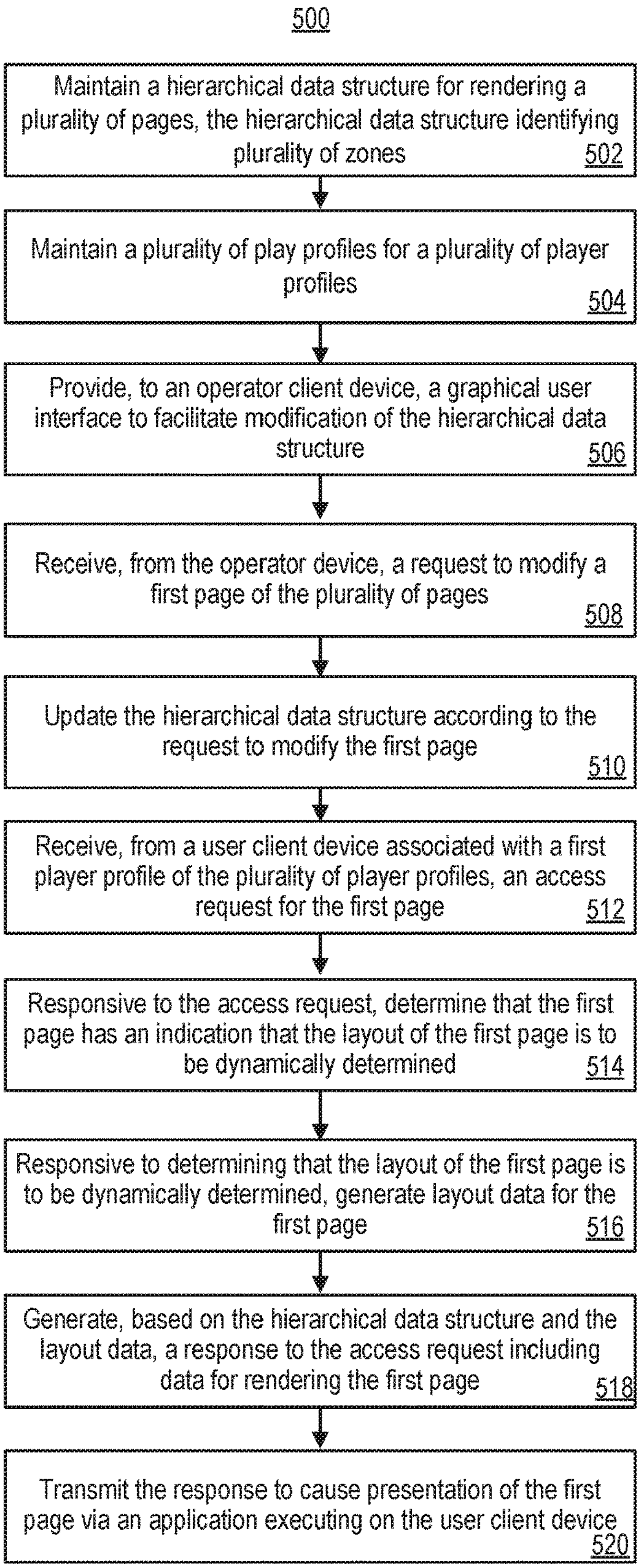
FIG. 5 is a flow chart illustrating a method for construction of graphical user interfaces according to real-time data, in accordance with one or more implementations.

Referring now to FIG. 5, illustrated is a method 500 for construction of graphical user interfaces according to real-time data. The method 500 is described as being performed by the data processing system 205 of FIG. 2. However, it should be understood that the method 500 may be performed using any computing device/system or combination of computing devices/systems described herein. Additional operations may be performed as part of the method 500 or operations of the method 500 may be omitted, in some implementations. In brief overview of the method 500, the method 500 can include maintaining a hierarchical data structure for rendering pages, the hierarchical data structure identifying zone structures associated with the pages (ACT 502), maintaining player profiles for players (ACT 504), providing, to an operator device, a graphical user interface to facilitate modification of the hierarchical data structure (ACT 506), receiving, from the operator device, a request to modify a first page of the pages (ACT 508), updating the hierarchical data structure according to the request to modify the first page (ACT 510), receiving, from a user client device associated with a first player profile, an access request for the first page (ACT 512), responsive to the access request, determining that the first page has an indication that the layout of the first page is to be dynamically determined (ACT 514), responsive to determining that the layout of the first page is to be dynamically determined, generating layout data for the first page (ACT 516), generating, based on the hierarchical data structure and the layout data, a response to the access request including data for rendering the first page (ACT 518), and/or transmitting the response to cause presentation of the first page via an application executing on the user client device (ACT 520).

FIG. 5 is a flow diagram showing a method 500 for construction of graphical user interfaces according to real-time data, in accordance with some implementations of the present disclosure. The method 500 can be performed by the data processing system (e.g., the data processing system 205 of FIG. 2), or by any computing device or combination of computing devices described herein. The method 500 can include operations performed by the data structure manager 230, the interface generator 235, the access request handler 240, and/or the criteria evaluator 245 of the data processing system to generate layout data for pages (e.g., pages 275) on a per-access-request basis using historical interaction data and attributes stored in association with corresponding player profiles (e.g., player profiles 295).

The method 500, at ACT 502, can include maintaining, by the data processing system, a hierarchical data structure (e.g., the hierarchical data structure 270 of FIG. 2) for rendering pages, the hierarchical data structure identifying zone structures associated with the pages, each zone structure of the zone structures associated with one or more respective content objects. The data processing system can store the hierarchical data structure in storage (e.g., the storage 215 of FIG. 2) and can access the hierarchical data structure to determine associations between pages, zone structures, and content objects in response to access requests received from client devices via the network (e.g., the network 210 of FIG. 2). Maintaining the hierarchical data structure can include performing any of the operations of the data structure manager 230 of FIG. 2, including any operations of the methods 400, 600, 700, and 800 of FIGS. 4, 6, 7, and 8.

The method 500, at ACT 504, can include maintaining, by the data processing system, player profiles for players, each player profile of the player profiles including historical interaction data and a set of attributes. The historical interaction data can indicate one or more prior interactions between a respective player and one or more pages rendered on a respective client device, such as selections of zone structures rendered as tabs, selections of content objects within zone structures, placement of wagers associated with content objects, navigation patterns across pages, and/or durations of viewing of particular zone structures and/or content objects. The set of attributes can indicate one or more properties of the respective player, such as a geographic jurisdiction, an account status, a player segment identifier, a deposit history indicator, and/or one or more category preferences derived from the historical interaction data. The data processing system can store each player profile in storage in association with a player profile identifier that the access request handler can use to retrieve the player profile in response to an access request from a client device associated with the player profile. Maintaining the player profiles can include performing any of the operations of the data structure manager 230 of FIG. 2, including any operations of the methods 400, 600, 700, and 800 of FIGS. 4, 6, 7, and 8.

The method 500, at ACT 506, can include providing, by the data processing system, to an operator device (e.g., at least one of the operator devices 225A-N of FIG. 2), a graphical user interface to facilitate modification of the hierarchical data structure. The interface generator can generate data for rendering the graphical user interface on the operator device, the graphical user interface presenting representations of zone structures, content objects, navigational elements (e.g., tabs, pills, section headers, etc.), and/or page-level configuration parameters associated with a selected page of the hierarchical data structure. The graphical user interface can include one or more actionable objects through which an operator can select a page-level configuration parameter to indicate that a layout of a selected page is to be dynamically determined based on player profile data rather than a static ordering defined by the operator. Providing the graphical user interface can include performing any of the operations of the interface generator 235 of FIG. 2, including any operations of the methods 400, 600, 700, and 800 of FIGS. 4, 6, 7, and 8.

The method 500, at ACT 508, can include receiving, by the data processing system, from the operator device, a request to modify a first page of the pages, the request including (i) a selection of a first set of zone structures of the zone structures to be presented within the first page, and (ii) an indication that a layout of the first page is to be dynamically determined. The selection of the first set of zone structures can specify one or more zone structure identifiers corresponding to zone structures stored in the hierarchical data structure that are to be included in the first page. The indication that the layout of the first page is to be dynamically determined can be a flag, a metadata portion, and/or a configuration parameter stored in association with the first page in the hierarchical data structure that instructs the data processing system to generate layout data for the first page on a per-access-request basis using player profile data rather than serving a static layout. The access request handler can receive the request from the operator device via the network and can forward the request to the data structure manager for processing. Receiving the request can include performing any of the operations of the access request handler 240 of FIG. 2, including any operations of the methods 400, 600, 700, and 800 of FIGS. 4, 6, 7, and 8.

The method 500, at ACT 510, can include updating, by the data processing system, the hierarchical data structure according to the request to modify the first page. The data structure manager can update the hierarchical data structure in storage to associate the first set of zone structures with the first page and to store the indication that the layout of the first page is to be dynamically determined. Following the update, the hierarchical data structure can indicate that subsequent access requests from client devices for the first page are to be served with layout data generated based on the requesting player profile rather than a predetermined ordering of zone structures. Updating the hierarchical data structure can include performing any of the operations of the data structure manager 230 of FIG. 2, including any operations of the methods 400, 600, 700, and 800 of FIGS. 4, 6, 7, and 8.

The method 500, at ACT 512, can include receiving, by the data processing system, from a user client device (e.g., a client device 220A of FIG. 2) associated with a first player profile of the player profiles, an access request for the first page. The access request can be transmitted by a client application executing on the user client device via the network. The access request can include a player profile identifier that the access request handler can use to retrieve the first player profile from storage. In some implementations, the access request can include a device identifier, a session identifier, and/or a token associated with the user client device. Receiving the access request can include performing any of the operations of the access request handler 240 of FIG. 2, including any operations of the methods 400, 600, 700, and 800 of FIGS. 4, 6, 7, and 8.

The method 500, at ACT 514, can include, responsive to the access request, determining, by the data processing system, based on the hierarchical data structure, that the first page has the indication that the layout of the first page is to be dynamically determined. The access request handler can read the flag, the metadata portion, and/or the configuration parameter stored in association with the first page in the hierarchical data structure and can determine, based on the flag, the metadata portion, and/or the configuration parameter, that the layout of the first page is not to be served according to a static ordering defined by the operator but is instead to be generated based on the first player profile. For example, rather than serving a predetermined ordering in which a first zone structure corresponding to a first sport category is placed in a first tab position and a second zone structure corresponding to a second sport category is placed in a second tab position for each access request regardless of the requesting player, the access request handler can cause the interface generator to generate layout data that orders the first zone structure and the second zone structure based on the historical interaction data of the first player profile. Determining that the first page has the indication can include performing any of the operations of the access request handler 240 of FIG. 2, including any operations of the methods 400, 600, 700, and 800 of FIGS. 4, 6, 7, and 8.

The method 500, at ACT 516, can include, in response to determining that the layout of the first page is to be dynamically determined based on the hierarchical data structure, generating, by the data processing system, layout data for the first page based on the historical interaction data and the set of attributes of the first player profile. The interface generator can generate the layout data by evaluating the historical interaction data and the set of attributes of the first player profile to determine an arrangement of the first set of zone structures within the first page that corresponds to the interaction patterns and properties of the first player. In some implementations, the layout data for the first page can include (i) an ordering of the first set of zone structures within the first page, or (ii) a selection of a subset of the first set of zone structures to be presented within the first page. The ordering can specify a sequence in which each zone structure of the first set of zone structures is positioned relative to other zone structures within the first page, such that a zone structure associated with a category that the first player has interacted with at a higher frequency can be positioned before a zone structure associated with a category that the first player has interacted with at a lower frequency. The selection of the subset can specify that one or more zone structures of the first set of zone structures are to be included in the rendered first page while one or more remaining zone structures of the first set of zone structures are to be omitted from the rendered first page. Generating the layout data can include performing any of the operations of the interface generator 235 of FIG. 2, including any operations of the methods 400, 600, 700, and 800 of FIGS. 4, 6, 7, and 8.

In some implementations, the layout data for the first page can further specify, for at least a first zone structure of the first set of zone structures, an ordering of the one or more respective content objects associated with the first zone structure, such that content objects within a zone structure can be rearranged based on the historical interaction data of the first player profile. In some implementations, each zone structure of the first set of zone structures can be presented as a tab within the first page, and the layout data can specify the ordering of the tabs within the first page. In some implementations, the method 500 can include selecting, by the data processing system, based on the historical interaction data of the first player profile, a first subset of content objects from the one or more respective content objects of at least one zone structure of the first set of zone structures. For example, the interface generator can determine that the first player has interacted with content objects associated with a particular market type within a zone structure at a frequency that exceeds a threshold frequency, and can select the content objects associated with the particular market type for inclusion in the first subset. In some implementations, the method 500 can include generating, by the data processing system, the layout data for the first page based on a number of interactions indicated in the historical interaction data of the first player profile. For example, the interface generator can compare a number of selections of content objects within a first zone structure to a number of selections of content objects within a second zone structure as indicated in the historical interaction data, and can generate the layout data to order the first zone structure before the second zone structure when the number of selections associated with the first zone structure exceeds the number of selections associated with the second zone structure. Selecting and generating the layout data can include performing any of the operations of the interface generator 235 of FIG. 2, including any operations of the methods 400, 600, 700, and 800 of FIGS. 4, 6, 7, and 8.

In some implementations, the method 500 can include determining, by the data processing system, based on the historical interaction data of the first player profile, one or more categories of content objects, and generating, by the data processing system, the layout data to present one or more content objects associated with the one or more categories within the first page. For example, the interface generator can identify that the first player has placed wagers on content objects associated with a first league category and a second sport category more frequently than content objects associated with other sport categories, and can determine the first league category and the second sport category as the one or more categories. The interface generator can generate the layout data to position zone structures containing content objects associated with the one or more categories in prioritized positions relative to zone structures containing content objects associated with other categories. In some implementations, the method 500 can include receiving, by the data processing system, an interaction associated with the first player profile, updating, by the data processing system, the historical interaction data of the first player profile based on the interaction to generate updated historical interaction data, and generating, by the data processing system, updated layout data for a subsequent access request for the first page from the user client device based on the updated historical interaction data. The access request handler can receive, from the user client device associated with the first player profile, interaction data indicating a selection of a content object within a zone structure of the first page, a placement of a wager associated with a content object, and/or a navigation to a different zone structure within the first page. The data structure manager can update the historical interaction data of the first player profile in storage based on the interaction data to generate the updated historical interaction data. The interface generator can generate the updated layout data for the subsequent access request such that the ordering and/or the selection of zone structures within the first page can change over time based on the interactions of the first player with the first page. Determining the categories and generating the updated layout data can include performing any of the operations of the interface generator 235 of FIG. 2, including any operations of the methods 400, 600, 700, and 800 of FIGS. 4, 6, 7, and 8.

In some implementations, the method 500 can include determining, by the data processing system, based on the set of attributes of the first player profile, that at least one zone structure is to be restricted from presentation, and generating, by the data processing system, the layout data to restrict presentation of the at least one zone structure. For example, the set of attributes of the first player profile can include a geographic jurisdiction attribute indicating a jurisdiction of the first player, and the interface generator can determine that a zone structure associated with content objects that are restricted in the indicated jurisdiction is to be restricted from presentation within the first page. The interface generator can generate the layout data to omit the at least one zone structure from the rendered first page, such that the response to the access request excludes data for rendering the at least one zone structure. Determining the restriction and generating the layout data can include performing any of the operations of the interface generator 235 of FIG. 2, including any operations of the methods 400, 600, 700, and 800 of FIGS. 4, 6, 7, and 8.

The method 500, at ACT 518, can include generating, by the data processing system, based on the hierarchical data structure and the layout data, a response to the access request including data for rendering the first page according to the layout data. The interface generator can traverse the hierarchical data structure from the first page to the first set of zone structures and to the content objects associated with each zone structure of the first set of zone structures, and can generate the response including rendering data for each zone structure and content object that is included in the layout data. The response can include data for rendering each zone structure of the first set of zone structures as a navigational element (e.g., a tab, a pill, a section header, etc.) within the first page and for rendering the content objects within the graphical representations of the respective zone structures. In some implementations, the method 500 can include generating the response to the access request such that the one or more respective content objects associated with a first zone structure are presented in the graphical user interface according to the ordering specified by the layout data. For example, the interface generator can generate the response such that content objects within a first zone structure are arranged in an ordering derived from the historical interaction data of the first player profile, with content objects associated with categories that the first player has interacted with at a higher frequency positioned before content objects associated with categories that the first player has interacted with at a lower frequency. Generating the response can include performing any of the operations of the interface generator 235 of FIG. 2, including any operations of the methods 400, 600, 700, and 800 of FIGS. 4, 6, 7, and 8.

The method 500, at ACT 520, can include transmitting, by the data processing system, the response to cause presentation of the first page via an application executing on the user client device, such that the first page is presented with a graphical representation of the first set of zone structures arranged according to the layout data. The data processing system can transmit the response to the user client device via the network, and the application executing on the user client device can render the first page by presenting the first set of zone structures as tabs, pills, and/or section headers in the ordering specified by the layout data. For example, the application can render a tab corresponding to a zone structure associated with a first category in a first position and a tab corresponding to a zone structure associated with a second category in a second position within the first page, based on the layout data generated by the interface generator from the historical interaction data and the set of attributes of the first player profile. In some implementations, the application executing on the user client device can render the first page across different client platforms (e.g., a mobile application, a web application, a desktop application, etc.) based on platform-specific rendering instructions while preserving the page, zone structure, and content object associations and the ordering specified by the layout data. Transmitting the response can include performing any of the operations of the interface generator 235 of FIG. 2, including any operations of the methods 400, 600, 700, and 800 of FIGS. 4, 6, 7, and 8.

D. Systems and Methods for Hierarchical Presentation of Graphical User Interface Elements This disclosure relates to techniques for dynamically rendering graphical user interface elements based on real-time content availability determinations derived from external data sources. Web-based platforms can present pages to users across various digital platforms, such as mobile applications, web applications, and desktop applications. As described herein, operators of such platforms can define the structural arrangement of pages, including the placement of navigational elements and the association of content items with content regions for presentation to users via client devices.

However, conventional approaches to constructing web pages can involve manual creation and maintenance of individual pages in which operators manually determine when content should be displayed and when content should be removed from a page. In such conventional approaches, an operator can monitor external conditions, such as whether a sporting event has commenced or whether wagering markets are open, and can manually update the page to add or remove content items based on the operator's determination of whether the content items should be presented to users at a given time. Because the operator performs the availability determination and the corresponding page update as a manual process, the speed at which page content reflects current conditions can be limited by the responsiveness of the operator. Moving a content item from one page to another page can require the operator to manually recreate the content item on the new page and to assume responsibility for monitoring and updating the content item in the new location, because there is no centralized mechanism that governs when and whether to display a given content item independent of the specific page on which the content item resides. The reliance on manual operator intervention for content visibility decisions can prevent the reuse of content items across different pages without requiring the operator to separately manage each placement. Furthermore, conventional page construction approaches can lack the ability to determine the availability of content at a granular level based on real-time information from external systems, such as real-time data feeds, because the availability determination is performed by the operator rather than by a system that interfaces with external data sources.

As a result, pages constructed using conventional approaches can present content that is no longer available, or can fail to present content that has become available, because the operator has not yet performed the manual update to add or remove the content item from the page. Conventional approaches can also lack the ability to suppress higher-level navigational elements, such as tabs or navigation items, when all child content items associated with the navigational elements are unavailable, because the operator may not recognize that each child content item within a navigational element has become unavailable or may not update the page to remove the empty navigational element in a timely manner, resulting in the presentation of empty interface elements to users. In addition, conventional approaches can lack a mechanism by which non-content elements, such as text labels or images placed adjacent to content items within a page region, are correlated with the availability of the adjacent content items, such that the non-content elements can persist in the rendered page even when the adjacent content items are unavailable because the operator has removed the content items without removing the associated non-content elements.

The techniques described herein can provide a system and method for dynamically rendering graphical user interface elements using a centralized availability evaluation layer that can interface with one or more external computing systems to determine whether each content object within a hierarchical data structure is available for presentation at a given time. The centralized availability evaluation layer can derive the availability of higher-level structural elements, such as zone structures rendered as tabs or navigation items, from the availability of child zone structures or child content objects, such that the higher-level structural elements can be suppressed from the rendered page when all child content is unavailable. The techniques described herein can decouple the availability evaluation from the page-specific rendering code of individual pages, such that a content object can be placed on any page within the hierarchical data structure and the centralized availability evaluation layer can determine the availability of the content object without requiring page-specific logic to be reimplemented for each new placement.

To implement the techniques described herein, a data processing system can maintain a hierarchical data structure in which each content object can store metadata that includes availability criteria that specify elements of one or more external domain systems to be evaluated and a processing rule that yields a binary availability determination for the content object. The data processing system can evaluate the availability criteria associated with each content object by interfacing with the one or more external computing systems via a real-time messaging interface to obtain current availability information. Based on the availability evaluation, the data processing system can generate a response to an access request from a client device that includes data for rendering a page with graphical representations of the zone structures and content objects that are determined to be available, and without graphical representations of the zone structures and content objects that are determined to be unavailable. The availability of a zone structure can be derived from the availability of the child elements of the zone structure, such that a zone structure rendered as a tab can be suppressed from the page when each child content object of the zone structure is unavailable. For content objects of a non-content type, such as a text content object placed adjacent to a content-driven content object within a zone structure, the data processing system can apply a pass-through availability rule that conditions the availability of the non-content object on the availability of at least one adjacent content object within the same zone structure. The availability criteria can be expressed as a declarative configuration that specifies what elements of external domain systems are to be considered and how the elements are to be processed to yield the binary availability determination, such that new content types can be supported by defining new declarative configurations without requiring changes to the page-level rendering code.

In doing so, the techniques described herein can address the limitations of conventional content management approaches by providing a centralized availability evaluation layer that can replace the page-embedded availability logic of conventional approaches, such that content objects can be moved between pages and zone structures without re-implementing availability logic for each new placement. The techniques described herein can reduce the presentation of empty interface elements by deriving the availability of higher-level structural elements from the availability of child elements, providing a technical improvement over conventional approaches that render structural elements regardless of the availability of the underlying content. The techniques described herein can further reduce the presentation of orphaned non-content elements, such as text labels or images that remain visible when adjacent content is unavailable, by correlating the availability of non-content elements with the availability of adjacent content objects within the same zone structure. The declarative configuration of availability criteria can reduce the computational and development resources associated with adding new content types to the system, because each new content type can define availability criteria through a declarative expression rather than through custom page-level code.

By virtue of the implementation of the techniques described herein, processing and memory resource consumption can be reduced by a system handling the rendering of graphical user interface elements based on real-time content availability determinations. For example, a system can evaluate availability criteria associated with zone structures and content objects within a hierarchical data structure by interfacing with external computing systems to obtain real-time availability information, and can suppress unavailable zone structures and content objects from rendered pages without requiring page-specific rendering logic to be maintained for each individual page. By causing the system to maintain a hierarchical data structure identifying at least one zone structure associated with at least one page, receive a request comprising visibility data specifying availability criteria for presentation of a first zone structure, update the hierarchical data structure to associate the visibility data with the first zone structure, and generate a first response to a first access request including data for rendering the first page without a graphical representation of the first zone structure when the availability criteria are not satisfied, the system can avoid processing and storing rendering data for unavailable zone structures and content objects, thereby conserving processor cycles and memory allocations that would otherwise be consumed by generating and holding rendering data for interface elements that are not presented to users. As a result, overall processing and memory resource consumption can be reduced by the system, both by virtue of the centralized availability evaluation that eliminates redundant per-page availability logic and the selective omission of unavailable zone structures from response payloads that reduces the volume of rendering data the system generates and maintains in memory for each access request.

In various implementations, network communication overhead can be reduced by a system that selectively transmits rendering data for available content based on real-time availability determinations derived from a centralized hierarchical data structure. For example, a system can evaluate availability criteria associated with zone structures at the time of each access request and can generate responses that include data for rendering zone structures determined to be available while omitting data for rendering zone structures determined to be unavailable, rather than transmitting a full static payload that includes rendering data for all zone structures regardless of availability status. By causing the system to receive a first access request for a first page that includes the first zone structure, generate a first response including data for rendering the first page without a graphical representation of the first zone structure when the availability criteria are not satisfied, and generate a second response to a second access request including data for rendering the first page with the graphical representation of the first zone structure when the availability criteria are satisfied, the system can reduce the payload size of each response by including rendering data for zone structures and content objects that are available for presentation and excluding rendering data for zone structures and content objects that are unavailable for presentation at the receipt time of each access request. As a result, the volume of network communications between the system and client devices can be reduced because the system transmits tailored responses that reflect the current availability state of each zone structure rather than transmitting uniform payloads that include data for all zone structures irrespective of availability.

In some examples, accuracy of rendered graphical user interfaces can be improved by a system that derives the presentation state of each zone structure from real-time availability determinations evaluated against a centralized hierarchical data structure. For example, conventional approaches that rely on manual operator intervention to add or remove content from pages can present content that is no longer available or can fail to present content that has become available, because the operator has not performed the manual update to reflect the current availability state. By causing the system to update the hierarchical data structure to associate visibility data specifying availability criteria with a first zone structure, generate a first response to a first access request including data for rendering the first page without a graphical representation of the first zone structure when the availability criteria are not satisfied, and generate a second response to a second access request including data for rendering the first page with the graphical representation of the first zone structure when the availability criteria are satisfied, the system can present each zone structure in a state that corresponds to the current availability of the underlying content at the time of each access request, rather than relying on a manual update that can lag behind changes in content availability. As a result, the accuracy and consistency of rendered graphical user interfaces can be improved by the system because each access request is resolved against the current availability state of each zone structure as determined by the centralized availability evaluation rather than against a manually maintained page configuration that can diverge from the actual availability of content over time.

Referring now back to FIG. 2, in some embodiments, the system 200 of FIG. 2 can be configured to implement hierarchical presentation of graphical user interface elements. The system 200 can include one or more processors (e.g., one or more processors 121 of FIG. 1D) coupled to memory (e.g., memory 122 of FIG. 1D) storing instructions for implementing the hierarchical presentation of graphical user interface elements. As described above in connection with Section B, the data processing system 205 can maintain the hierarchical data structure 270 in the storage 215 for rendering at least one page 275, the hierarchical data structure 270 identifying at least one zone structure 280 associated with at least one page 275, each zone structure 280 of at least one zone structures associated with one or more respective content objects 285.

Operators can configure availability criteria for zone structures 280 within the hierarchical data structure 270 by transmitting modification requests to the data processing system 205 via operator devices 225A-N. The access request handler 240 can receive, from an operator device 225 via the network 210, a request to modify a first zone structure 280 of the at least one zone structures within the hierarchical data structure 270. The request can include visibility data specifying availability criteria for presentation of the first zone structure 280 within a page 275 rendered on a client device 220. The availability criteria can specify one or more conditions under which the first zone structure 280 is to be presented or suppressed within a graphical user interface rendered on a client device 220, such as time criteria, location criteria, and/or an availability rule derived from one or more external computing systems. For example, an operator using an operator device 225 can interact with an operator-facing graphical user interface (e.g., the content management system interface 320 depicted in FIG. 3C) to specify a publish time, an expiration time, one or more jurisdictional parameters, and/or one or more availability rules for a zone structure 280, and the operator device 225 can transmit a corresponding request to the data processing system 205 in response to the interaction. The data structure manager 230 can update the hierarchical data structure 270 in the storage 215 according to the request to modify the first zone structure 280 to associate the visibility data with the first zone structure 280, such that the criteria evaluator 245 can evaluate the availability criteria associated with the first zone structure 280 in response to each subsequent access request from a client device 220 for a page 275 that references the first zone structure 280.

The access request handler 240 can process access requests from client device 220 220A-N for pages 275 that reference zone structures 280 having associated visibility data, and can coordinate with the criteria evaluator 245 to determine whether each referenced zone structure 280 satisfies the availability criteria at the receipt time of the access request. For example, the access request handler 240 can receive a first access request for a first page 275 that includes the first zone structure 280 via the network 210 from a client device 220. The first access request can correspond to a first time at which the availability criteria associated with the first zone structure 280 are not satisfied. For example, the first access request can be received at a time before a start time specified by a time criteria of the availability criteria, at a time after an end time specified by time criteria, and/or at a time at which one or more external computing systems indicate that content associated with the first zone structure 280 is unavailable.

The criteria evaluator 245 can evaluate the availability criteria associated with the first zone structure 280 in the hierarchical data structure 270 and can determine that the availability criteria are not satisfied at the time of the first access request. In some implementations, the criteria evaluator 245 can evaluate the availability criteria associated with one or more content object 285 referenced by the first zone structure 280 by interfacing with the one or more external computing systems via the network 210 to obtain real-time availability information for each content object 285, such as market data, sports data feed information, and/or game state data. For example, when the first zone structure 280 corresponds to a tab on an event page 275 and each content object 285 within the first zone structure 280 represents a content feature associated with wagering opportunities for a scheduled sporting event, the criteria evaluator 245 can determine that the availability criteria are not satisfied when the one or more external computing systems indicate that no wagering markets associated with the content object 285 are open at the receipt time of the first access request.

The interface generator 235 can generate responses to access requests that selectively include or omit rendering data for zone structures 280 based on the availability determinations performed by the criteria evaluator 245, such that each response reflects the current availability state of each zone structure 280 referenced by the requested page 275 at the receipt time of the access request. For example, the interface generator 235 can generate, based on the hierarchical data structure 270 and the visibility data, a first response to the first access request that includes data for rendering the first page 275 without a graphical representation of the first zone structure 280. The first response can include data for rendering each zone structure 280 associated with the first page 275 for which the criteria evaluator 245 has determined that the respective availability criteria are satisfied, while omitting data for rendering the first zone structure 280 and the one or more content object 285 referenced by the first zone structure 280.

In some implementations, the interface generator 235 can generate the first response to omit navigation data (e.g., a tab label, a pill label, a section header, etc.) corresponding to the first zone structure 280 from the first page 275, such that a user of the client device 220 does not see a navigational element that corresponds to unavailable content. In some implementations, the interface generator 235 can generate additional responses to access requests for other pages 275 that reference the first zone structure 280 within the hierarchical data structure 270, each additional response omitting data for rendering the first zone structure 280 from the respective page 275 when the criteria evaluator 245 has determined that the availability criteria associated with the first zone structure 280 are not satisfied at the receipt time of the respective access request. For example, when the first zone structure 280 is referenced by both a league page 275 and an event page 275 within the hierarchical data structure 270, the interface generator 235 can omit data for rendering the first zone structure 280 from each of the league page 275 and the event page 275 in response to respective access requests received while the availability criteria are not satisfied. In some implementations, the interface generator 235 can generate the first response to include data for rendering one or more content object 285 associated with other zone structures 280 of the first page 275 that are determined to be available by the criteria evaluator 245, such that the first page 275 is rendered with the available zone structures 280 and without the first zone structure 280.

The data processing system 205 can transmit the first response to the client device 220 via the network 210 to cause presentation of the first page 275, such that the first page 275 is presented without the first zone structure 280. For example, when the first zone structure 280 corresponds to a "Live In-Play" tab on a National Hockey League (NHL) event page 275 and the criteria evaluator 245 has determined that no live wagering markets associated with the content object 285 referenced by the first zone structure 280 are open because the scheduled NHL game has not commenced, the application executing on the client device 220 can render the NHL event page 275 without presenting a "Live In-Play" tab label or any content object 285 within the first zone structure 280. In some implementations, the criteria evaluator 245 can store, in the hierarchical data structure 270 in association with the first zone structure 280, a visibility state that indicates whether the first zone structure 280 is in a visible state or an invisible state at a given time based on the availability criteria. For example, the criteria evaluator 245 can set the visibility state of the first zone structure 280 to an invisible state when the availability criteria are not satisfied, such that the interface generator 235 omits the graphical representation of the first zone structure 280 from the first response, and can set the visibility state to a visible state when the availability criteria are satisfied, such that the interface generator 235 includes the graphical representation of the first zone structure 280 in a subsequent response to a subsequent access request from a client device 220.

The access request handler 240 can receive subsequent access requests for the same page 275 and can coordinate with the criteria evaluator 245 to re-evaluate the availability criteria at the receipt time of each subsequent access request, such that a zone structure 280 that was suppressed in a prior response can be included in a subsequent response when the availability criteria transition from an unsatisfied state to a satisfied state. For example, the access request handler 240 can receive a second access request for the first page 275 via the network 210 from the client device 220 and/or a different client device 220A-N. The second access request can correspond to a second time at which the availability criteria associated with the first zone structure 280 are satisfied. For example, the second access request can be received at a time after a start time specified by the time criteria and before an end time specified by the time criteria, and/or at a time at which one or more external computing systems indicate that content associated with the first zone structure 280 is available for presentation.

In some implementations, the second access request can correspond to a second time at which availability criteria associated with a page 275, a content object 285, and/or a sub-zone structure within the first zone structure 280 are satisfied, such that the criteria evaluator 245 can evaluate satisfaction of the availability criteria at each level of the hierarchical data structure 270 referenced by the first page 275. The criteria evaluator 245 can evaluate the availability criteria associated with the first zone structure 280 in the hierarchical data structure 270 and can determine that the availability criteria are satisfied at the time of the second access request. The interface generator 235 can generate, based on the hierarchical data structure 270 and the visibility data, a second response to the second access request that includes data for rendering the first page 275 with the graphical representation of the first zone structure 280. The data processing system 205 can transmit the second response to the client device 220 via the network 210 to cause presentation of the first page 275, such that the first page 275 is presented with the graphical representation of the first zone structure 280 at the second time in accordance with the visibility data.

The availability criteria stored in the hierarchical data structure 270 in association with zone structures 280 can encompass various types of conditions that the criteria evaluator 245 can evaluate to determine whether a given zone structure 280 is available for presentation at the receipt time of an access request. In some implementations, the availability criteria can include a time criteria specifying at least one of (i) a start time at which the first zone structure 280 becomes available for presentation and/or (ii) an end time at which the first zone structure 280 becomes unavailable for presentation. For example, the time criteria can specify a start time corresponding to a scheduled start time of a sporting event and an end time corresponding to a scheduled end time of the sporting event, such that the criteria evaluator 245 can compare a receipt time of an access request from a client device 220 to the start time and the end time to determine whether the first zone structure 280 is available for presentation at the receipt time. The time criteria can facilitate suppression of zone structures 280 that reference content object 285 associated with events that have not commenced and/or events that have concluded, such that the interface generator 235 can omit graphical representations of zone structures 280 from a rendered page 275 during periods in which no underlying content is available for user interaction.

In some implementations, the availability criteria can include location criteria, and the criteria evaluator 245 can determine, based on location data associated with a client device 220 (e.g., a geographic coordinate, a jurisdiction identifier, an IP-address-derived location, etc.), satisfaction of the location criteria. For example, the location criteria can specify one or more geographic jurisdictions in which the first zone structure 280 is permitted for presentation, and the criteria evaluator 245 can compare the location data associated with the client device 220 to the one or more geographic jurisdictions to determine whether the location criteria are satisfied. The location criteria can facilitate restriction of zone structures 280 from presentation in jurisdictions where the content object 285 referenced by the zone structures 280 are subject to regulatory restrictions and/or are not offered, such that the data processing system 205 can generate responses that omit zone structures 280 containing content object 285 that are unavailable in the jurisdiction of the requesting client device 220. The interface generator 235 can generate the first response or the second response based on the satisfaction or non-satisfaction of the location criteria.

The criteria evaluator 245 can interface with one or more external computing systems via the network 210 to receive real-time availability information that informs the availability determinations for zone structures 280 and content object 285 within the hierarchical data structure 270. In some implementations, the criteria evaluator 245 can receive, from one or more external computing systems via the network 210, an availability message indicating availability of content associated with the first zone structure 280. An availability message can be data generated by an external computing system that indicates a change in availability status of content associated with one or more content object 285 referenced by the first zone structure 280 (e.g., a transition of one or more wagering markets from an unavailable state to an available state and/or from an available state to an unavailable state). The availability message can include one or more identifiers corresponding to the affected content object 285 and/or zone structures 280, a timestamp indicating when the availability state changed, and/or a binary or enumerated value indicating the current availability state (e.g., available, unavailable, suspended, etc.) of the identified content. For example, the one or more external computing systems can include a trading system, a sports data feed, and/or a market data feed that transmits an availability message to the data processing system 205 via a real-time messaging interface (e.g., a Kafka-based interface, a streaming interface, etc.) when market content associated with the first zone structure 280 becomes available or becomes unavailable. The criteria evaluator 245 can determine satisfaction of the availability criteria based on the availability message, such that the interface generator 235 can generate a response to a subsequent access request from a client device 220 that includes or omits data for rendering the first zone structure 280 based on the availability indicated in the availability message.

Operators can define schedule-based availability criteria for zone structures 280 within the hierarchical data structure 270 by transmitting schedule data to the data processing system 205 via operator devices 225A-N. For example, an operator using an operator device 225 can interact with an operator-facing graphical user interface (e.g., the content management system interface 320 depicted in FIG. 3C) to specify one or more availability periods during which content associated with a zone structure 280 is to be presented, and the operator device 225 can transmit the schedule data to the data processing system 205 in response to the interaction. In some implementations, the access request handler 240 can receive, from an operator device 225 via the network 210, schedule data defining one or more availability periods for presentation of one or more wager opportunities associated with the first zone structure 280. The criteria evaluator 245 can determine satisfaction of the availability criteria by comparing a receipt time of the first access request or the second access request to the one or more availability periods defined by the schedule data. For example, the schedule data can define a first availability period from a first start time to a first end time and a second availability period from a second start time to a second end time, and the criteria evaluator 245 can determine that the availability criteria are satisfied when the receipt time of the access request falls within either the first availability period or the second availability period. In some implementations, the schedule data can define a recurring schedule for the one or more availability periods, such as a weekly recurring schedule in which the first zone structure 280 is available for presentation during a designated day-of-week window. The criteria evaluator 245 can determine satisfaction of the availability criteria based on comparing the receipt time of the first access request or the second access request to the recurring schedule.

Referring now to FIG. 3C in the context of the components described in connection with FIG. 2, illustrated is a graphical user interface (GUI) depicting a content management system interface 320 showing configuration of a content object 285, in accordance with one or more implementations. The content management system interface 320 can be rendered on an operator device 225A-N and can display a content object configuration panel 322 overlaying a listing of zone structures 280 associated with a selected page 275 of the hierarchical data structure 270. The content object configuration panel 322 can present one or more configuration fields through which an operator can define metadata for a content object 285 associated with a zone structure 280 within the selected page 275, such as a title field, a contextual data toggle, a subcategory selector, one or more market tag filter fields, a site experiences selector, a show bet breakdown toggle, an insert-before selector, and/or a feature flag suffix field. The content object configuration panel 322 can include a publish time 324 field and an expiration time 326 field through which the operator can specify a start time at which the content object 285 becomes available for presentation and an end time at which the content object 285 becomes unavailable for presentation, respectively.

The criteria evaluator 245 can compare a receipt time of an access request from a client device 220 to the publish time 324 and the expiration time 326 stored in association with the content object 285 in the hierarchical data structure 270 to determine whether the content object 285 is within an active presentation window at the receipt time. In some implementations, the publish time 324 and the expiration time 326 associated with one or more content objects 285 referenced by the first zone structure 280 can be used by the criteria evaluator 245 in determining whether the first zone structure 280 satisfies the availability criteria. For example, when the publish time 324 specifies a start time of 12:00 PM and the expiration time 326 specifies an end time of 11:00 PM, the criteria evaluator 245 can determine that the content object 285 is within the active presentation window when the receipt time of the access request falls between 12:00 PM and 11:00 PM, and can determine that the content object 285 is outside the active presentation window when the receipt time falls before 12:00 PM or after 11:00 PM. In some implementations, selection of a save actionable object within the content management system interface 320 can cause the operator device 225 to transmit a request to the data processing system 205 via the network 210 to update the hierarchical data structure 270 in the storage 215 with the metadata specified in the content object configuration panel 322 for the content object 285, including the publish time 324 and the expiration time 326.

Referring now back to FIG. 2, in some implementations, operators can define declarative availability rules for zone structure 280 within the hierarchical data structure 270 by specifying rule expressions via an operator-facing graphical user interface (e.g., the content management system interface 320 depicted in FIG. 3C) rendered on an operator device 225A-N. An operator may select a zone structure 280 within the operator-facing graphical user interface and may interact with one or more configuration fields to define an availability rule that specifies how the criteria evaluator 245 is to evaluate the availability of the selected zone structure 280 based on information obtained from one or more external computing systems. The access request handler 240 can receive, from an operator device 225A-N via the network 210, an availability rule for evaluating the availability criteria associated with the first zone structure 280. The data structure manager 230 can store the availability rule as at least part of the visibility data associated with the first zone structure 280 in the hierarchical data structure 270 in the storage 215. The availability rule can specify a declarative expression that the criteria evaluator 245 can evaluate to yield a binary availability determination for the first zone structure 280. For example, the availability rule can specify that the first zone structure 280 is available for presentation when at least one content object 285 within the first zone structure 280 has available content as indicated by the one or more external computing systems, and the criteria evaluator 245 can evaluate the declarative expression by querying the one or more external computing systems for the availability of each content object 285 within the first zone structure 280 and applying the declarative expression to the query results.

In some implementations, the data processing system 205 can maintain availability state information for zone structure 280 within the hierarchical data structure 270 to reflect real-time changes in the presentation eligibility of each zone structure 280 as determined by the criteria evaluator 245 based on the associated availability criteria. The data structure manager 230 can store, in the hierarchical data structure 270 in the storage 215 and in association with the first zone structure 280, an availability status indicating availability of the first zone structure 280 for presentation. The availability status can be generated by the criteria evaluator 245 based on the availability criteria associated with the first zone structure 280. The criteria evaluator 245 can update the availability status responsive to receiving an availability message from the one or more external computing systems via the network 210. For example, the criteria evaluator 245 can receive an availability message indicating that market content associated with the first zone structure 280 has transitioned from unavailable to available, and can update the availability status of the first zone structure 280 in the hierarchical data structure 270 from an unavailable state to an available state.

In some implementations, the interface generator 235 can generate operator-facing interface data that presents availability state information for zone structure 280 within the hierarchical data structure 270 to operators via the operator device 225A-N, such that an operator can view the current presentation eligibility of each zone structure 280 and identify zone structure 280 that are suppressed from user-facing presentation due to unsatisfied availability criteria. For example, the interface generator 235 can provide, to an operator device 225A-N via the network 210, an operator interface (e.g., the content management system interface 340 depicted in FIG. 3E) that indicates a user-facing status of the first zone structure 280 based on the availability criteria. For example, the operator interface can display an expired availability indicator 342 adjacent to a zone structure 280 for which the criteria evaluator 245 has determined that the availability criteria are not satisfied, such that an operator viewing the operator interface on the operator device 225A-N can identify which zone structure 280 are currently presented to users and which zone structure 280 are currently suppressed from presentation.

Referring now to FIG. 3E in the context of the components described in connection with FIG. 2, illustrated is a graphical user interface (GUI) depicting a content management system interface 340 showing an availability status indicator, in accordance with one or more implementations. The content management system interface 340 can display a listing of zone structures 280 associated with a selected page 275 of the hierarchical data structure 270. The content management system interface 340 can display an expired availability indicator 342 adjacent to a zone structure 280 for which the criteria evaluator 245 has determined that the availability criteria associated with the zone structure 280 are not satisfied at a current time. For example, the expired availability indicator 342 can be displayed as a tooltip, a label, and/or a visual marker (e.g., a text annotation reading "Expired availability") adjacent to a zone structure 280, indicating that the content objects 285 in zone structure 280 is unavailable for presentation to users via client devices 220 at the current time. The expired availability indicator 342 can visually identify a zone structure 280 that is currently suppressed from presentation to users based on unsatisfied availability criteria.

Figure 6:
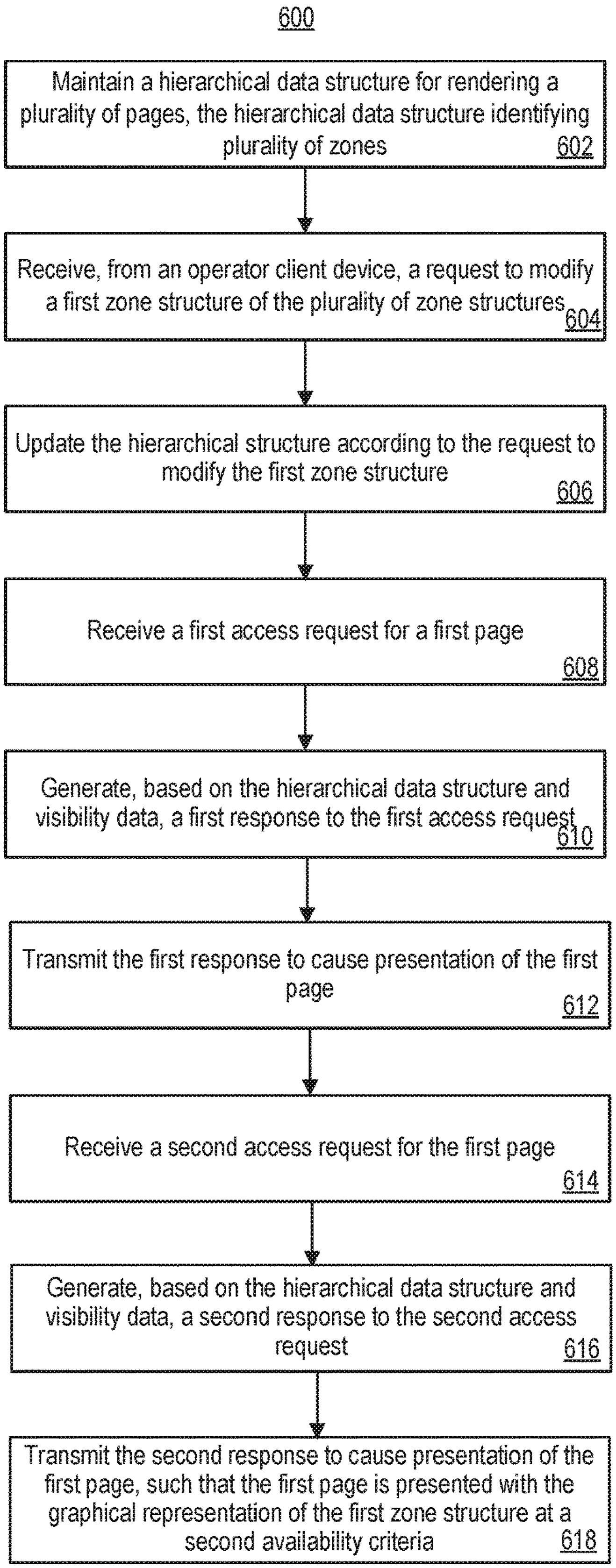
FIG. 6 is a flow chart illustrating a method for hierarchical presentation of graphical user interface elements, in accordance with one or more implementations.

Referring now to FIG. 6, illustrated is a method 600 for hierarchical presentation of graphical user interface elements. The method 600 is described as being performed by the data processing system 205 of FIG. 2. However, it should be understood that the method 600 may be performed using any computing device/system or combination of computing devices/systems described herein. Additional operations may be performed as part of the method 600 or operations of the method 600 may be omitted, in some implementations. In brief overview of the method 600, the method 600 can include maintaining a hierarchical data structure for rendering pages, the hierarchical data structure identifying zone structures associated with the pages (ACT 602), receiving, from an operator device, a request to modify a first zone structure of the zone structures (ACT 604), updating the hierarchical structure according to the request to modify the first zone structure (ACT 606), receiving a first access request for a first page (ACT 608), generating, based on the hierarchical data structure and visibility data, a first response to the first access request (ACT 610), transmitting the first response to cause presentation of the first page (ACT 612), receiving a second access request for the first page (ACT 614), generating, based on the hierarchical data structure and visibility data, a second response to the second access request (ACT 616), and/or transmitting the second response to cause presentation of the first page with the graphical representation of the first zone structure at a second availability criteria (ACT 618).

FIG. 6 is a flow diagram showing a method 600 for hierarchical presentation of graphical user interface elements, in accordance with some implementations of the present disclosure. The method 600 can be performed by a data processing system (e.g., the data processing system 205 of FIG. 2), or by any computing device or combination of computing devices described herein. The method 600 can include operations performed by the data structure manager 230, the interface generator 235, the access request handler 240, and/or the criteria evaluator 245 of the data processing system 245 of FIG. 2 to evaluate availability criteria associated with zone structures (e.g., zone structures 280) and/or content objects (e.g., content objects 285) within a hierarchical data structure (e.g., the hierarchical data structure 270) and to selectively include or omit/restrict presentation of graphical representations (e.g., user interface elements displayed according to pages 275, zone structures 280, content objects 285 of FIG. 2, etc.) of the pages, zone structures and/or content objects from responses to access requests received from client devices.

The method 600, at ACT 602, can include maintaining, by the data processing system, a hierarchical data structure (e.g., the hierarchical data structure 270 of FIG. 2) for rendering pages. The hierarchical data structure can identify zone structures associated with the pages. Each zone structure of the zone structures can be associated with one or more respective content objects. The data processing system can store the hierarchical data structure in storage (e.g., the storage 215 of FIG. 2) and can access the hierarchical data structure to determine associations between pages, zone structures, and content objects in response to access requests received from client devices via a network (e.g., the network 210 of FIG. 2). Each zone structure can store a unique zone identifier (e.g., an alphanumeric string) that the data processing system can use to locate the zone structure within the hierarchical data structure. Each content object can store metadata that specifies instructions for determining availability of the content represented by the content object, as described in connection with FIG. 2. Maintaining the hierarchical data structure can include performing any of the operations of the data structure manager 230 of FIG. 2, including any operations of the methods 400, 500, 700, and 800 of FIGS. 4, 5, 7, and 8.

The method 600, at ACT 604, can include receiving, by the data processing system, from an operator device (e.g., an operator device 225 of FIG. 2), a request to modify a first zone structure of the zone structures, the request including visibility data specifying availability criteria for presentation of the first zone structure. The visibility data can define one or more conditions under which the first zone structure is to be presented within a page rendered on a client device or suppressed from presentation within the page. The availability criteria can specify parameters that the criteria evaluator can evaluate against real-time information obtained from one or more external computing systems and/or against temporal, geographic, and/or operator-defined conditions to yield a binary availability determination for the first zone structure. In some implementations, the availability criteria can include a time criteria specifying at least one of (i) a start time at which the first zone structure becomes available for presentation or (ii) an end time at which the first zone structure becomes unavailable for presentation. For example, the time criteria can specify a start time corresponding to a scheduled start time of a sporting event associated with content objects within the first zone structure and an end time corresponding to a scheduled conclusion of the sporting event, such that the criteria evaluator can compare a receipt time of an access request from a client device to the start time and the end time to determine whether the first zone structure is available for presentation at the receipt time. In some implementations, the availability criteria can include location criteria specifying one or more geographic jurisdictions in which the first zone structure is permitted for presentation. The data processing system can receive the request from the operator device via the network and can forward the request to the data structure manager for processing. Receiving the request to modify the first zone structure can include performing any of the operations of the access request handler 240 of FIG. 2, including any operations of the methods 400, 500, 700, and 800 of FIGS. 4, 5, 7, and 8.

The method 600, at ACT 606, can include updating, by the data processing system, the hierarchical data structure according to the request to modify the first zone structure to associate the visibility data with the first zone structure. The data structure manager can store the visibility data in the hierarchical data structure in the storage in association with the first zone structure, such that the criteria evaluator can evaluate the availability criteria associated with the first zone structure in response to each subsequent access request from a client device for a page that includes the first zone structure. In some implementations, the method 600 can include receiving, by the data processing system, from the operator device, an availability rule for evaluating the availability criteria. The availability rule can specify a declarative expression that the criteria evaluator can evaluate to yield a binary availability determination for the first zone structure. For example, the availability rule can specify that the first zone structure is available for presentation when at least one content object within the first zone structure has available content as indicated by one or more external computing systems. The data structure manager can store the availability rule as at least part of the visibility data associated with the first zone structure in the hierarchical data structure in the storage. Following the update, the hierarchical data structure can indicate that subsequent access requests from client devices for a page including the first zone structure are to be evaluated against the availability criteria stored in the visibility data before the data processing system generates a response. Updating the hierarchical data structure can include performing any of the operations of the data structure manager 230 of FIG. 2, including any operations of the methods 400, 500, 700, and 800 of FIGS. 4, 5, 7, and 8.

The method 600, at ACT 608, can include receiving, by the data processing system, a first access request for a first page of the pages that includes the first zone structure, the first access request corresponding to a first time at which the availability criteria are not satisfied. The access request handler can receive the first access request from a client device via the network. The first access request can be received at a time before a start time specified by a time criteria of the availability criteria, at a time after an end time specified by the time criteria, and/or at a time at which one or more external computing systems indicate that content associated with the first zone structure is unavailable. The criteria evaluator can evaluate the availability criteria associated with the first zone structure in the hierarchical data structure and can determine that the availability criteria are not satisfied at the time of the first access request. For example, the criteria evaluator can determine that a scheduled sporting event associated with content objects within the first zone structure has not commenced and that no wagering markets associated with the content objects are open at the receipt time of the first access request. Receiving the first access request can include performing any of the operations of the access request handler 240 of FIG. 2, including any operations of the methods 400, 500, 700, and 800 of FIGS. 4, 5, 7, and 8.

The method 600, at ACT 610, can include generating, by the data processing system, based on the hierarchical data structure and the visibility data, a first response to the first access request including data for rendering the first page without a graphical representation of the first zone structure. The interface generator can generate the first response by traversing the hierarchical data structure from the first page to each zone structure associated with the first page, evaluating the availability criteria for each zone structure, and omitting data for rendering the first zone structure from the first response based on the determination that the availability criteria associated with the first zone structure are not satisfied. In some implementations, the method 600 can include determining, by the data processing system, based on location data associated with a user client device, satisfaction of the location criteria. The criteria evaluator can compare the location data (e.g., a geographic coordinate, a jurisdiction identifier, an IP-address-derived location, etc.) associated with the client device to one or more geographic jurisdictions specified by the location criteria to determine whether the location criteria are satisfied. The interface generator can generate the first response or a second response based on satisfaction or non-satisfaction of the location criteria. In some implementations, the method 600 can include receiving, by the data processing system, from one or more external computing systems via the network, an availability message indicating availability of content associated with the first zone structure. The criteria evaluator can receive the availability message via a real-time messaging interface (e.g., a Kafka-based interface, a streaming interface, etc.) and can determine satisfaction of the availability criteria based on the availability message. Generating the first response can include performing any of the operations of the interface generator 235 of FIG. 2, including any operations of the methods 400, 500, 700, and 800 of FIGS. 4, 5, 7, and 8.

In some implementations, the method 600 can include receiving, by the data processing system, from the operator device, schedule data defining one or more availability periods for presentation of one or more wager opportunities associated with the first zone structure. The criteria evaluator can determine satisfaction of the availability criteria by comparing a receipt time of the first access request or the second access request to the one or more availability periods defined by the schedule data. For example, the schedule data can define a first availability period from a first start time to a first end time and a second availability period from a second start time to a second end time, and the criteria evaluator can determine that the availability criteria are satisfied when the receipt time falls within either the first availability period or the second availability period. Receiving the schedule data can include performing any of the operations of the access request handler 240 of FIG. 2, including any operations of the methods 400, 500, 700, and 800 of FIGS. 4, 5, 7, and 8.

In some implementations, the schedule data can define a recurring schedule for the one or more availability periods, such as a weekly recurring schedule in which the first zone structure is available for presentation during a designated day-of-week window. The method 600 can include determining, by the data processing system, satisfaction of the availability criteria based on comparing the receipt time of the first access request or the second access request to the recurring schedule. For example, the criteria evaluator can compare the receipt time of an access request to a recurring weekly window (e.g., Sunday from 12:00 PM to 11:59 PM) defined by the schedule data to determine whether the first zone structure is available for presentation at the receipt time. In some implementations, the method 600 can include storing, by the data processing system, in the hierarchical data structure in the storage and in association with the first zone structure, an availability status indicating availability of the first zone structure for presentation, the availability status generated based on the availability criteria. The availability status can indicate whether the first zone structure is in an available state or an unavailable state at a given time based on the most recent evaluation of the availability criteria by the criteria evaluator. In some implementations, the method 600 can include updating, by the data processing system, the availability status responsive to receiving an availability message from one or more external computing systems via the network. For example, the criteria evaluator can receive an availability message indicating that market content associated with the first zone structure has transitioned from unavailable to available, and the data structure manager can update the availability status of the first zone structure in the hierarchical data structure from an unavailable state to an available state. Determining satisfaction of the availability criteria and updating the availability status can include performing any of the operations of the criteria evaluator 245 of FIG. 2, including any operations of the methods 400, 500, 700, and 800 of FIGS. 4, 5, 7, and 8.

The method 600, at ACT 612, can include transmitting, by the data processing system, the first response to cause presentation of the first page, such that the first page is presented without the first zone structure. The data processing system can transmit the first response to the client device via the network, and the application executing on the client device can render the first page by presenting zone structures that are determined to be available and by omitting the graphical representation of the first zone structure from the rendered first page. For example, the application executing on the client device can omit a tab label, a pill label, and/or a section header corresponding to the first zone structure from the navigational elements of the first page, such that a user of the client device does not see a navigational element that corresponds to unavailable content. Transmitting the first response can include performing any of the operations of the interface generator 235 of FIG. 2, including any operations of the methods 400, 500, 700, and 800 of FIGS. 4, 5, 7, and 8.

The method 600, at ACT 614, can include receiving, by the data processing system, a second access request for the first page, the second access request corresponding to a second time at which the availability criteria are satisfied. The access request handler can receive the second access request from the client device and/or a different client device via the network. The second access request can be received at a time after a start time specified by the time criteria and before an end time specified by the time criteria, and/or at a time at which one or more external computing systems indicate that content associated with the first zone structure is available for presentation. The criteria evaluator can evaluate the availability criteria associated with the first zone structure in the hierarchical data structure and can determine that the availability criteria are satisfied at the time of the second access request. Receiving the second access request can include performing any of the operations of the access request handler 240 of FIG. 2, including any operations of the methods 400, 500, 700, and 800 of FIGS. 4, 5, 7, and 8.

The method 600, at ACT 616, can include generating, by the data processing system, based on the hierarchical data structure and the visibility data, a second response to the second access request including data for rendering the first page with the graphical representation of the first zone structure. The interface generator can traverse the hierarchical data structure from the first page to the first zone structure and to the content objects associated with the first zone structure, and can generate the second response including rendering data for the first zone structure and the content objects that are determined to be available at the time of the second access request. In some implementations, the second response can include data for rendering the first zone structure as a navigational element (e.g., a tab, a pill, a section header, etc.) within the first page and for rendering the content objects within the graphical representation of the first zone structure. Generating the second response can include performing any of the operations of the interface generator 235 of FIG. 2, including any operations of the methods 400, 500, 700, and 800 of FIGS. 4, 5, 7, and 8.

The method 600, at ACT 618, can include transmitting, by the data processing system, the second response to cause presentation of the first page, such that the first page is presented with the graphical representation of the first zone structure at the second time in accordance with the visibility data. The data processing system can transmit the second response to the client device via the network, and the application executing on the client device can render the first page by presenting the first zone structure as a navigational element and presenting the content objects within the graphical representation of the first zone structure. In some implementations, the method 600 can include providing, by the data processing system, to the operator device, an operator interface (e.g., the content management system interface 340 depicted in FIG. 3E) that indicates a user-facing status of the first zone structure based on the availability criteria. For example, the operator interface can display an expired availability indicator 342 adjacent to a zone structure for which the criteria evaluator has determined that the availability criteria are not satisfied, such that an operator viewing the operator interface on the operator device can identify which zone structures are presented to users and which zone structures are suppressed from presentation at a given time. Transmitting the second response can include performing any of the operations of the interface generator 235 of FIG. 2, including any operations of the methods 400, 500, 700, and 800 of FIGS. 4, 5, 7, and 8.

E. Systems and Methods for Dynamic Presentation of Graphical User Interface Elements This disclosure relates to techniques for dynamically suppressing graphical user interface elements from rendered pages based on hierarchical availability determinations derived from real-time external data sources. Content delivery platforms can present pages to users across multiple client device types, such as mobile applications, web applications, and desktop applications. Each page can include one or more content regions that group one or more content items for presentation as navigational elements within a graphical user interface rendered on a client device. A page can include navigational elements at multiple levels, such as tabs and subordinate navigation items, each of which can reference one or more child content items at multiple nesting depths. Each content item can be associated with metadata that specifies parameters for interfacing with one or more external computing systems to obtain information about the underlying content represented by the content item. Operators of such platforms can define the structural arrangement of pages, including the placement of navigational elements and the association of content items with content regions for presentation to users via client devices.

However, conventional approaches to constructing web pages can involve manual creation and maintenance of individual pages in which operators determine when content should be displayed and when content should be removed from a page. In such conventional approaches, when all child content items within a navigational element become unavailable, the operator may not recognize that each child content item has become unavailable, and the page can continue to present the empty navigational element, such as a tab or a pill, to users when no child content within the navigational element remains available for presentation. In addition, conventional approaches can lack a correlation between the visibility of non-content elements, such as text labels or images placed adjacent to content items within a content region, and the availability of the adjacent content items. Because the operator manages each element independently through manual page updates, the non-content elements can persist in the rendered page even when each adjacent content item is unavailable, resulting in the presentation of orphaned labels or images that reference content that is no longer available. Furthermore, conventional approaches that rely on manual operator updates to add or remove content from pages can lack a declarative mechanism by which availability conditions for individual content items can be defined independently of the specific page on which the content item resides, such that introducing a new content type on a page can require the operator to manually monitor and update each page on which the new content type is placed.

The techniques described herein can provide a system and method for suppressing zone structures from rendered pages based on a hierarchical availability evaluation that derives the availability of each parent zone structure from the respective availability statuses of the child zone structures and child content objects referenced by the parent zone structure. Rather than embedding availability logic within the rendering code of individual pages, the techniques described herein can evaluate availability criteria at each level of the hierarchical data structure and can propagate unavailability determinations upward through the hierarchy, such that a parent zone structure rendered as a tab can be suppressed from the page when each child zone structure and each child content object within the parent zone structure is determined to be unavailable. The techniques described herein can also correlate the availability of non-content elements, such as text labels or images, with the availability of adjacent content objects within the same zone structure, such that orphaned non-content elements can be suppressed when no adjacent content object has available content.

To implement the techniques described herein, a data processing system can maintain a hierarchical data structure in which each content object can store metadata that includes availability criteria specifying elements of one or more external domain systems to be evaluated and a processing rule that yields a binary availability determination for the content object. The data processing system can receive, from an operator device, a request to associate availability criteria with a set of sub-zone structures of a parent zone structure within the hierarchical data structure. In response to an access request from a client device for a page that includes the parent zone structure, the data processing system can evaluate the availability criteria for each sub-zone structure by interfacing with one or more external computing systems via a real-time messaging interface to obtain availability information. Based on the evaluation, the data processing system can determine a respective availability status for each sub-zone structure. The data processing system can then derive the availability status of the parent zone structure from the respective availability statuses of the sub-zone structures, such that the parent zone structure is determined to be unavailable when each sub-zone structure within the parent zone structure is unavailable. The data processing system can generate a response to the access request that omits graphical representations of both the unavailable sub-zone structures and the parent zone structure from the rendered page, including omission of navigational elements such as tab labels or pill labels that would otherwise correspond to the parent zone structure. When a subsequent access request is received and at least one sub-zone structure has transitioned to an available state, the data processing system can generate a response that includes graphical representations of the available sub-zone structure and the parent zone structure.

In doing so, the techniques described herein can address the limitations of conventional content delivery approaches by propagating unavailability determinations upward through a hierarchical data structure, such that empty navigational elements are suppressed from the rendered page rather than presented to users. The propagation of availability statuses can reduce the presentation of orphaned structural elements, because non-content elements within a zone structure can be suppressed alongside adjacent content objects when no available content remains within the zone structure. The techniques described herein can also decouple the availability evaluation from page-level rendering code, such that a content object can be placed on any page within the hierarchical data structure and the availability determination can be performed without re-implementing page-specific logic for each new placement, providing a technical improvement over conventional approaches in which availability logic is embedded within the rendering code of individual pages.

By virtue of the implementation of the techniques described herein, processing and memory resource consumption can be reduced by a system handling the dynamic presentation of graphical user interface elements based on hierarchical availability determinations. For example, a system can evaluate availability criteria associated with sub-zone structures of a parent zone structure within a hierarchical data structure by interfacing with external computing systems to obtain real-time availability information, and can derive the availability status of the parent zone structure from the respective availability statuses of the child sub-zone structures rather than maintaining and executing separate availability logic embedded within the rendering code of each individual page. By causing the system to maintain a hierarchical data structure identifying at least one zone structure associated with at least one page, receive a request to update the hierarchical data structure to associate availability criteria with a set of sub-zone structures of a first zone structure, determine based on the availability criteria and a receipt time of the request that each of the set of sub-zone structures is unavailable for presentation within a first page, and generate a response to the access request including data for rendering the first page without graphical representations of the set of sub-zone structures and the first zone structure, the system can avoid generating and holding rendering data in memory for unavailable sub-zone structures and parent zone structures, thereby conserving processor cycles and memory allocations that would otherwise be consumed by processing rendering instructions for interface elements that are not presented to users. As a result, overall processing and memory resource consumption can be reduced by the system, both by virtue of the centralized hierarchical availability evaluation that eliminates redundant per-page availability logic and the selective omission of unavailable zone structures and sub-zone structures from response payloads that reduces the volume of rendering data the system generates and maintains in memory for each access request.

In examples, network communication overhead can be reduced by a system that selectively transmits rendering data for available content based on hierarchical availability determinations derived from a centralized hierarchical data structure. For example, a system can evaluate availability criteria associated with a set of sub-zone structures at the time of each access request and can generate responses that include data for rendering sub-zone structures and parent zone structures determined to be available while omitting data for rendering sub-zone structures and parent zone structures determined to be unavailable, rather than transmitting a full static payload that includes rendering data for all zone structures regardless of availability status. By causing the system to receive an access request for a first page that includes a first zone structure, determine based on the availability criteria of the hierarchical data structure and a receipt time of the request that each of the set of sub-zone structures is unavailable for presentation within the first page, generate a response including data for rendering the first page without graphical representations of the set of sub-zone structures and the first zone structure, and transmit the response to cause presentation of the first page via an application executing on a user client device such that the first page is presented without the first zone structure and without the set of sub-zone structures, the system can reduce the payload size of each response by excluding rendering data for unavailable sub-zone structures and parent zone structures at the receipt time of each access request. As a result, the volume of network communications between the system and client devices can be reduced because the system transmits tailored responses that reflect the current hierarchical availability state of each zone structure and sub-zone structure rather than transmitting uniform payloads that include data for all zone structures irrespective of availability.

In some examples, accuracy of rendered graphical user interfaces can be improved by a system that derives the presentation state of each parent zone structure from real-time availability determinations propagated upward through a hierarchical data structure from child sub-zone structures. For example, conventional approaches that rely on manual operator intervention to add or remove content from pages can present empty navigational elements such as tabs or pills when all child content items within the navigational elements have become unavailable, because the operator has not recognized that each child content item has become unavailable or has not updated the page to remove the empty navigational element in a timely manner. By causing the system to update the hierarchical data structure to associate availability criteria with a set of sub-zone structures of a first zone structure, determine an availability status of the first zone structure based on respective availability statuses of the set of sub-zone structures indicating that the first zone structure is unavailable for presentation responsive to determining that each of the set of sub-zone structures is unavailable for presentation, and generate a response to an access request including data for rendering the first page without graphical representations of the set of sub-zone structures and the first zone structure, the system can suppress empty parent zone structures from the rendered page rather than presenting orphaned navigational elements that correspond to unavailable content. As a result, the accuracy and consistency of rendered graphical user interfaces can be improved by the system because each parent zone structure is presented or suppressed/resricted based on the current availability of child sub-zone structures as determined by the centralized hierarchical availability evaluation rather than based on a manually maintained page configuration that can diverge from the actual availability of child content over time.

Referring now back to FIG. 2, in some embodiments, the system 200 of FIG. 2 can be configured to implement dynamic presentation of graphical user interface elements. The system 200 can include one or more processors (e.g. one or more processors 121 of FIG. 1D) coupled to memory (e.g., memory 122 of FIG. 1D) storing instructions for implementing the dynamic presentation of graphical user interface elements. As described above in connection with Section B, the data processing system 205 can maintain the hierarchical data structure 270 in the storage 215 for rendering at least one page 275, the hierarchical data structure 270 identifying at least one zone structure 280 associated with at least one page 275, each zone structure 280 associated with one or more respective content objects 285.

Operators can configure availability criteria for sub-zone structures within the hierarchical data structure 270 by transmitting update requests to the data processing system 205 via operator device 225A-N. For example, an operator may select a zone structure 280 within an operator-facing graphical user interface (e.g., the content management system interface 330 of FIG. 3D) and may interact with one or more configuration fields to define availability criteria that specify how the criteria evaluator 245 is to evaluate the availability of child sub-zone structures referenced by the selected zone structure 280. The operator may specify, via the operator-facing graphical user interface, one or more conditions under which each sub-zone structure is to be presented or suppressed within a page 275 rendered on a client device 220, such as time criteria, location criteria, and/or availability rules derived from one or more external computing systems. The access request handler 240 can receive, from an operator device 225A-N via the network 210, a request to update the hierarchical data structure 270 to associate availability criteria with a set of sub-zone structures of a first zone structure 280.

In some implementations, the request to update the hierarchical data structure 270 can include associating availability criteria with a set of sub-pages 275 or a set of content object 285. Each sub-zone structure of the set of sub-zone structures can be a zone structure 280 that is referenced as a child of the first zone structure 280 within the hierarchical data structure 270, and each sub-zone structure can be associated with one or more respective content object 285. For example, the first zone structure 280 can be rendered as a "Touchdown Scorers" tab within a page 275 corresponding to an NFL league page, and the set of sub-zone structures can include a first sub-zone structure rendered as a "Anytime TD" pill and a second sub-zone structure rendered as a "First TD" pill within the tab, each sub-zone structure referencing one or more content object 285 that represent wagering market features for scheduled NFL games. The data structure manager 230 can update the hierarchical data structure 270 in the storage 215 according to the request to associate the availability criteria with the set of sub-zone structures, such that the criteria evaluator 245 can evaluate the availability criteria for each sub-zone structure of the set of sub-zone structures in response to a subsequent access request from a client device 220 for a page 275 that references the first zone structure 280.

The access request handler 240 can process access requests from client device 220 220A-N for page 275 that reference zone structures 280 containing sub-zone structures with associated availability criteria, and can coordinate with the criteria evaluator 245 to determine whether each sub-zone structure satisfies the availability criteria at the receipt time of the access request. For example, the access request handler 240 can receive an access request for a first 220. The criteria evaluator 245 can determine, based on the availability criteria of the hierarchical data structure 270 and a receipt time of the access request, that each of the set of sub-zone structures is unavailable for presentation within the first page 275. The criteria evaluator 245 can interface with one or more external computing systems (e.g., a trading system, a sports data feed, a market data feed, etc.) via the network 210 to obtain real-time availability information for each content object 285 referenced by each sub-zone structure of the set of sub-zone structures, and can determine that no content object 285 within any sub-zone structure of the set of sub-zone structures has available content at the receipt time. In some implementations, the criteria evaluator 245 can compare the receipt time of the access request to a time criteria (e.g., a start time, an end time, etc.) specified by the availability criteria associated with each sub-zone structure and can determine that the receipt time falls outside the availability window specified by the time criteria for each sub-zone structure.

The criteria evaluator 245 can derive availability statuses for parent zone structures 280 from the respective availability statuses of child sub-zone structures referenced within the hierarchical data structure 270, such that the criteria evaluator 245 can propagate unavailability determinations upward through the hierarchy when each child sub-zone structure within a parent zone structure 280 is determined to be unavailable for presentation. For example, the criteria evaluator 245 can determine an availability status of the first zone structure 280 based on respective availability statuses of the set of sub-zone structures. The availability status of the first zone structure 280 can indicate that the first zone structure 280 is unavailable for presentation responsive to determining that each of the set of sub-zone structures is unavailable for presentation. In some implementations, the set of sub-zone structures can include a second zone structure 280 that itself includes one or more additional zone structures 280 as children within the hierarchical data structure 270 (e.g., interface 330 depicted in FIG. 3D).

The criteria evaluator 245 can determine a second availability status of the second zone structure 280 based on respective availability statuses of the one or more additional zone structures 280. In some implementations, determining the availability status of the first zone structure 280 can include determining whether a number of available sub-zone structures of the set of sub-zone structures satisfies a threshold number for the first zone structure 280 to be available for presentation. The threshold number can be a value stored in the hierarchical data structure 270 in association with the first zone structure 280 that specifies a minimum count of available sub-zone structures within the set of sub-zone structures for the first zone structure 280 to satisfy the availability criteria. For example, the data structure manager 230 can store the threshold number within the visibility data associated with the first zone structure 280, and the criteria evaluator 245 can compare the count of sub-zone structures determined to be in an available state against the threshold number to yield the binary availability determination for the first zone structure 280. The threshold number can be one, such that the first zone structure 280 is available for presentation when at least one sub-zone structure of the set of sub-zone structures is determined to be available based on the availability criteria.

Referring now to FIG. 3D in the context of the components described in connection with FIG. 2, illustrated is a graphical user interface (GUI) depicting a content management system interface 330 showing a configurable structure for a selected page 275 of the hierarchical data structure 270, in accordance with one or more implementations. The content management system interface 330 can display a first zone 332 within a tabs-level navigational container, the first zone 332 representing a parent zone structure rendered as a tab within the page 275 on a client device 220. The first zone 332 can include one or more child content objects 285 nested within the first zone 332, such as a subcategory 333 that represents a content feature associated with the first zone 332. The content management system interface 330 can display a subordinate navigational container pill 334 that represents a set of sub-zone structures nested within a tab-level zone structure 280. The subordinate navigational container pill 334 can group one or more child zone structures 280 and one or more child content objects 285 for presentation as pill-type navigational elements within a tab on a client device 220. For example, the subordinate navigational container pill 334 can include a child zone structure 280 containing a child content object 285, as well as additional child zone structures 280, each child zone structure 280 representing a distinct sub-zone structure within the subordinate navigational container pill 334. The criteria evaluator 245 can derive an availability status of the first zone structure zone 332 from respective availability statuses of the sub-zone structures displayed within the subordinate navigational container pill 334, such that the first zone 332 can be suppressed from a rendered page 275 when each sub-zone structure within the subordinate navigational container pill 334 is determined to be unavailable for presentation based on the availability criteria stored in the hierarchical data structure 270.

Referring now back to FIG. 2, the interface generator 235 can generate responses to access requests that omit rendering data for zone structures 280 and sub-zone structures determined to be unavailable based on evaluations performed by the criteria evaluator 245, such that each response reflects the current hierarchical availability state of each zone structure 280 referenced by the requested page 275 at the receipt time of the access request. For example, the interface generator 235 can generate, based on the hierarchical data structure 270 and based on determining that each of the set of sub-zone structures is unavailable for presentation based on the availability criteria, a response to the access request that includes data for rendering the first page 275 without graphical representations of (i) the set of sub-zone structures and (ii) the first zone structure 280. For example, when the first zone structure 280 corresponds to a "Player Props" tab on a National Women's Soccer League (NWSL) event page 275 and the set of sub-zone structures includes a first sub-zone structure rendered as a "Player Shots" pill and a second sub-zone structure rendered as a "Player Assists" pill, the interface generator 235 can generate the response to omit graphical representations of the "Player Shots" pill, the "Player Assists" pill, and the "Player Props" tab from the rendered NWSL event page 275 when the criteria evaluator 245 determines that no wagering markets associated with the content object 285 referenced by either sub-zone structure are open at the receipt time of the access request.

In some implementations, the interface generator 235 can generate layout data that specifies display positions for zone structures 280 within a rendered page 275, and can selectively omit layout positions for zone structures 280 that the criteria evaluator 245 has determined to be unavailable, such that the rendered page 275 does not include empty navigational elements corresponding to unavailable content. For example, the interface generator 235 can generate layout data for rendering the first page 275, and responsive to determining that each of the set of sub-zone structures is unavailable for presentation, the interface generator 235 can omit a layout position for the first zone structure 280 from the layout data. In some implementations, the interface generator 235 can omit, from the data for rendering the first page 275, navigation data identifying the first zone structure 280 for selection within the first page 275, such that no navigational element (e.g., a tab label, a pill label, a section header, etc.) corresponding to the first zone structure 280 is presented to the user.

In some implementations, the interface generator 235 can generate the response to include platform-specific rendering instructions for different client device 220 types, such that the omission of the first zone structure 280 and the set of sub-zone structures is reflected across native mobile applications, web browser-based applications, desktop applications, and/or tablet applications executing on respective client device 220. For example, the interface generator 235 can generate a first set of rendering instructions formatted for a native mobile application executing on a first client device 220A and a second set of rendering instructions formatted for a web browser-based application executing on a second client device 220B, each set of rendering instructions omitting graphical representations of the first zone structure 280 and the set of sub-zone structures while preserving the page 275, zone structure 280, and content object 285 associations for available zone structures 280 within the hierarchical data structure 270. The data processing system 205 can transmit the response to the client device 220 via the network 210 to cause presentation of the first page 275 via an application executing on the client device 220, such that the first page 275 is presented without the first zone structure 280 and without the set of sub-zone structures.

The access request handler 240 can process subsequent access requests for the same page 275 and can coordinate with the criteria evaluator 245 to re-evaluate the availability criteria at the receipt time of each subsequent access request, such that a zone structure 280 and associated sub-zone structures that were suppressed in a prior response can be included in a subsequent response when the availability criteria for at least one sub-zone structure transitions from an unsatisfied state to a satisfied state. For example, the access request handler 240 can receive a second access request for the first page 275 via the network 210 from the client device 220 and/or a different client device 220. The criteria evaluator 245 can determine, based on the availability criteria, that at least one sub-zone structure of the set of sub-zone structures is available for presentation. The criteria evaluator 245 can receive, from one or more external computing systems via the network 210, an availability message indicating that content associated with the at least one sub-zone structure has transitioned from unavailable to available. The criteria evaluator 245 can update the availability status of the at least one sub-zone structure from an unavailable state to an available state, and can update the availability status of the first zone structure 280 from an unavailable state to an available state based on the updated availability status of the at least one sub-zone structure. The interface generator 235 can generate a second response to the second access request that includes data for rendering the first page 275 with graphical representations of (i) the at least one available sub-zone structure of the set of sub-zone structures and (ii) the first zone structure 280. The data processing system 205 can transmit the second response to the client device 220 via the network 210 to cause presentation of the first page 275, such that the first page 275 is presented with the graphical representation of the first zone structure 280 and the at least one available sub-zone structure within the first zone structure 280.

In some implementations, the data structure manager 230 can maintain availability state information for zone structures 280 and sub-zone structures within the hierarchical data structure 270 in the storage 215, such that the criteria evaluator 245 can access and update stored availability statuses in response to availability messages received from one or more external computing systems via the network 210 without requiring a full re-evaluation of the availability criteria for each zone structure 280 on every access request. For example, the data structure manager 230 can store, in association with the hierarchical data structure 270 in the storage 215, the availability status of the first zone structure 280 and the respective availability statuses of the set of sub-zone structures. The criteria evaluator 245 can update the availability status of the first zone structure 280 stored in the storage 215 in response to detecting a change in an availability status of at least one sub-zone structure of the set of sub-zone structures. The criteria evaluator 245 can receive an availability message from one or more external computing systems indicating that a sub-zone structure that was previously available has become unavailable, and the criteria evaluator 245 can update the respective availability status of the sub-zone structure from an available state to an unavailable state in the storage 215. The criteria evaluator 245 can then re-evaluate the availability status of the first zone structure 280 based on the updated respective availability statuses of the remaining sub-zone structures within the set of sub-zone structures.

In some implementations, operators can define declarative availability rules that govern how the criteria evaluator 245 derives the availability status of a parent zone structure 280 from the respective availability statuses of child sub-zone structures, for example by interacting with one or more configuration fields within an operator-facing graphical user interface (e.g., the content management system interface 330 of FIG. 3D) rendered on an operator device 225A-N to specify rule expressions that the criteria evaluator 245 can evaluate at the time of each access request. The access request handler 240 can receive, from the operator device 225A-N via the network 210, an availability rule indicating that availability of the first zone structure 280 is to be determined based on availability of the set of sub-zone structures. For example, when the first zone structure 280 corresponds to a "Pitcher Props" tab on an MLB event page 275 and the set of sub-zone structures includes a first sub-zone structure rendered as a "Strikeouts" pill and a second sub-zone structure rendered as a "Earned Runs" pill, the availability rule can specify that the "Pitcher Props" tab is available for presentation when at least one of the "Strikeouts" pill or the "Earned Runs" pill has available content based on real-time market data received from one or more external computing systems via the network 210, and is unavailable for presentation when each of the "Strikeouts" pill and the "Earned Runs" pill lacks available content. The data structure manager 230 can store the availability rule in association with the hierarchical data structure 270 in the storage 215, such that the criteria evaluator 245 can apply the availability rule when evaluating the availability status of the first zone structure 280 in response to subsequent access requests from client device 220 for a page 275 referencing the first zone structure 280.

Figure 7:
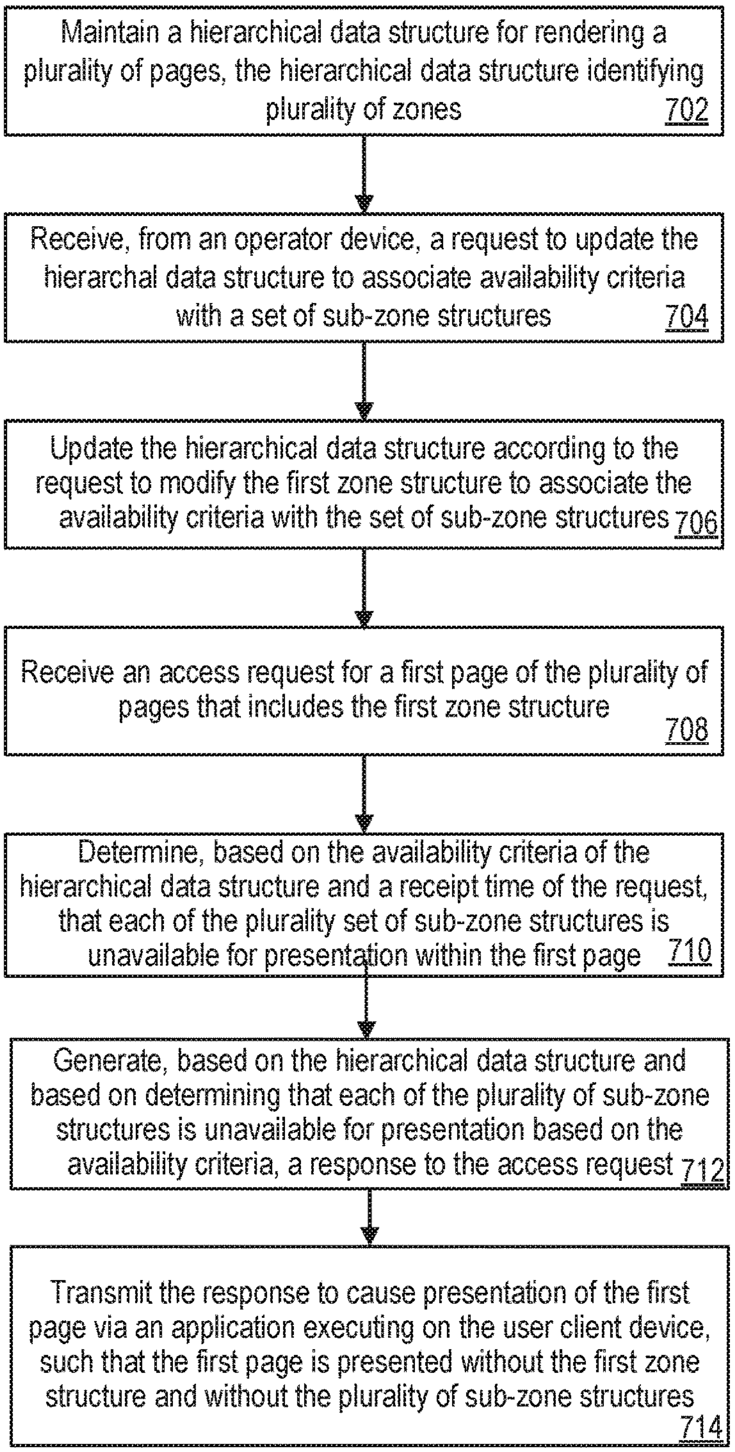
FIG. 7 is a flow chart illustrating a method for dynamic presentation of graphical user interface elements, in accordance with one or more implementations.

Referring now to FIG. 7, illustrated is a method 700 for dynamic presentation of graphical user interface elements. The method 700 is described as being performed by the data processing system 205 of FIG. 2. However, it should be understood that the method 700 may be performed using any computing device/system or combination of computing devices/systems described herein. Additional operations may be performed as part of the method 700 or operations of the method 700 may be omitted, in some implementations. In brief overview of the method 700, the method 700 can include maintaining a hierarchical data structure for rendering pages, the hierarchical data structure identifying zone structures associated with the pages (ACT 702), receiving, from an operator device, a request to update the hierarchical data structure to associate availability criteria with a set of sub-zone structures (ACT 704), updating the hierarchical data structure according to the request to associate the availability criteria with the set of sub-zone structures (ACT 706), receiving an access request for a first page that includes a first zone structure (ACT 708), determining, based on the availability criteria and a receipt time of the request, that each of the set of sub-zone structures is unavailable for presentation within the first page (ACT 710), generating, based on the hierarchical data structure and based on determining that each of the sub-zone structures is unavailable for presentation, a response to the access request (ACT 712), and/or transmitting the response to cause presentation of the first page via an application executing on the user client device, such that the first page is presented without the first zone structure and without the sub-zone structures (ACT 714).

FIG. 7 is a flow diagram showing a method 700 for dynamic presentation of graphical user interface elements, in accordance with some implementations of the present disclosure. The method 700 can be performed by a data processing system (e.g., the data processing system 205 of FIG. 2), or by any computing device or combination of computing devices described herein. The method 700 can include operations performed by the data structure manager 230, the interface generator 235, the access request handler 240, and/or the criteria evaluator 240 of the data processing system 205 of FIG. 2 to evaluate availability criteria associated with sub-zone structures and/or any other sub-structure (e.g., pages 275, zone structures 280, content objects 285, etc.) within a hierarchical data structure (e.g., hierarchical data structure 270) and to derive an availability status of a parent structure from the respective availability statuses of any sub-structures (e.g., sub-zone structures 280, as described herein), such that the parent structure and the sub-structures can be suppressed/restricted/omitted from a rendered page (or other interface element) when each sub-zone structure is determined to be unavailable for presentation.

The method 700, at ACT 702, can include maintaining, by the data processing system, a hierarchical data structure (e.g., the hierarchical data structure 270 of FIG. 2) for rendering pages, the hierarchical data structure identifying zone structures associated with the pages, each zone structure of the zone structures associated with one or more respective content objects. The data processing system can store the hierarchical data structure in storage (e.g., the storage 215 of FIG. 2) and can access the hierarchical data structure to determine associations between pages, zone structures, and content objects in response to access requests received from client devices via a network (e.g., the network 210 of FIG. 2). Each zone structure can store a unique zone identifier (e.g., an alphanumeric string) that the data processing system can use to locate the zone structure within the hierarchical data structure. Each content object can store metadata that specifies instructions for determining availability of the content represented by the content object, as described in connection with FIG. 2. In some implementations, the hierarchical data structure can encode parent-child relationships between zone structures at multiple nesting depths within a single page, such that a first zone structure rendered as a tab within a page can include a set of sub-zone structures rendered as pills within the tab, and each sub-zone structure can include one or more content objects presented within the respective pill on a client device. Maintaining the hierarchical data structure can include performing any of the operations of the data structure manager 230 of FIG. 2, including any operations of the methods 400, 500, 600, and 800 of FIGS. 4, 5, 6, and 8.

The method 700, at ACT 704, can include receiving, by the data processing system, from an operator device (e.g., an operator device 225 of FIG. 2), a request to update the hierarchical data structure to associate availability criteria with a set of sub-zone structures of a first zone structure of the zone structures, each sub-zone structure of the set of sub-zone structures associated with one or more respective content objects. Each sub-zone structure of the set of sub-zone structures can be a zone structure that is a child of the first zone structure within the hierarchical data structure. The availability criteria can specify one or more conditions under which each sub-zone structure is to be presented or suppressed within a page rendered on a client device, such as a time criteria, a location criteria, and/or an availability rule derived from one or more external computing systems (e.g., a trading system, a sports data feed, a market data feed, etc.). The access request handler can receive the request from the operator device via the network and can forward the request to the data structure manager for processing. In some implementations, the method 700 can include receiving, by the data processing system, from the operator device, an availability rule indicating that availability of the first zone structure is to be determined based on availability of the set of sub-zone structures. The availability rule can specify a declarative expression that the criteria evaluator can evaluate to derive the availability status of the first zone structure from the respective availability statuses of the sub-zone structures within the set of sub-zone structures, such that the first zone structure is available for presentation when at least one sub-zone structure of the set of sub-zone structures is determined to be available and is unavailable for presentation when each sub-zone structure of the set of sub-zone structures is determined to be unavailable. Receiving the request to update the hierarchical data structure can include performing any of the operations of the access request handler 240 of FIG. 2, including any operations of the methods 400, 500, 600, and 800 of FIGS. 4, 5, 6, and 8.

The method 700, at ACT 706, can include updating, by the data processing system, the hierarchical data structure according to the request to modify the first zone structure to associate the availability criteria with the set of sub-zone structures. The data structure manager can store the availability criteria in the hierarchical data structure in the storage in association with each sub-zone structure of the set of sub-zone structures, such that the criteria evaluator can evaluate the availability criteria for each sub-zone structure in response to each subsequent access request from a client device for a page that includes the first zone structure. In some implementations, the method 700 can include storing, by the data processing system, the availability rule in association with the hierarchical data structure, such that the criteria evaluator can apply the availability rule to derive the availability status of the first zone structure from the respective availability statuses of the sub-zone structures when generating a response to an access request. Following the update, the hierarchical data structure can indicate that subsequent access requests from client devices for a page including the first zone structure are to be evaluated against the availability criteria stored in association with each sub-zone structure before the data processing system generates a response. Updating the hierarchical data structure can include performing any of the operations of the data structure manager 230 of FIG. 2, including any operations of the methods 400, 500, 600, and 800 of FIGS. 4, 5, 6, and 8.

The method 700, at ACT 708, can include receiving, by the data processing system, an access request for a first page of the pages that includes the first zone structure. The access request handler can receive the access request from a client device via the network. The access request can identify the first page by a page identifier stored in the hierarchical data structure. In some implementations, the access request can include a player profile identifier, a device identifier, a session identifier, and/or a token associated with the client device. In response to receiving the access request, the data processing system can traverse the hierarchical data structure to identify the first zone structure associated with the first page and the set of sub-zone structures associated with the first zone structure, and can cause the criteria evaluator to evaluate the availability criteria for each sub-zone structure of the set of sub-zone structures. Receiving the access request can include performing any of the operations of the access request handler 240 of FIG. 2, including any operations of the methods 400, 500, 600, and 800 of FIGS. 4, 5, 6, and 8.

The method 700, at ACT 710, can include determining, by the data processing system, based on the availability criteria of the hierarchical data structure and a receipt time of the access request, that each of the set of sub-zone structures is unavailable for presentation within the first page. The criteria evaluator can interface with one or more external computing systems (e.g., a trading system, a sports data feed, a market data feed, etc.) via the network to obtain real-time availability information for each content object associated with each sub-zone structure of the set of sub-zone structures. The criteria evaluator can determine that no content object within any sub-zone structure of the set of sub-zone structures has available content at the receipt time. For example, the criteria evaluator can compare the receipt time of the access request to a time criteria (e.g., a start time, an end time, etc.) specified by the availability criteria associated with each sub-zone structure and can determine that the receipt time falls outside the availability window specified by the time criteria for each sub-zone structure. In some implementations, the method 700 can include determining, by the data processing system, an availability status of the first zone structure based on respective availability statuses of the set of sub-zone structures, the availability status of the first zone structure indicating that the first zone structure is unavailable for presentation responsive to determining that each of the set of sub-zone structures is unavailable for presentation. The criteria evaluator can evaluate each respective availability status and can determine that the first zone structure is unavailable because no sub-zone structure within the first zone structure has available content at the receipt time. Determining the availability statuses can include performing any of the operations of the criteria evaluator 245 of FIG. 2, including any operations of the methods 400, 500, 600, and 800 of FIGS. 4, 5, 6, and 8.

In some implementations, the set of sub-zone structures can include a second zone structure, the second zone structure including one or more additional zone structures as children within the hierarchical data structure, and the method 700 can include determining, by the data processing system, a second availability status of the second zone structure based on respective availability statuses of the one or more additional zone structures. For example, the second zone structure can be a sub-zone structure rendered as a pill within the first zone structure, and the one or more additional zone structures can be nested children of the second zone structure, such that the criteria evaluator can propagate unavailability determinations upward through multiple nesting depths of the hierarchical data structure. In some implementations, determining the availability status of the first zone structure can include determining whether a number of available sub-zone structures of the set of sub-zone structures satisfies a threshold number for the first zone structure to be available for presentation. For example, the threshold number can be one, such that the first zone structure is available for presentation when at least one sub-zone structure of the set of sub-zone structures is determined to be available based on the availability criteria. In some implementations, the method 700 can include storing, by the data processing system, in association with the hierarchical data structure, the availability status of the first zone structure and the respective availability statuses of the set of sub-zone structures. The data structure manager can store each availability status in the storage in association with the corresponding zone structure within the hierarchical data structure, such that the stored availability statuses can be accessed by the criteria evaluator and/or the interface generator when generating responses to subsequent access requests. Determining and storing the availability statuses can include performing any of the operations of the criteria evaluator 245 of FIG. 2, including any operations of the methods 400, 500, 600, and 800 of FIGS. 4, 5, 6, and 8.

In some implementations, in response to detecting a change in an availability status of at least one sub-zone structure of the set of sub-zone structures, the method 700 can include updating, by the data processing system, the availability status of the first zone structure stored in association with the hierarchical data structure. For example, the criteria evaluator can receive an availability message from one or more external computing systems via the network indicating that a sub-zone structure that was previously unavailable has transitioned to an available state, and the data structure manager can update the respective availability status of the sub-zone structure and re-evaluate the availability status of the first zone structure based on the updated respective availability statuses of the remaining sub-zone structures within the set of sub-zone structures. Updating the availability status of the first zone structure can include performing any of the operations of the criteria evaluator 245 of FIG. 2, including any operations of the methods 400, 500, 600, and 800 of FIGS. 4, 5, 6, and 8.

The method 700, at ACT 712, can include generating, by the data processing system, based on the hierarchical data structure and based on determining that each of the set of sub-zone structures is unavailable for presentation based on the availability criteria, a response to the access request including data for rendering the first page without graphical representations of (i) the set of sub-zone structures and (ii) the first zone structure. The interface generator can traverse the hierarchical data structure from the first page to each zone structure associated with the first page, evaluate the availability status of each zone structure, and omit data for rendering the first zone structure and the set of sub-zone structures from the response based on the determination that each sub-zone structure is unavailable. In some implementations, the method 700 can include generating, by the data processing system, layout data for rendering the first page, and responsive to determining that each of the set of sub-zone structures is unavailable for presentation, omitting, by the data processing system, a layout position for the first zone structure from the layout data. For example, when the first zone structure is rendered as a tab within the first page and each sub-zone structure within the tab is unavailable, the interface generator can omit the tab from the set of tabs included in the layout data, such that the rendered first page does not present an empty tab to a user of the client device. Generating the response can include performing any of the operations of the interface generator 235 of FIG. 2, including any operations of the methods 400, 500, 600, and 800 of FIGS. 4, 5, 6, and 8.

In some implementations, the method 700 can include omitting, by the data processing system, from the data for rendering the first page, navigation data identifying the first zone structure for selection within the first page, such that no navigational element (e.g., a tab label, a pill label, a section header, etc.) corresponding to the first zone structure is presented to the user. In some implementations, the method 700 can include receiving, by the data processing system, a second access request for the first page. The criteria evaluator can determine, based on the availability criteria, that at least one sub-zone structure of the set of sub-zone structures is available for presentation at the time of the second access request. For example, the criteria evaluator can receive, from one or more external computing systems via the network, an availability message indicating that content associated with the at least one sub-zone structure has transitioned from unavailable to available. The interface generator can generate a second response to the second access request including data for rendering the first page with graphical representations of (i) the at least one available sub-zone structure of the set of sub-zone structures and (ii) the first zone structure. The data processing system can transmit the second response to the client device via the network to cause presentation of the first page with the first zone structure and the at least one available sub-zone structure rendered within the first zone structure. Generating the second response can include performing any of the operations of the interface generator 235 of FIG. 2, including any operations of the methods 400, 500, 600, and 800 of FIGS. 4, 5, 6, and 8.

The method 700, at ACT 714, can include transmitting, by the data processing system, the response to cause presentation of the first page via an application executing on a user client device (e.g., a client device 220 of FIG. 2), such that the first page is presented without the first zone structure and without the set of sub-zone structures. The data processing system can transmit the response to the client device via the network, and the application executing on the client device can render the first page by presenting zone structures that are determined to be available and by omitting graphical representations of the first zone structure and the set of sub-zone structures from the rendered first page. For example, the application executing on the client device can omit a tab label and/or a pill label corresponding to the first zone structure and the sub-zone structures from the navigational elements of the first page, such that a user of the client device does not see navigational elements that correspond to unavailable content. In some implementations, the application executing on the client device can render the first page across different client platforms (e.g., a mobile application, a web application, a desktop application, etc.) based on platform-specific rendering instructions while preserving the page, zone structure, and content object associations and the availability determinations generated by the criteria evaluator of the data processing system. Transmitting the response can include performing any of the operations of the interface generator 235 of FIG. 2, including any operations of the methods 400, 500, 600, and 800 of FIGS. 4, 5, 6, and 8.

F. Systems and Methods for Graphical Element-Specific Deep Links

This disclosure relates to techniques for generating and resolving element-specific deep links that direct users to specific content within pages of a graphical user interface presented across multiple client device types, such as mobile applications, web applications, and desktop applications. Pages presented by content delivery platforms can include content items organized within navigational elements at multiple nesting depths, such that a page can present tabs containing subordinate navigation items, each of which can reference one or more content items for display to a user via a client device. Each content item and each navigational element within a page can be associated with a respective identifier that distinguishes the content item or navigational element from other elements within the page. Operators of such platforms can define the structural arrangement of pages, including the placement of content items within navigational elements at various depths, and can generate links that direct users to specific content items or navigational elements within a page.

However, conventional approaches to linking users to specific locations within a page rely on manually constructed links that encode a fixed directory path or a static address to identify the target location. When an operator restructures the page, such as by moving content from a first page to a second page, the fixed directory path encoded in the conventional link can become invalid because the path no longer corresponds to the current location of the target content. Conventional approaches also lack the ability to address content at deeper nesting levels within a page, such that a link can target a top-level category or subcategory but cannot target a specific content item nested within multiple layers of navigational elements. The reliance on fixed directory paths that reflect a static page structure can further prevent different operators from generating links to curated content locations that persist when the page structure is modified, because each structural change to the page can invalidate links that were manually created to point to content at the prior location within the directory structure.

The techniques described herein provide a system and method for generating and resolving deep links that are based on unique element identifiers associated with individual zone structures and content objects within a hierarchical data structure, rather than on fixed directory paths derived from the structural position of the target element within the hierarchy. Each zone structure and each content object within the hierarchical data structure can be assigned a unique identifier at the time the zone structure or content object is created or added to the hierarchical data structure. A deep link generated using the techniques described herein can include the unique identifier of the target zone structure or content object and can omit a directory path corresponding to the page on which the target element resides, such that the deep link can be resolved by traversing the hierarchical data structure using the unique identifier to locate the current position of the target element regardless of whether the target element has been repositioned since the deep link was generated.

To implement the techniques described herein, a data processing system can receive, from an operator device, a request to generate a deep link to a specific content object or zone structure within the hierarchical data structure. The data processing system can generate the deep link by including the unique identifier of the target content object or zone structure in the deep link without encoding a directory path that reflects the current hierarchical position of the target element. When a client device accesses the deep link, the data processing system can receive an access request that includes the unique identifier and can resolve the current location of the target element by traversing the hierarchical data structure using the unique identifier. The resolution can determine a page identifier corresponding to the page that references the target element and a position of the target element within the page, such that the data processing system can generate a response that includes data for rendering the page with the target zone structure or content object presented to the user. When the hierarchical data structure is updated after generation of the deep link to change the page on which the target element resides or the position of the target element within a page, the data processing system can resolve the deep link using the unique identifier and the updated hierarchical data structure to determine the updated location of the target element, such that the deep link continues to resolve to the correct target element after the structural change. The techniques described herein can also support deep linking into nested levels within the hierarchical data structure beyond top-level categories, such that a deep link can target a zone structure or content object that is nested within multiple layers of parent zone structures.

In doing so, the techniques described herein address the limitations of conventional directory-path-based deep linking approaches by decoupling the deep link from the structural position of the target element within the hierarchical data structure. The identifier-based resolution of the techniques described herein can provide deep links that persist across structural changes to the hierarchical data structure, because the unique identifier of the target element remains constant even when the page identifier or the position of the target element within a page is changed by an operator. The techniques described herein can also extend deep linking to deeper nesting levels within the hierarchical data structure, such that operators can generate deep links to specific zone structures or content objects nested within multiple layers of parent zone structures, providing a technical improvement over conventional approaches that can address top-level categories or subcategories within the hierarchy. The ability to resolve deep links using unique element identifiers and the current state of the hierarchical data structure can reduce the incidence of broken or misdirected links that result from structural changes to the page hierarchy, providing a technical improvement over conventional linking approaches.

By virtue of the implementation of the techniques described herein, processing and memory resource consumption can be reduced by a system handling the generation and resolution of resource-specific deep links using a hierarchical data structure. For example, a system can maintain a hierarchical data structure that associates unique identifiers with individual zone structures and content objects, such that each deep link can be resolved by traversing the hierarchical data structure using the unique identifier rather than performing resource-intensive directory path parsing and path validation operations against a static page hierarchy. By causing the system to maintain the hierarchical data structure identifying at least one zone structure associated with a first zone structure identifier and a first content object associated with a first object identifier, generate a first deep link comprising the first object identifier of the first content object, and resolve a page location based on the first object identifier included in the first deep link and the hierarchical data structure, the system can avoid storing and processing redundant directory path mappings for each structural position of each content object and zone structure, thereby conserving processor cycles and memory allocations that would otherwise be consumed by maintaining and synchronizing separate path-based indices under conventional linking approaches that encode fixed directory paths. As a result, overall processing and memory resource consumption can be reduced by the system, both by virtue of the identifier-based resolution that eliminates the need to rebuild and store path mappings each time the hierarchical data structure is modified and the single-identifier traversal that reduces the computational cost of locating a target element within the hierarchical data structure for each access request.

In various examples, network communication overhead can be reduced by a system that generates and resolves deep links using unique element identifiers associated with zone structures and content objects within a hierarchical data structure. For example, conventional directory-path-based deep linking approaches can generate broken links when the hierarchical data structure is modified, causing client devices to transmit retry requests, redirect requests, and error-handling communications that consume additional network bandwidth between the client devices and the data processing system. By causing the system to generate the first deep link comprising the first object identifier that omits a directory path corresponding to the first page such that the first location of the first content object is determined using the first object identifier, receive from a first client device a first access request indicating that the first client device accessed the first deep link, and resolve the first location of the first content object within the hierarchical data structure to generate a first response to the first access request including data for rendering the first page comprising the first zone structure and the first content object, the system can serve a correct response to each access request in a single network transaction without generating redirect responses or error responses that would otherwise require additional round-trip communications between the client device and the system. As a result, the volume of network communications between the system and client devices can be reduced because the system resolves each deep link to the current location of the target element using the unique identifier and the current state of the hierarchical data structure, eliminating the retry and redirect traffic that arises under conventional approaches when structural changes invalidate fixed directory paths encoded in deep links.

In some examples, accuracy of rendered graphical user interfaces can be improved by a system that resolves deep links using unique element identifiers that persist across structural changes to a hierarchical data structure. For example, conventional deep linking approaches that encode fixed directory paths can direct users to incorrect pages or present error states when an operator repositions a zone structure or content object within the page hierarchy, because the fixed directory path no longer corresponds to the current location of the target element. By causing the system to maintain the hierarchical data structure with the first zone structure associated with a first zone structure identifier and the first content object associated with a first object identifier, resolve based on the first object identifier included in the first deep link and the hierarchical data structure the first location of the first content object within the hierarchical data structure indicating at least a first page, and generate based on the hierarchical data structure and the first location of the first content object a first response to the first access request including data for rendering the first page comprising the first zone structure and the first content object, the system can direct each client device to the correct target element regardless of whether the target element has been repositioned since the deep link was generated, because the unique identifier remains constant across updates to the hierarchical data structure and the system traverses the current state of the hierarchical data structure to determine the current location of the target element. As a result, the accuracy and consistency of rendered graphical user interfaces can be improved by the system because each deep link resolves to the current location of the target zone structure or content object within the hierarchical data structure rather than to a stale directory path that can diverge from the actual location of the target element over time.

In at least some examples, the techniques described herein can reduce the chances of unauthorized actors exploiting deficiencies in systems that lack identifier-based deep link resolution for graphical user interface elements. For example, conventional directory-path-based deep linking approaches can expose predictable path structures that unauthorized actors can enumerate or manipulate to access content objects or zone structures that are intended to be restricted, because the fixed directory paths can encode hierarchical position information that reveals the organizational structure of restricted content within the page hierarchy. By causing the system to generate the first deep link comprising the first object identifier that omits a directory path corresponding to the first page, resolve based on the first object identifier included in the first deep link and the hierarchical data structure the first location of the first content object, and transmit the first response to cause presentation of the first page via a first application executing on the first client device such that the first page is presented with the first zone structure including the first content object, the system can obscure the structural organization of the hierarchical data structure from external actors because each deep link contains an opaque identifier rather than a traversable directory path. Further, the system can validate each access request against the current state of the hierarchical data structure before generating a response. As a result, the system can reduce the likelihood of exploitation of predictable path structures that can arise when deep links encode fixed directory paths reflecting the internal organization of the hierarchical data structure, because the identifier-based resolution decouples the deep link from the structural position of the target element and allows the system to enforce access constraints at the time of resolution rather than relying on the obscurity of a directory path.

Referring now back to FIG. 2, in some embodiments, the system 200 of FIG. 2 can be configured to implement generating graphical element-specific deep links. The system 200 can include one or more processors (e.g., one or more processors 121 of FIG. 1D) coupled to memory (e.g., memory 122 of FIG. 1D) storing instructions for implementing the generation of graphical element-specific deep links. As described above in connection with Section B, the data processing system 205 can maintain the hierarchical data structure 270 in the storage 215 for rendering at least one page 275. As described herein, the hierarchical data structure 270 identifying at least one zone structure 280 associated with at least one page 275. Each zone structure 280 associated with one or more respective content objects 285, the first zone structure 280 associated with a first zone structure identifier, and the first content object 285 associated with a first object identifier.

The first zone structure identifier can be a unique alphanumeric string that the data structure manager 230 can store in the hierarchical data structure 270 in association with the first zone structure 280. The first object identifier can be a unique alphanumeric string that the data structure manager 230 can store in the hierarchical data structure 270 in association with the first content object 285. Other types of identifiers are also possible (e.g., GUIDs, UUIDS, hashes, etc.). In some implementations, the first zone structure 280 can correspond to a zone rendered as a tab within a page 275, and the first content object 285 can correspond to a subcategory content object representing one or more conditional event features within the tab. In some implementations, the first zone structure 280 can correspond to a zone rendered as a pill within a tab on a page 275, and the first content object 285 can correspond to a subcategory content object representing one or more wagering market features for a scheduled event.

Operators of the data processing system 205 can access the data processing system 205, for example, to generate and/or access deep links for specific portions of content represented by the hierarchical data structure 270. To do so, the operator devices 225 can transmit one or more requests to the data processing system 205, as described herein. The access request handler 240 can receive, from a first operator device 225 via the network 210, a first request to generate a first deep link to the first content object 285. The first request can identify the first content object 285 by the first object identifier stored in the hierarchical data structure 270. In some implementations, an operator using the first operator device 225 can select an actionable object within a deep link generator interface (e.g., the deep link generator depicted in the page browser interface 300 of FIG. 3A) to generate a deep link to a content object 285 within a zone structure 280 on a page 275. The deep link generator interface can present one or more selectable fields through which the operator can specify a target element within the hierarchical data structure 270 for deep link generation, such as a sport selector, a league selector, a route zone navigator selector, and/or one or more sub-zone selectors that allow the operator to navigate to progressively deeper nesting levels within the hierarchical data structure 270. For example, the operator can select a sport category from the sport selector, a league category from the league selector, a root zone structure 280 from the route zone navigator selector, and a specific content object 285 or sub-zone structure from a sub-zone selector to specify the target element for the first deep link.

The interface generator 235 can generate deep links that include identifiers of portions of the hierarchical data structure 270 identified in a received request from an operator device 225, such as identifiers of one or more pages 275, one or more zone structures 280, and/or one or more content objects 285. For example, in response to the first request received from the first operator device 225, the interface generator 235 can generate the first deep link comprising the first object identifier of the first content object 285. In some implementations, the interface generator 235 can generate a deep link that targets a page 275 by including a page identifier associated with the page 275 in the hierarchical data structure 270, such that the deep link can direct a client device 220 to the page 275 without requiring the client device 220 to navigate through intermediate pages or navigational elements. The first deep link can comprise the first object identifier and can omit a directory path corresponding to the first page 275, such that a first location of the first content object 285 within the hierarchical data structure 270 can be determined using the first object identifier rather than a fixed directory path. In some implementations, the first object identifier can be an alphanumeric string that the data structure manager 230 can assign to the first content object 285 at the time the first content object 285 is created and/or added to the hierarchical data structure 270.

For example, the first deep link can include the alphanumeric string "RTJUW3K" as the first object identifier without including a hierarchical path such as "/sports/football/nfl/touchdown-scorers/first-td," such that the data processing system 205 can resolve the first deep link by traversing the hierarchical data structure 270 using the first object identifier to locate the first content object 285 regardless of whether the first content object 285 has been repositioned within the hierarchical data structure 270 since the first deep link was generated. In some implementations, the first deep link can be resolved by traversing the hierarchical data structure 270 directly using the first object identifier and/or by consulting a stored association between the first object identifier and the first location of the first content object 285. In some implementations, the first deep link can include a uniform resource identifier (URI) that encodes the first object identifier as a parameter or path segment within the URI, such that a client application executing on a client device 220 can extract the first object identifier from the URI and transmit the first object identifier to the data processing system 205 as part of an access request.

Once generated, the deep link may be provided to one or more players (e.g., via corresponding graphical user interfaces provided by the data processing system 205), so the players can use their corresponding client devices to transmit access requests to access the deep links. In doing so, for example, the access request handler 240 can receive, from a first client device 220A via the network 210, a first access request indicating that the first client device 220A accessed the first deep link. In some implementations, a customer can select a link in a notification on the first client device 220A, and the first client device 220A can transmit the first access request including the first deep link to the data processing system 205 via the network 210. In some implementations, the customer can select the link within a promotional message, a CRM communication, an in-application banner, and/or an external web page that includes the first deep link distributed by an operator via the first operator device 225. In some implementations, the first access request can include a token (e.g., a session token, an authentication token, a device token, an access credential, a signed identifier, etc.) associated with the first client device 220A, the token indicating request context associated with the first client device 220A (e.g., a geographic jurisdiction, an account identifier, a session identifier, and/or a device type indicator).

The access request handler 240 can resolve identifiers included in access requests by traversing the hierarchical data structure 270 to locate the corresponding page 275, zone structure 280, and/or content object 285 associated with each identifier. For example, the access request handler 240 can resolve, based on the first object identifier included in the first deep link and the hierarchical data structure 270, a first location of the first content object 285 within the hierarchical data structure 270, the first location indicating at least a first page 275 of at least one page 275. The access request handler 240 can traverse the hierarchical data structure 270 using the first object identifier to determine that the first content object 285 is a child of a first zone structure 280 within a page 275, such that the first location indicates the page 275 as the first page 275 and the first zone structure 280 as the parent zone structure of the first content object 285. In some implementations, the access request handler 240 can determine the first location by querying an index stored in the storage 215 that maps the first object identifier to a page identifier and/or a zone structure identifier within the hierarchical data structure 270, such that the access request handler 240 can locate the first content object 285 without traversing each level of the hierarchical data structure 270. In some implementations, the access request handler 240 can generate the first response to include data for presenting the first content object 285 according to the token, such that the first content object 285 is rendered in accordance with the request context indicated by the token (e.g., the geographic jurisdiction of the first client device 220A).

The interface generator 235 can generate responses to access requests that include data for rendering a page 275 with one or more zone structures 280 and one or more content objects 285 identified by the resolved location within the hierarchical data structure 270. For example, the interface generator 235 can generate, based on the hierarchical data structure 270 and the first location of the first content object 285, a first response to the first access request including data for rendering the first page 275 of at least one page 275 comprising the first zone structure 280 and the first content object 285. The data processing system 205 can transmit the first response to the first client device 220A via the network 210 to cause presentation of the first page 275 via a first application executing on the first client device 220A, such that the first page 275 is presented with the first zone structure 280 including the first content object 285. The first application executing on the first client device 220A can render the first page 275 with the first zone structure 280 displayed as a navigational element in a selected state and the first content object 285 displayed within the navigational element, such that the customer is directed to the first content object 285 without navigating through multiple levels of the page hierarchy.

For example, when the first deep link targets a content object 285 representing a "First Touchdown Scorer" wagering market within a "Touchdown Scorers" zone structure 280 on an NFL league page 275, the first application can render the NFL league page 275 with the "Touchdown Scorers" tab displayed in a selected state and the "First Touchdown Scorer" content object 285 scrolled into view within the tab, such that the customer is presented with the target wagering market upon accessing the first deep link. In some implementations, the data structure manager 230 can store, in association with the hierarchical data structure 270 in the storage 215, an association between the first object identifier and the first location of the first content object 285, such that subsequent access requests including the first deep link can be resolved using the stored association. In some implementations, responsive to determining that the hierarchical data structure 270 lacks an association for the first object identifier (e.g., the first content object 285 has been removed from the hierarchical data structure 270 by an operator via an operator device 225), the access request handler 240 can generate a fallback response (e.g., a default page response, a redirect response, an error indication response, a response that omits the requested content object, etc.) that omits data for rendering the first content object 285. In some implementations, the fallback response can include data for rendering a parent page 275 associated with the first zone structure 280 from which the first content object 285 was removed, such that the customer is directed to a related page 275 rather than receiving an error state.

Operators of the data processing system 205 can generate deep links that target pages 275, zone structures 280, and/or content objects 285 at various nesting levels within the hierarchical data structure 270 by selecting a target zone structure 280 via the deep link generator interface rendered on an operator device 225. For example, the access request handler 240 can receive, from a second operator device 225 via the network 210, a second request to generate a second deep link to the first zone structure 280. The second request can identify the first zone structure 280 by the first zone structure identifier stored in the hierarchical data structure 270. In some implementations, an operator using the second operator device 225 can select an actionable object within the deep link generator interface (e.g., the deep link generator depicted in the page browser interface 300 of FIG. 3A) to generate a deep link to a zone structure 280 rendered as a pill within a tab on a page 275. For example, the operator can select a zone structure 280 representing a "Rebounds" pill within a "Player Props" tab on a National Basketball Association (NBA) league page 275.

Furthering this example, the deep link generator interface can present the first zone structure identifier (e.g., the alphanumeric string "OORRMSW") associated with the selected zone structure 280 for inclusion in the second deep link. In some implementations, the second request can target a zone structure 280 at a deeper nesting level than was addressable under a prior category-based linking approach, such as a fourth-level zone structure 280 nested within a third-level zone structure 280, a second-level zone structure 280, and a first-level zone structure 280 on a page 275. For example, the operator can generate a second deep link to a zone structure 280 representing a specific market type (e.g., "First Rebound of the Game") nested within a "Rebounds" pill, within a "Player Props" tab, within an NBA event page 275. The interface generator 235 can generate, in response to the second request, the second deep link comprising the first zone structure identifier of the first zone structure 280. The second deep link can include the first zone structure identifier (e.g., as depicted in FIG. 3D), such that the data processing system 205 can resolve the second deep link by traversing the hierarchical data structure 270 using the first zone structure identifier to locate the first zone structure 280 regardless of a current position of the first zone structure 280 within the hierarchical data structure 270.

The access request handler 240 can receive access requests from client devices 220 that include deep links targeting zone structures 280 and can resolve each deep link by traversing the hierarchical data structure 270 using the zone structure identifier included in the deep link to determine a current location of the target zone structure 280. For example, the access request handler 240 can receive, from a second client device 220B via the network 210, a second access request indicating that the second client device 220B accessed the second deep link. The access request handler 240 can resolve, based on the first zone structure identifier included in the second deep link and the hierarchical data structure 270, a second location of the first zone structure 280 within the hierarchical data structure 270, the second location indicating at least the first page 275 of at least one page 275. The access request handler 240 can traverse the hierarchical data structure 270 using the first zone structure identifier to determine a page 275 that includes the first zone structure 280 as a child of a parent zone structure, such that the second location indicates the page 275 as the first page 275, the parent zone structure as a containing element, and the first zone structure 280 as the target zone structure.

For example, the access request handler 240 can traverse the hierarchical data structure 270 from the first zone structure identifier upward through one or more parent zone structures 280 and to the page 275 that references the topmost parent zone structure 280, such that the second location indicates both the page 275 and the nesting path from the page 275 to the first zone structure 280 within the hierarchical data structure 270. In some implementations, the access request handler 240 can resolve the second location of the first zone structure 280 by determining, based on the hierarchical data structure 270, (i) a page identifier corresponding to the first page 275 and (ii) a location of the first zone structure 280 within the first page 275. In some implementations, the access request handler 240 can resolve the second location by traversing the hierarchical data structure 270, based on the first zone structure identifier of the second deep link, to identify a page identifier corresponding to the first page 275. In some implementations, the second location can include an indication of one or more intermediate zone structures 280 between the first page 275 and the first zone structure 280 within the hierarchical data structure 270, such that the interface generator 235 can generate data for rendering the first page 275 with each intermediate zone structure 280 displayed in a state that reveals the first zone structure 280 to the customer.

The interface generator 235 can generate responses to access requests that include deep links targeting zone structures 280 by traversing the hierarchical data structure 270 to locate the target zone structure 280 and generating rendering data for the page 275 that includes the target zone structure 280. For example, the interface generator 235 can generate, based on the hierarchical data structure 270 and based on the second deep link, a second response to the second access request including data for rendering the first page 275 of at least one page 275 comprising the first zone structure 280 and the first content object 285. The data processing system 205 can transmit the second response to the second client device 220B via the network 210 to cause presentation of the first page 275 via a second application executing on the second client device 220B, such that the first page 275 is presented with the first zone structure 280 including the first content object 285. The second application executing on the second client device 220B can render the first page 275 with a parent zone structure displayed in a selected state and the first zone structure 280 scrolled into view and/or highlighted, such that the customer is directed to the first zone structure 280 within the nested structure of the page 275 without navigating through multiple navigational elements. For example, when the second deep link targets a zone structure 280 representing an "Over/Under Rebounds" pill nested within a "Rebounds" zone structure 280 within a "Player Props" tab on an NBA event page 275, the second application can render the NBA event page 275 with the "Player Props" tab displayed in a selected state, the "Rebounds" zone structure 280 expanded, and the "Over/Under Rebounds" pill scrolled into view, such that the customer is directed to the target zone structure 280 at a nesting depth that would otherwise require multiple navigational selections to reach.

In some implementations, the hierarchical data structure 270 can be updated following generation of the second deep link to change at least one of (i) the page identifier corresponding to the first page 275 and/or (ii) the location of the first zone structure 280 within the first page 275. The data structure manager 230 can receive, from an operator device 225 via the network 210, a request to reposition a zone structure 280 within the hierarchical data structure 270, and can update one or more parent-child associations stored in the hierarchical data structure 270 in the storage 215 to reflect the changed position of the zone structure 280 while retaining the zone structure identifier assigned to the zone structure 280. In some implementations, an operator using an operator device 225 can move the first zone structure 280 from a first position within a first tab on a page 275 to a second position within a second tab on the same page 275 and/or a different page 275, and the data structure manager 230 can update the hierarchical data structure 270 in the storage 215 to reflect the changed position of the first zone structure 280. For example, an operator can move a zone structure 280 representing a "Touchdown Scorers" pill from a "Featured Markets" tab to a "Player Props" tab on an NFL league page 275, and the data structure manager 230 can update the parent-child association of the zone structure 280 within the hierarchical data structure 270 to reference the "Player Props" tab as the new parent zone structure while retaining the first zone structure identifier associated with the zone structure 280.

In some implementations, the access request handler 240 can resolve deep links that reference zone structure 275 identifiers by traversing the current state of the hierarchical data structure 270 using the zone structure identifier included in the deep link, rather than a fixed directory path that encodes a prior structural position of the target zone structure 280. For example, the access request handler 240 can resolve the second location by determining, using the first zone structure identifier of the second deep link and the updated hierarchical data structure 270, an updated page identifier and an updated location of the first zone structure 280. The access request handler 240 can resolve the second deep link using the first zone structure identifier and the updated hierarchical data structure 270 rather than a fixed directory path, such that the second deep link continues to resolve to the first zone structure 280 after the structural change because the first zone structure identifier remains constant across updates to the hierarchical data structure 270. In some implementations, the first zone structure 280 can be moved from a first page 275 to a second page 275 within the hierarchical data structure 270, and the access request handler 240 can resolve the second deep link to the second page 275 using the first zone structure identifier and the updated hierarchical data structure 270, such that the second deep link directs the customer to the second page 275 rather than the first page 275 without requiring regeneration of the second deep link.

Figure 8:
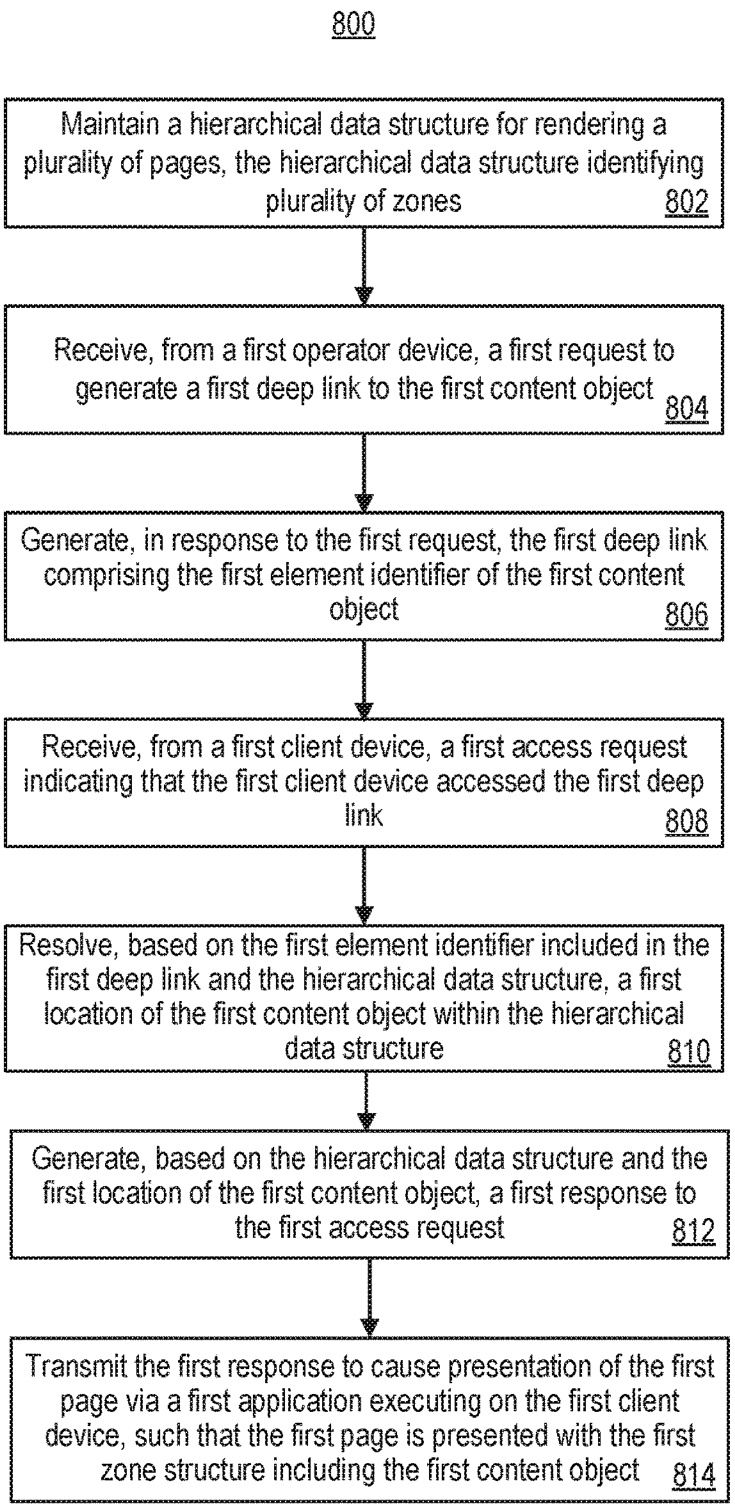
FIG. 8 is a flow chart illustrating a method for graphical element-specific deep links, in accordance with one or more implementations.

Referring now to FIG. 8, illustrated is a method 800 for graphical element-specific deep links. The method 800 is described as being performed by the data processing system 205 of FIG. 2. However, it should be understood that the method 800 may be performed using any computing device/system or combination of computing devices/systems described herein. Additional operations may be performed as part of the method 800 or operations of the method 800 may be omitted, in some implementations. In brief overview of the method 800, the method 800 can include maintaining a hierarchical data structure for rendering pages, the hierarchical data structure identifying zone structures associated with the pages (ACT 802), receiving, from a first operator device, a first request to generate a first deep link to the first content object (ACT 804), generating, in response to the first request, the first deep link comprising the first element identifier of the first content object (ACT 806), receiving, from a first client device, a first access request indicating that the first client device accessed the first deep link (ACT 808), resolving, based on the first element identifier included in the first deep link and the hierarchical data structure, a first location of the first content object within the hierarchical data structure (ACT 810), generating, based on the hierarchical data structure and the first location of the first content object, a first response to the first access request (ACT 812), and/or transmitting the first response to cause presentation of the first page via a first application executing on the first client device, such that the first page is presented with the first zone structure including the first content object (ACT 814).

FIG. 8 is a flow diagram showing a method 800 for graphical element-specific deep links, in accordance with some implementations of the present disclosure. The method 800 can be performed by the data processing system (e.g., the data processing system 205 of FIG. 2), or by any computing device or combination of computing devices described herein. The method 800 can include operations performed by the data structure manager 230, the interface generator 235, the access request handler 240, and/or the criteria evaluator 245 of the data processing system 205 of FIG. 2 to generate deep links based on unique identifiers associated with individual pages (e.g., pages 275), zone structures (e.g., zone structures 280), and/or content objects (e.g., content objects 285) within a hierarchical data structure (e.g., a hierarchical data structure 270), and to resolve access requests that include such deep links by traversing the hierarchical data structure using the unique identifiers to locate target elements regardless of structural changes to the hierarchical data structure.

The method 800, at ACT 802, can include maintaining, by the data processing system, a hierarchical data structure (e.g., the hierarchical data structure 270 of FIG. 2) for rendering pages, the hierarchical data structure identifying zone structures associated with the pages, a first zone structure of the zone structures associated with a first content object, the first zone structure associated with a first zone structure identifier, the first content object associated with a first object identifier. The data processing system can store the hierarchical data structure in storage (e.g., the storage 215 of FIG. 2) and can access the hierarchical data structure to determine associations between pages, zone structures, and content objects in response to access requests received from client devices via a network (e.g., the network 210 of FIG. 2). The first zone structure identifier can be a unique alphanumeric string that the data processing system can store in the hierarchical data structure in association with the first zone structure. The first object identifier can be a unique alphanumeric string that the data processing system can store in the hierarchical data structure in association with the first content object. In some implementations, the data processing system can assign the first zone structure identifier to the first zone structure and the first object identifier to the first content object at the time the first zone structure and/or the first content object are created and/or added to the hierarchical data structure. The first zone structure identifier and the first object identifier can each be distinct from a directory path that encodes the structural position of the first zone structure and/or the first content object within the hierarchical data structure, such that the first zone structure identifier and the first object identifier can persist across structural changes to the hierarchical data structure without becoming invalid. Maintaining the hierarchical data structure can include performing any of the operations of the data structure manager 230 of FIG. 2, including any operations of the methods 400, 500, 600, and 700 of FIGS. 4, 5, 6, and 7.

The method 800, at ACT 804, can include receiving, by the data processing system, from a first operator device (e.g., an operator device 225 of FIG. 2), a first request to generate a first deep link to the first content object. The first request can identify the first content object by the first object identifier stored in the hierarchical data structure. For example, an operator using the first operator device can select an actionable object within a deep link generator interface rendered on the first operator device to generate a deep link to a content object representing a subcategory of wagering markets within a zone structure on a page. In some implementations, the first request can be transmitted by a promotions team member, a merchandising team member, and/or a customer relationship management (CRM) team member using the first operator device to generate a deep link for a campaign that directs customers to a curated content location within the hierarchical data structure. The data processing system can receive the first request via the network and can forward the first request to the interface generator for generation of the first deep link. Receiving the first request can include performing any of the operations of the access request handler 240 of FIG. 2, including any operations of the methods 400, 500, 600, and 700 of FIGS. 4, 5, 6, and 7.

The method 800, at ACT 806, can include generating, by the data processing system, in response to the first request, the first deep link comprising the first object identifier of the first content object. The data processing system can generate the first deep link by including the first object identifier in the first deep link without encoding a directory path that reflects a current hierarchical position of the first content object within the hierarchical data structure. In some implementations, the first deep link can comprise the first object identifier and can omit a directory path corresponding to the first page, such that the first location of the first content object is determined using the first object identifier rather than a fixed path that would become invalid if the first content object were repositioned within the hierarchical data structure. In some implementations, the first object identifier can comprise an alphanumeric string. For example, the first deep link can include the alphanumeric string "RTJUW3K" corresponding to the first object identifier without including a path such as "/sports/football/nfl/touchdown-scorers/first-td," such that the data processing system can resolve the first deep link by traversing the hierarchical data structure using the first object identifier to locate the first content object regardless of whether the first content object has been moved to a different zone structure or a different page since the first deep link was generated. In some implementations, the data processing system can store the first deep link in the storage in association with the first object identifier, such that the first deep link can be distributed to client devices via external communication channels (e.g., CRM notifications, promotional messages, in-application buttons, etc.) and subsequently resolved by the data processing system upon receipt of an access request including the first deep link. Generating the first deep link can include performing any of the operations of the interface generator 235 of FIG. 2, including any operations of the methods 400, 500, 600, and 700 of FIGS. 4, 5, 6, and 7.

The method 800, at ACT 808, can include receiving, by the data processing system, from a first client device (e.g., a client device 220 of FIG. 2), a first access request indicating that the first client device accessed the first deep link. For example, a customer can select a promotional link in a CRM notification on the first client device, and the first client device can transmit the first access request including the first deep link to the data processing system via the network. In some implementations, the first access request can include a token associated with the first client device, the token indicating request context associated with the first client device. The request context can include a geographic jurisdiction, an account identifier, a session identifier, and/or a device type indicator associated with the first client device. The data processing system can receive the first access request via the network and can extract the first object identifier from the first deep link included in the first access request for use in resolving the location of the first content object within the hierarchical data structure. Receiving the first access request can include performing any of the operations of the access request handler 240 of FIG. 2, including any operations of the methods 400, 500, 600, and 700 of FIGS. 4, 5, 6, and 7.

The method 800, at ACT 810, can include resolving, by the data processing system, based on the first object identifier included in the first deep link and the hierarchical data structure, a first location of the first content object within the hierarchical data structure, the first location indicating at least a first page of the pages. The data processing system can traverse the hierarchical data structure using the first object identifier to determine that the first content object is a child of the first zone structure within a page, such that the first location indicates the page as the first page and the first zone structure as a parent zone structure of the first content object. For example, the data processing system can traverse the hierarchical data structure using the first object identifier "RTJUW3K" to determine that the first content object is associated with a zone structure rendered as a tab on a league page, such that the first location indicates the league page as the first page and the zone structure as the parent of the first content object within the hierarchical data structure. In some implementations, the data processing system can resolve the first location without relying on a directory path, because the first deep link includes the first object identifier rather than a fixed path, and the data processing system can locate the first content object within the hierarchical data structure using the first object identifier regardless of the current structural position of the first content object. Resolving the first location can include performing any of the operations of the access request handler 240 of FIG. 2, including any operations of the methods 400, 500, 600, and 700 of FIGS. 4, 5, 6, and 7.

In some implementations, the method 800 can include receiving, by the data processing system, from a second operator device (e.g., an operator device 225 of FIG. 2), a second request to generate a second deep link to the first zone structure. The second request can identify the first zone structure by the first zone structure identifier stored in the hierarchical data structure. In some implementations, the method 800 can include generating, by the data processing system, in response to the second request, the second deep link comprising the first zone structure identifier of the first zone structure. The second deep link can include the first zone structure identifier (e.g., the alphanumeric string "OORRMSW") and can omit a directory path corresponding to the first page, such that the data processing system can resolve the second deep link by traversing the hierarchical data structure using the first zone structure identifier to locate the first zone structure regardless of a current position of the first zone structure within the hierarchical data structure. In some implementations, the method 800 can include receiving, by the data processing system, from a second client device (e.g., a client device 220 of FIG. 2), a second access request indicating that the second client device accessed the second deep link. Receiving the second request and generating the second deep link can include performing any of the operations of the interface generator 235 of FIG. 2, including any operations of the methods 400, 500, 600, and 700 of FIGS. 4, 5, 6, and 7.

In some implementations, the method 800 can include resolving, by the data processing system, based on the first zone structure identifier included in the second deep link and the hierarchical data structure, a second location of the first zone structure within the hierarchical data structure, the second location indicating at least the first page of the pages. The data processing system can traverse the hierarchical data structure using the first zone structure identifier to determine a page that includes the first zone structure and a position of the first zone structure within the page. In some implementations, the method 800 can include resolving, by the data processing system, the second location by traversing the hierarchical data structure, based on the first zone structure identifier of the second deep link, to identify a page identifier corresponding to the first page. For example, the data processing system can traverse the hierarchical data structure from the first zone structure identifier upward through parent zone structures to identify the page identifier of the page that includes the first zone structure as a child, such that the second location includes the page identifier and a position of the first zone structure within the identified page. Resolving the second location can include performing any of the operations of the access request handler 240 of FIG. 2, including any operations of the methods 400, 500, 600, and 700 of FIGS. 4, 5, 6, and 7.

In some implementations, the method 800 can include resolving, by the data processing system, the second location of the first zone structure by determining, based on the hierarchical data structure, (i) a page identifier corresponding to the first page and (ii) a location of the first zone structure within the first page. The data processing system can determine both the page identifier and the location within the page from the first zone structure identifier, because the hierarchical data structure encodes parent-child relationships between zone structures and pages that the data processing system can traverse using the first zone structure identifier as a starting point. In some implementations, the hierarchical data structure can be updated following generation of the second deep link to change at least one of (i) the page identifier corresponding to the first page or (ii) the location of the first zone structure within the first page. For example, an operator using an operator device can move the first zone structure from a first tab on a first page to a second tab on a second page, and the data structure manager can update the hierarchical data structure in the storage to reflect the changed position of the first zone structure. The method 800 can include resolving, by the data processing system, the second location by determining, using the first zone structure identifier of the second deep link and the updated hierarchical data structure, an updated page identifier and an updated location of the first zone structure. The data processing system can resolve the second deep link to the updated location because the first zone structure identifier remains constant across structural changes to the hierarchical data structure, and the data processing system can traverse the updated hierarchical data structure using the first zone structure identifier to determine the updated page identifier and the updated position of the first zone structure within the updated page. Resolving the second location of the first zone structure can include performing any of the operations of the access request handler 240 of FIG. 2, including any operations of the methods 400, 500, 600, and 700 of FIGS. 4, 5, 6, and 7.

The method 800, at ACT 812, can include generating, by the data processing system, based on the hierarchical data structure and the first location of the first content object, a first response to the first access request including data for rendering the first page of the pages comprising the first zone structure and the first content object. The data processing system can traverse the hierarchical data structure from the first page to the first zone structure and to the first content object, and can generate the first response including rendering data for the first zone structure presented as a navigational element (e.g., a tab, a pill, a section header, etc.) within the first page and the first content object presented within the graphical representation of the first zone structure. In some implementations, the data processing system can generate the first response such that the first zone structure is displayed in a selected state and/or the first content object is scrolled into view and/or highlighted within the rendered first page, such that a customer accessing the first deep link is directed to the first content object without navigating through multiple levels of the page hierarchy. In some implementations, the method 800 can include generating, by the data processing system, the first response to include data for presenting the first content object according to the token, the token indicating request context associated with the first client device. For example, the data processing system can generate the first response such that the first content object is rendered in accordance with a geographic jurisdiction indicated by the token, such that content that is restricted in the geographic jurisdiction of the first client device can be omitted from the rendered first page. Generating the first response can include performing any of the operations of the interface generator 235 of FIG. 2, including any operations of the methods 400, 500, 600, and 700 of FIGS. 4, 5, 6, and 7.

In some implementations, the method 800 can include generating, by the data processing system, based on the hierarchical data structure and based on the second deep link, a second response to the second access request including data for rendering the first page of the pages comprising the first zone structure and the first content object. The data processing system can generate the second response by traversing the hierarchical data structure from the resolved second location to the first zone structure and the first content object, and can include rendering data for the first zone structure and the first content object in the second response. In some implementations, the method 800 can include storing, by the data processing system, in association with the hierarchical data structure, an association between the first object identifier and the first location of the first content object. The data processing system can store the association in the storage such that subsequent access requests including the first deep link can be resolved using the stored association without requiring a full traversal of the hierarchical data structure for each resolution. In some implementations, responsive to determining that the hierarchical data structure lacks an association for the first object identifier (e.g., the first content object has been removed from the hierarchical data structure by an operator via an operator device), the method 800 can include generating, by the data processing system, a fallback response that omits data for rendering the first content object. The fallback response can include data for rendering a default page and/or an indication that the target content object is unavailable, such that the first client device can present the default page to the customer rather than an error state. Generating the second response and storing the association can include performing any of the operations of the interface generator 235 of FIG. 2, including any operations of the methods 400, 500, 600, and 700 of FIGS. 4, 5, 6, and 7.

The method 800, at ACT 814, can include transmitting, by the data processing system, the first response to cause presentation of the first page via a first application executing on the first client device, such that the first page is presented with the first zone structure including the first content object. The data processing system can transmit the first response to the first client device via the network, and the first application executing on the first client device can render the first page by presenting the first zone structure as a navigational element and presenting the first content object within the graphical representation of the first zone structure. For example, the first application can render the first page with a tab corresponding to the first zone structure displayed in a selected state and the first content object displayed within the tab, such that the customer is directed to the target content without performing additional navigational selections. In some implementations, the method 800 can include transmitting, by the data processing system, the second response to cause presentation of the first page via a second application executing on the second client device, such that the first page is presented with the first zone structure including the first content object. The data processing system can transmit the second response to the second client device via the network, and the second application executing on the second client device can render the first page by presenting the first zone structure as a navigational element (e.g., a tab, a pill, a section header, etc.) in a selected state and/or scrolling the first zone structure into view within the rendered first page. In some implementations, the first application and/or the second application can render the first page across different client platforms (e.g., a mobile application, a web application, a desktop application, etc.) based on platform-specific rendering instructions while preserving the page, zone structure, and content object associations and the deep link resolution performed by the data processing system. Transmitting the first response and the second response can include performing any of the operations of the interface generator 235 of FIG. 2, including any operations of the methods 400, 500, 600, and 700 of FIGS. 4, 5, 6, and 7.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatuses, devices, and machines for processing data, including by way of example a programmable processor, a computer, a system on a chip, or multiple ones, or combinations, of the foregoing. The apparatus can include special purpose logic circuitry (e.g., an FPGA, an ASIC, etc.). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 205 can include clients and servers. For example, the data processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for implementing network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

maintain a hierarchical data structure for rendering at least one page, the hierarchical data structure identifying at least one zone structure associated with at least one page, each zone structure of at least one zone structure associated with one or more respective content objects;

receive, from an operator device, a request to update the hierarchical data structure to associate availability criteria with a set of sub-zone structures of a first zone structure of at least one zone structure, each sub-zone structure of the set of sub-zone structures associated with one or more respective content objects;

update the hierarchical data structure according to the request to modify the first zone structure to associate the availability criteria with the set of sub-zone structures;

receive an access request for a first page of at least one page that includes the first zone structure;

determine, based on the availability criteria of the hierarchical data structure and a receipt time of the request, that each of the set of sub-zone structures is unavailable for presentation within the first page;

generate, based on the hierarchical data structure and based on determining that each of the set of sub-zone structures is unavailable for presentation based on the availability criteria, a response to the access request including data for rendering the first page without graphical representations of (i) the set of sub-zone structures and (ii) the first zone structure; and transmit the response to cause presentation of the first page via an application executing on a user client device, such that the first page is presented without the first zone structure and without the set of sub-zone structures.

2. The system of claim 1, wherein the one or more processors are further configured to:

generate layout data for rendering the first page, and responsive to determining that each of the set of sub-zone structures is unavailable for presentation, omitting a layout position for the first zone structure from the layout data.

3. The system of claim 1, wherein the one or more processors are further configured to:

determine an availability status of the first zone structure based on respective availability status of the set of sub-zone structures, the availability status of the first zone structure indicating that the first zone structure is unavailable for presentation responsive to determining that each of the set of sub-zone structures is unavailable for presentation.

4. The system of claim 3, wherein the set of sub-zone structures comprises a second zone structure, the second zone structure including one or more additional zone structures, and wherein the one or more processors are further configured to:

determine a second availability status of the second zone structure based on respective availability statuses of the one or more additional zone structures.

5. The system of claim 1, wherein the one or more processors are further configured to:

receive a second access request for the first page;

determine, based on the availability criteria, that at least one sub-zone structure of the set of sub-zone structures is available for presentation; and generate a second response to the second access request including data for rendering the first page with graphical representations of (i) the at least one available sub-zone structure of the set of sub-zone structures and (ii) the first zone structure.

6. The system of claim 3, wherein determining the availability status of the first zone structure comprises determining whether a number of available sub-zone structures of the set of sub-zone structures satisfies a threshold number for the first zone structure to be available for presentation.

7. The system of claim 3, wherein the one or more processors are further configured to:

store, in association with the hierarchical data structure, the availability status of the first zone structure and the respective availability statuses of the set of sub-zone structures.

8. The system of claim 7, wherein the one or more processors are further configured to:

in response to detecting a change in an availability status of at least one sub-zone structure of the set of sub-zone structures, update the availability status of the first zone structure stored in association with the hierarchical data structure.

9. The system of claim 3, wherein the one or more processors are further configured to:

receive, from the operator device, an availability rule indicating availability of the first zone structure is determined based on availability of the set of sub-zone structures; and store the availability rule in association with the hierarchical data structure.

10. The system of claim 1, wherein the one or more processors are further configured to:

omit, from the data for rendering the first page, navigation data identifying the first zone structure for selection within the first page.

11. A method, comprising:

maintaining, by at least one processor, a hierarchical data structure for rendering at least one page, the hierarchical data structure identifying at least one zone structure associated with at least one page, each zone structure of at least one zone structure associated with one or more respective content objects;

receiving, by the at least one processor, from an operator device, a request to update the hierarchical data structure to associate availability criteria with a set of sub-zone structures of a first zone structure of at least one zone structure, each sub-zone structure of the set of sub-zone structures associated with one or more respective content objects;

updating, by the at least one processor, the hierarchical data structure according to the request to modify the first zone structure to associate the availability criteria with the set of sub-zone structures;

receiving, by the at least one processor, an access request for a first page of at least one page that includes the first zone structure;

determining, by the at least one processor, based on the availability criteria of the hierarchical data structure and a receipt time of the request, that each of the set of sub-zone structures is unavailable for presentation within the first page;

generating, by the at least one processor, based on the hierarchical data structure and based on determining that each of the set of sub-zone structures is unavailable for presentation based on the availability criteria, a response to the access request including data for rendering the first page without graphical representations of (i) the set of sub-zone structures and (ii) the first zone structure; and transmitting, by the at least one processor, the response to cause presentation of the first page via an application executing on a user client device, such that the first page is presented without the first zone structure and without the set of sub-zone structures.

12. The method of claim 11, further comprising:

generating, by the at least one processor, layout data for rendering the first page, and responsive to determining that each of the set of sub-zone structures is unavailable for presentation, omitting, by the at least one processor, a layout position for the first zone structure from the layout data.

13. The method of claim 11, further comprising:

determining, by the at least one processor, an availability status of the first zone structure based on respective availability status of the set of sub-zone structures, the availability status of the first zone structure indicating that the first zone structure is unavailable for presentation responsive to determining that each of the set of sub-zone structures is unavailable for presentation.

14. The method of claim 13, wherein the set of sub-zone structures comprises a second zone structure, the second zone structure including one or more additional zone structures, and the method further comprising:

determining, by the at least one processor, a second availability status of the second zone structure based on respective availability statuses of the one or more additional zone structures.

15. The method of claim 11, further comprising:

receiving, by the at least one processor, a second access request for the first page;

determining, by the at least one processor, based on the availability criteria, that at least one sub-zone structure of the set of sub-zone structures is available for presentation; and generating, by the at least one processor, a second response to the second access request including data for rendering the first page with graphical representations of (i) the at least one available sub-zone structure of the set of sub-zone structures and (ii) the first zone structure.

16. The method of claim 13, wherein determining the availability status of the first zone structure comprises determining whether a number of available sub-zone structures of the set of sub-zone structures satisfies a threshold number for the first zone structure to be available for presentation.

17. The method of claim 13, further comprising:

storing, by the at least one processor, in association with the hierarchical data structure, the availability status of the first zone structure and the respective availability statuses of the set of sub-zone structures.

18. The method of claim 17, further comprising:

in response to detecting a change in an availability status of at least one sub-zone structure of the set of sub-zone structures, updating, by the at least one processor, the availability status of the first zone structure stored in association with the hierarchical data structure.

19. The method of claim 13, further comprising:

receiving, by the at least one processor, from the operator device, an availability rule indicating availability of the first zone structure is determined based on availability of the set of sub-zone structures; and storing, by the at least one processor, the availability rule in association with the hierarchical data structure.

20. The method of claim 11, further comprising:

omitting, by the at least one processor, from the data for rendering the first page, navigation data identifying the first zone structure for selection within the first page.

* * * * *